(12) United States Patent
Liu et al.

(10) Patent No.: US 10,010,031 B1
(45) Date of Patent: Jul. 3, 2018

(54) MULTIFUNCTIONAL UNDERGROUND IRRIGATION SYSTEM

(71) Applicants: Xue Wu Liu, Bloomington, CA (US); Tian Li David Liu, Bloomington, CA (US); Rui Li, Bloomington, CA (US)

(72) Inventors: Xue Wu Liu, Bloomington, CA (US); Tian Li David Liu, Bloomington, CA (US); Rui Li, Bloomington, CA (US)

( * ) Notice: Subject to any disclaimer, the term of this patent is extended or adjusted under 35 U.S.C. 154(b) by 0 days.

(21) Appl. No.: 15/605,919

(22) Filed: May 25, 2017

(51) Int. Cl.
*A01G 25/06* (2006.01)
*A01G 25/16* (2006.01)
*A01G 29/00* (2006.01)
*G06K 19/06* (2006.01)

(52) U.S. Cl.
CPC .............. *A01G 25/06* (2013.01); *A01G 25/16* (2013.01); *A01G 29/00* (2013.01); *G06K 19/06028* (2013.01)

(58) Field of Classification Search
CPC ............ Y10T 137/877; Y10T 137/402; Y10T 137/189; Y10T 137/1866; E02D 3/10; E03F 1/003; E03F 1/00; E03F 1/002; E02B 11/005; E02B 13/00; E02B 11/00; E02B 13/02; A01G 25/06; A01G 25/16; A01G 2025/003; A01G 25/167; E01C 13/06
USPC ........ 405/36, 37, 38, 39, 41, 42, 43, 44, 45, 405/46, 48, 49, 50, 51; 47/48.5; 111/118–129
See application file for complete search history.

(56) References Cited

U.S. PATENT DOCUMENTS

| | | |
|---|---|---|
| 3,713,148 A | 1/1973 | Cardullo |
| 4,003,408 A | 1/1977 | Turner |
| 4,384,288 A | 5/1983 | Walton |
| 5,443,544 A | 8/1995 | Azoulay |
| 5,761,846 A | 6/1998 | Marz |
| 5,938,372 A | 8/1999 | Lichfield |
| 5,996,279 A | 12/1999 | Zayeratabat |
| 6,138,408 A | 10/2000 | Paternoster et al. |
| 6,443,367 B1 | 9/2002 | Bova |

(Continued)

FOREIGN PATENT DOCUMENTS

| | | |
|---|---|---|
| CN | 201928762 | 8/2011 |
| CN | 102986507 | 3/2013 |

*Primary Examiner* — Benjamin F Fiorello
*Assistant Examiner* — Edwin J Toledo-Duran

(57) ABSTRACT

A multifunctional underground irrigation system comprises of an underground irrigation, fertilization and respiration (UIFR) device with three types of air/pressure releasing structures, an universal unique label and label reader, three irrigation monitoring indicators, various sample collecting channels and measurement devices, a movable monitoring device, a water supply system, and a data center. The water containers, water drip controlling device, water flow rate controlling device, AAB device and AWPAE devices constitute the irrigation device for field plants or potted plants culture. The combination of the wireless technologies with various sensors in one of three indicators enables the underground irrigation to be visible, hearable, viewable and remotely controllable at real time and real-location manner for precision management of plant cultivation. The movable device provides a way to monitor the water supply system and to calibrate data obtained from UIFR devices. All devices in the system are repairable and replaceable.

15 Claims, 37 Drawing Sheets

(56) References Cited

U.S. PATENT DOCUMENTS

| | | | |
|---|---|---|---|
| 6,540,436 B2 | 4/2003 | Ogi | |
| 7,809,475 B2 * | 10/2010 | Kaprielian | A01C 23/042 137/78.3 |
| 8,132,362 B2 | 3/2012 | King | |
| 8,381,437 B2 | 2/2013 | Ciudaj | |
| 8,644,166 B2 | 2/2014 | Xia | |
| 8,786,407 B2 | 7/2014 | Liu | |
| 8,979,969 B1 * | 3/2015 | Miller | A01G 25/00 239/727 |
| 8,986,417 B1 * | 3/2015 | Miller | E02B 13/00 239/727 |
| 8,986,418 B1 * | 3/2015 | Miller | E02B 13/00 239/727 |
| 9,485,923 B2 | 11/2016 | Ensworth | |
| 9,629,313 B1 * | 4/2017 | Grossman | A01G 25/16 |
| 2003/0196375 A1 | 10/2003 | Ferro | |
| 2007/0220808 A1 * | 9/2007 | Kaprielian | A01C 23/042 47/48.5 |
| 2008/0097653 A1 * | 4/2008 | Kaprielian | A01C 23/042 700/284 |
| 2011/0174706 A1 * | 7/2011 | Russell | A01G 25/00 210/170.01 |
| 2017/0223910 A1 * | 8/2017 | Grossman | A01G 25/16 |
| 2017/0223912 A1 * | 8/2017 | Gagne | A01G 31/02 |
| 2017/0305804 A1 * | 10/2017 | Ayers | C05F 11/08 |

\* cited by examiner

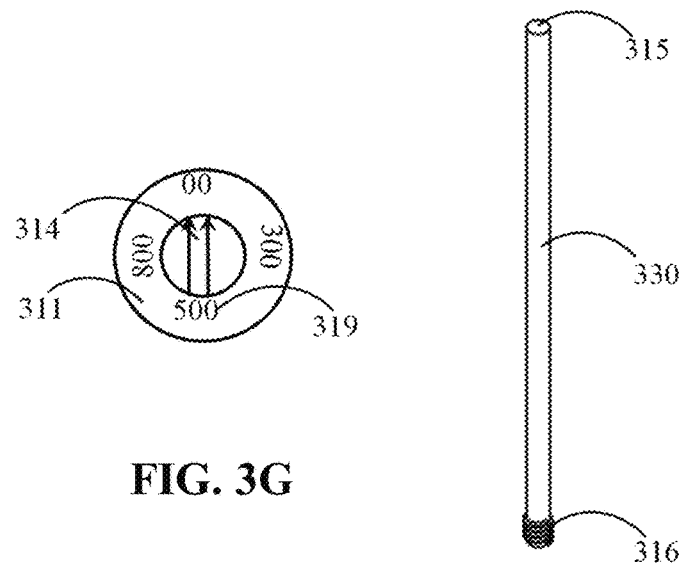
FIG. 3H
FIG. 3G
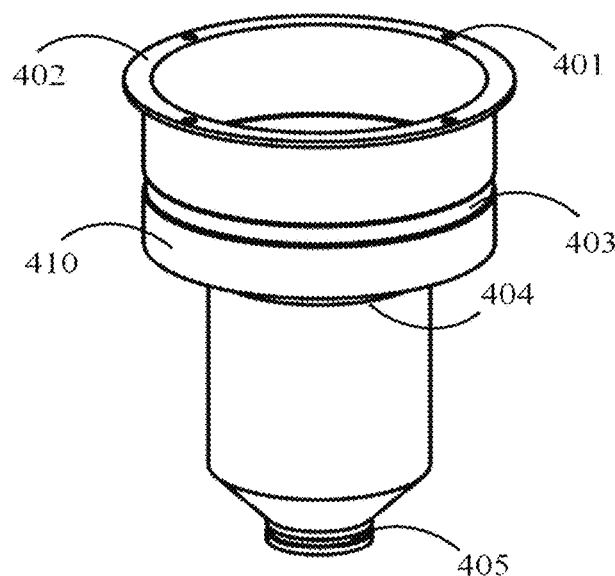
FIG. 4A

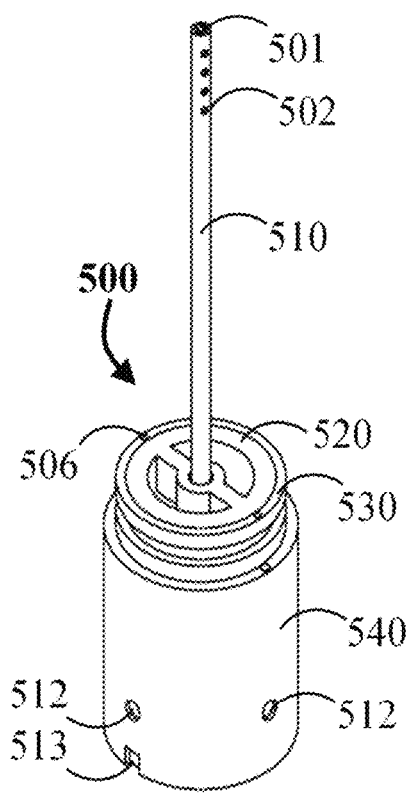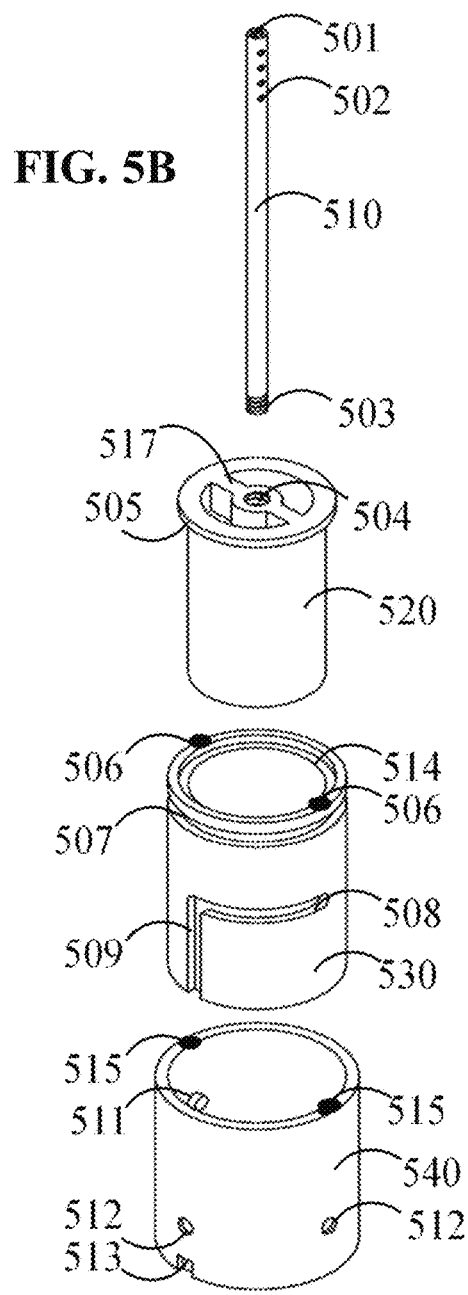
FIG. 5A
FIG. 5B

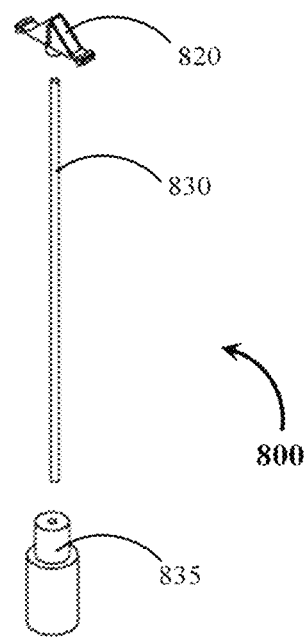
FIG. 8A
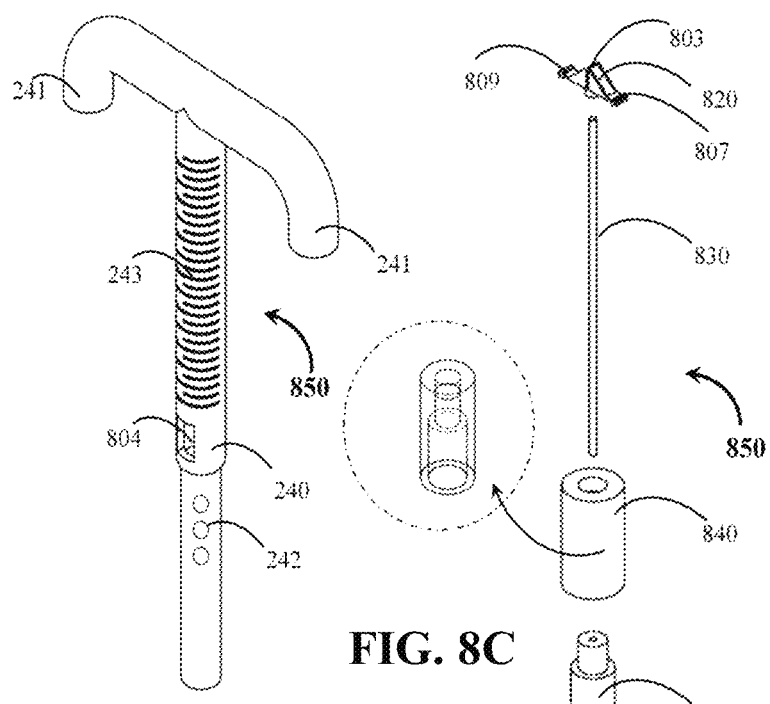
FIG. 8B
FIG. 8C
FIG. 8D

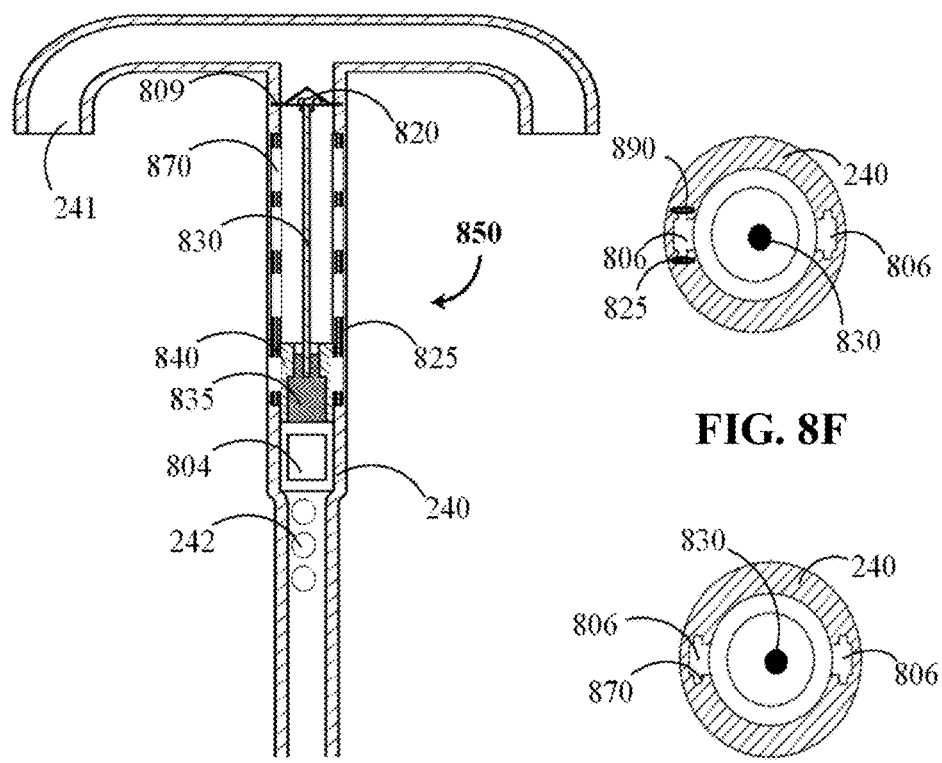

MULTIFUNCTIONAL UNDERGROUND IRRIGATION SYSTEM

CROSS-REFERENCE TO RELATED APPLICATIONS

This application claims the benefit of U.S. Provisional Patent Application No. 62/494,276 filed in Aug. 3, 2016, which is hereby incorporated by reference.

This application is partial continuous of the U.S. Pat. No. 8,786,407 with the title of "Universal and reusable RFID system and method for use in supply chain and logistics management", applied by Xue W. Liu and Rui Li, which was filed in Aug. 11, 2011 with U.S. application Ser. No. 13/208,284.

FIELD OF INVENTION

The present invention relates to the underground irrigation, fertilization, respiration of the soil and plant roots, ZigBee technology and RFID technology.

BACKGROUND OF THE ART

It is common knowledge that water moves through the soil in two ways: 1) downward pulled by gravity and 2) outward and upward, pulled by capillary action. It is also a common knowledge that the plant hydrotropism is the growth or turning of plant roots toward or away from moisture in the soil. The response can be positive towards the water or negative away from the water. Roots, for instance, are positively hydrotropic. That means that they grow towards moist soils to avoid drought stress. Once a root cap has sensed water, it bends and then the root grows towards it. However, as an underground system, there would be difficulty and no efficient way to monitor the system performance for each tree and the devices would not have any protection from clogging and many other problems. As Rogers, D. H. and F. R. Lamm pointed out in their paper that clogging of drip line emitters is the primary reason for SDI system failure (2005. Key considerations for a successful subsurface drip irrigation (SDI) system. In proceedings of the Central Plains Irrigation Conference, Sterling, Colo., Feb. 16-17, 2005. Available from CPIA, 700 N. Thompson, Colby, Kans. pp. 113-118).

Underground irrigation has showed so many advantages and become so important in horticulture and agriculture compared with above ground irrigation, therefore great efforts have been made to develop various devices or systems for establishing true underground irrigation. For example, several US patents and published patent applications have detailed both the advantages related to underground irrigation and disclosed various underground devices. Such as U.S. Pat. No. 4,453,343, issued to Grimes for "Irrigation system" U.S. Pat. No. 5,938,372 issued to Lichfield for "Subsurface irrigation apparatus and method"; U.S. Pat. No. 6,540,436 issued to Ogi for "Deep root watering unit". Some other specific invention aimed and focused underground irrigation with special disclosures. Such as U.S. Pat. No. 6,443,367, issued to Bova for "Deep watering device"; U.S. Published Patent Application No. US 2003-0196375 A1, filed by Ferro for "Method of producing deep-rooted trees for phytoremediation applications"; U.S. Pat. No. 5,996,279, issued to Zayeratabat for "Plant irrigation apparatus"; U.S. Pat. No. 4,003,408, issued to Turner for "Underground irrigation porous pipe"; U.S. Pat. No. 8,381,437, issued to Ciudaj for "Irrigation device and method of promoting deep root growth plant" and recent U.S. Pat. No. 9,485,923, issued to Ensworth for "Elastomeric emitter and methods relating to same".

ZigBee is a specification for a suite of high level communication protocols using small, low-power digital radios based on the IEEE 802.15.4-2003 standard and ZigBee PRO, also known as Zigbee 2007, the enhanced ZigBee Pro Specification, for wireless personal area networks (WPANs), such as wireless headphones connecting with cell phones via short-range radio. The technology defined by the ZigBee specification is intended to be simpler and less expensive than other WPANs, such as Bluetooth. ZigBee is targeted at radio-frequency (RF) applications that require a low data rate, long battery life, and secure networking. These features will be the potential application for ZigBee technology with various demand for individual device and further solve many practical difficulties. U.S. Pat. No. 8,644,166, issued to Xia, et al, for example, disclosed that a sensor device integrates ZigBee® technology into power switch device to provide monitoring and control of power usage, as well as operational control of connected devices.

Zigbee provides a cost breakthrough that means wireless technology can be more widely deployed in wireless control and monitoring applications: Zigbee power requirements are so low that devices can have extremely long battery life and use smaller "coin cell" type batteries; A Zigbee node can wake up, check in, send data, and shut down in less than 30 ms; ZigBee is an open standard that is supported by a large number of vendors and many others. Especially the feature of the address used for each individual ZigBee End Device provides a very suitable way for the combination with each individual UIFR device for the purpose to monitor the UIFR device and plants at real time and real location, since no two devices can have the same IEEE address in the entire world.

As we described in our patent (U.S. Pat. No. 8,786,407), Radio frequency identification (RFID) technology and RFID related knowledge have been widely used in the world, since the first true ancestor of modern RFID Patent (U.S. Pat. No. 3,713,148) to Cardullo, et al. in 1973 and the first patent associated with the abbreviation RFID was granted to Walton, et al. in 1983 (U.S. Pat. No. 4,384,288). Recent U.S. Pat. No. 7,928,965 to Rosenblatt, et al, a RFID chips in Apple's iOS devices that will enable such things as wireless transfers of data from an iPhone to a desktop with just a simple shaking motion or even allow a user to open up a keyless home or car door with a simple swipe.

A RFID tag not only provides the unique identification number, also it can be read within a certain range wirelessly. This special advantage can really help to solve the problem that a ZigBee End Device can't be read, even though you personally face it or hold the ZigBee End device in your hand, except read them via a network system.

These above cited references teach some common features, disclose irrigation systems or specific devices that attempt to provide underground irrigation, data collection and remote control technology. However, these references, on the other hand, revealed that there still are many problems related to underground irrigation, of which made the underground irrigation still to be difficult and even impossible. These limitations and related problems, for example, are listed as the followings:

1. Nearly all cited patents are still use high pressure to force the water into the soil via all kind of their designed devices;

2. None of these disclosures shows a method how to make the underground irrigation to be visible or to be hearable, or the water volume in an individual device can be measurable at a real time and real-location manner;

3. None of these cited patents or patent applications showed that the underground irrigation device can be changeable or repairable without digging if the underground irrigation device is damaged;

4. None of these cited patents teaches an efficient and convenient way how to monitor and how to remote control each individual underground irrigation device or a group of underground irrigation devices and how to collect data from each individual or a group of underground irrigation devices;

5. None of these cited patents does consider how to use underground irrigation device to help underground soil and plant root respiration, especially how to use underground irrigation device to obtain enough fresh air for plant roots and soil respiration. Plant and soil respiration is an important issue, as important as irrigation and fertilization, because plant root respiration directly affects plant growth and fruit yield;

6. None of these issued patents or published patent applications provides an universal unique label used for each individual underground irrigation device and the plant. Furthermore, the universal unique label can be read by a RFID reader or a barcode reader or can be read in person directly;

Still there are more other issues directly or indirectly related to the underground irrigation, fertilization and plant respiration, which are beyond our scope of the present patent application.

SUMMARY OF THE INVENTION

The present invention application describes a multifunctional underground irrigation system for providing underground irrigation, fertilization and underground soil and plant roots respiration. As an important component of the system, the underground irrigation, fertilization and the respiration of the soil and plant roots device (hereinafter, UIFR device) has been carefully detailed in several ways, especially for those important key functional parts, such as the top portion, the lower portion and the linkers used to link the top and lower portion together to form the UIFR device. In order to monitor the UIFR device and the consequent of the underground irrigation, fertilization and the respiration of the soil and plant roots, three monitoring devices and sample channels are well described in the embodiment. The unique universal label makes all data collected from the field or potted plants to be real time and real-location of individual UIFR device and the adjacent plant. A movable device is further employed to calibrate the water supply system and to correct errors from all collected data for true precision management in agriculture and the horticulture.

In one or more aspects of the embodiment of the present invention application details top portion structure of the UIFR device. Two containers with two lids are used for housing the water supplied from the water supply tubular structure. One first air/gas releasing tubular structures is employed in the first water container to allow all pressure and air/gas releasing from the first and the second water containers, the funnel water container and the anti-clogging water percolating and air/gas effusion/diffusion device (hereinafter AWPAE device) via the second and third pressure and air/gas releasing tubular structures. This is a key issue for underground irrigation to have one or more than one way to allow the pressure and air/gas being released from the UIFR device and soil, of which resulted the water percolating or dripping into the soil in plant roots area freely.

In one or more aspects of the embodiment of the present invention application, a water drip speed controlling device and a water flow rate controlling device are detailed. These two devices are used to slow down and adjust the water to enter the soil from the UIFR device for different plant and different soil texture.

In order to let the water in the first and the second water container to percolate or to drip easily into the top, middle and deep root area, the drip speed controlling device is made of different filters to allow the water to drip into the funnel water container. In case, the water drip speed become too slow, the water flow rate controlling device can be used to speed up the water enter the funnel water container. The water drip controlling device and water flow rate controlling device are used to control the water percolation speed. These two devices enable an individual UIFR device to be used for different soil texture and in different seasons for a plant at different development and growth stage accordingly as desired.

In accordance with another aspect of the present invention application, there is an adjustable anti-clogging bio-trap device (hereinafter, AAB device) connected with the first water container via the connection structure of the funnel water container. As detailed in the present embodiment through various figures, one AAB device connected with the first water container can created 18 watering programs and methods to water the one side of the top, the middle or the deep roots area for a plant. The second AAB device connected with the second water container can create 18 watering programs and methods to water the other side of the top, the middle or the deep roots area for the same plant. The combination of the first AAB device with the second AAB device can create 324 programs and methods to water a plant roots in the top, middle and deep soil. The changeable watering programs and methods result the plant roots to have to change their growing direction, because of their positive hydrotropic feature of plant roots growth. In fact, it is a bio-trap by changing the watering way to led the plant roots change their growing direction and further to prevent plant roots to clog the AWPAE device. As one of the direct results, this will help plant roots to develop in all directions. The hollow structure of the shaft of the AAB device to form a third pressure and air/gas releasing tubular structure is another feature. It allows the pressure and air/gas to be continuously released from the AWPAE device and the soil in the root area when the water is uninterrupted percolating or dripping into the soil. The combination of AAB device with AWPAE devices results the water from the AWPAE device to be easily and slowly percolated or dripped into the top, middle and deep root area.

In one or more aspects of the embodiment, the present invention application details the first, second and third pressure and air/gas releasing tubular structures together form the fresh air and soil gas exchange channels so that solve the difficult for roots and soil to release $CO_2$ and gas and have enough fresh air for their respiration activities. These three pressure and air/gas releasing channels together further formed an important anti-flooding structure to prevent plant death or plant damage caused by flooding due to heavy rain or other natural reason. That is why we have repeatedly stressed that, in addition to stress and air/gas is a key obstacle to underground irrigation, the root respiration is as important as fertilizer and water for plant development and growth.

In one or more aspects of the embodiment, the present invention application details the AWPAE device, as called the lower portion of the UIFR devices. These devices are buried into the top, middle and deep soil and are further used to supply water for plant roots. In order to prevent plant roots to clog the water conduction channel and pressure and air/gas conduction channel, two filters are employed in the AWPAE device to form two rooms. These two rooms will be occupied by air after the water percolating or dripping into the soil, since plant roots can't grow in the air. Therefore, both the water conduction channel and the pressure and air/gas conduction channel in the top room are well protected. As long as these two channels are not clogged, the water will be sent to the roots area and the pressure and air/gas will be released from the soil and the AWPAE device.

In one or more aspects of the embodiment, the present invention application introduces how to avoid digging the AWPAE device out from the soil for repair. Two groups of AWPAE devices are used in each UIFR device, one for working group and one for reserved group. Both the working group and the reserved group can be exchanged as needed so that no digging at all. The total number of AWPAE device in each UIFR device are decided by the total numbers of water channels on the second and third tubular structure in the AAB device. Accordingly as detailed in the embodiment, the way to turn the reserved group into working group or replace any damaged parts and the process to repair or replace a part in the UIFR device has been well detailed by using both the literal and the figures with different perspective views.

In one or more aspects of the embodiment of the present invention application, the linkers, linked the top portion with the lower portion together to form the UIFR device, are used for water conduction channel and for the air/gas conduction channels. The water conduction channel allows the water to drip or flow from the top portion to the AWPAE devices. The pressure and air/gas conduction channels release the pressure and air/gas from the AWPAE device to the first water container and the second water container during water drip or flow into the AWPAE device. During the process of water percolating into the soil, the fresh air is inhaled into AWPAE device via both the water and the air/conduction channels. By using their top structure, both the water conduction channel and air/gas conduction channel are easily to be connected with the matched water and pressure and air/gas channels on the second tubular structure of the AAB device. Both threaded end portion of the water and air/gas conduction channels are also easily to be screwed with the AWPAE device and finally to form the UIFR device for underground irrigation.

In one or more aspects of the embodiment, the present invention application also details two of many ways that an UIFR device can be used for indoor or outdoor potted or container cultured big or small plants. The additional overflow water container for an UIFR devices is used not only to protect the plant but also to protect furniture, household or office equipment and documents. Each UIFR device and each plant can be monitored by using a fully equipped ZigBee terminal device and various sensors. The total amount of water in the UIFR equipment can be seen in person, or by using a ZigBee End Device in conjunction with a variety of sensors to learn more about the amount of water that penetrates into the soil at real time and real location. With ZigBee technology, the remote control and programming control of each UIFR device makes the fruit trees culture at commercial scale in the field or for potted ornamental plants for indoor or outdoor to be more efficient for precision management. The combination of both the ZigBee technology with universal unique RFID label technology will make it possible to identify each individual UIFR device and plant in the field for management.

In one or more aspects of the embodiment, the present invention application specifically illustrates three indicators used to monitor each of UIFR devices in the field or for potted plant, including a movable red flag indicator, an LED indicator device, and a wireless and remote monitor device. Each of these three indicators is used to monitor each of all UIFR devices operating status. Each of the specific indicating devices allows that the water flow into UIFR device to be seen, for example, the movable red flag indicator or the LED light indicator combined with the sensor; or the ZigBee technology wirelessly transmitted and viewed by computer or similar. Each indicator can further monitor the time required for each device to be filled with the water and the time required for water to penetrate into the root zone and soil. All of the data obtained from these three indicators will help to make precise decisions about the real-time and real-location accuracy management of each plant and each UIFR device in large commercial scale. The various sensors designed for LED lights and the watering data collecting (hereinafter, WDC) devices linked with a Zigbee® device make data collection from underground device to be possible and more simple. Therefore, the underground irrigation process can be checked either manually in person or wirelessly and automatically using the WDC device linked with a Zigbee® device via the data center system for each UIFR device. In addition, the combination of ZigBee technology and UIFR device makes it possible to wirelessly monitor and remotely control each underground irrigation device at real time and real-location for each plant.

In accordance with another aspect of the present invention application, a three-in-one data collector or similar device which is systematically allowed and supported is used to remote control each UIFR device watering or to stop watering a plant as desired. All collected data via the WDC device linked with a Zigbee® device can be downloaded to the data collector or transferred by individual WDC device linked with a Zigbee® device directly to the ZigBee coordinator in the data center or via the numerous ZigBee routers to the ZigBee coordinator in the data center. All collected data can be viewed via website wirelessly or any other convenient way systematically allowed and supported by the data system. In the precise management of horticulture and agriculture, it is important to know how much fertilizer and how much water have being used for each plant. The present invention application provides the possibility for accurate management of large-scale commercialization of horticulture and agriculture through the application of underground irrigation systems and real time and real-location information and data.

In one or more aspects of the embodiment, the present invention application provides and describes an universal unique label used for each UIFR device and plant. The universal unique label comprise of six parts. A universal unique label that can be read in three ways, including read by RFID reader, read by Barcode reader and direct read the human readable parts. It is a great advantage to have an universal unique label for precision management of cultured plants at commercial scale or small scale. The first to fifth parts or the barcode reader readable part or human readable part are the key to allow further to read the sixth part for either the individual plant data or the individual UIFR device data. The data for each plant provide brief but very clear original information. For the individual UIFR device, the unique label not only provides the UIFR device location data in the field, also provides the manufacturer data which is convenient for back order or new part order.

In one or another aspects of the embodiment, the present invention application discloses various sampling structures used to monitor the top, the middle and the deep soil pH value, soil nutrition contents, soil water content and soil temperature and other related factors in the root area. By using the first pressure and air/gas releasing tubular structure, both the fresh air and the gas exchange rate can be analyzed for each individual plant. All obtained data and information can direct help for making a precision management decision in horticulture, and the same for scientific research for different objects related to the underground irrigation, fertilization and respiration of the soil and the plant roots, and many other related specific approaches.

In one or another aspects of the embodiment, the present invention application describes a movable controlling device used to monitor water supply system and correct or calibrate each UIFR device or a group of UIFR devices in the field or all UIFR devices in one site of a facility.

Accordingly, it has been determined that the need exists for a multifunctional underground irrigation system with various anti-clogging function, which can be monitored, remote controlled. Each UIFR device is needed to be well labeled with an unique label which allows data collection devices or using ZigBee technology for data collecting at real time and real-location manner for precision management of horticulture and agriculture. Importantly the multifunctional underground irrigation system is really to overcome all aforementioned limitations.

BRIEF DESCRIPTION OF THE DRAWING

FIG. 3D to 3G are front, sectional and perspective views to detail the structure of the water flow rate speed controlling device.

FIG. 3H is a perspective view to show the second pressure and air/gas releasing tubular structure, of which is shared by both of the water drip speed controlling device and the water flow rate speed controlling device.

FIG. 4A to FIG. 4D are perspective, front, sectional and exploded views to detail the funnel like structure and the way to connect the first water container, the second water container and the AAB device.

FIG. 5A to FIG. 5I are various perspective view, exploded view, bottom view, top view and sectional views to detail the structures of the AAB device and the structure of each part in the AAB device.

FIG. 8A is an exploded perspective view to show the structure of the red flag indicator used to monitor the UIFR device working states.

FIG. 8B to FIG. 8H are perspective, sectional and schematic diagrams to detail the structure of the LED lights indicator used to monitor an UIFR device working states.

PREFERRED EMBODIMENT AND DETAILED FOR THE INVENTION

Figure 1:
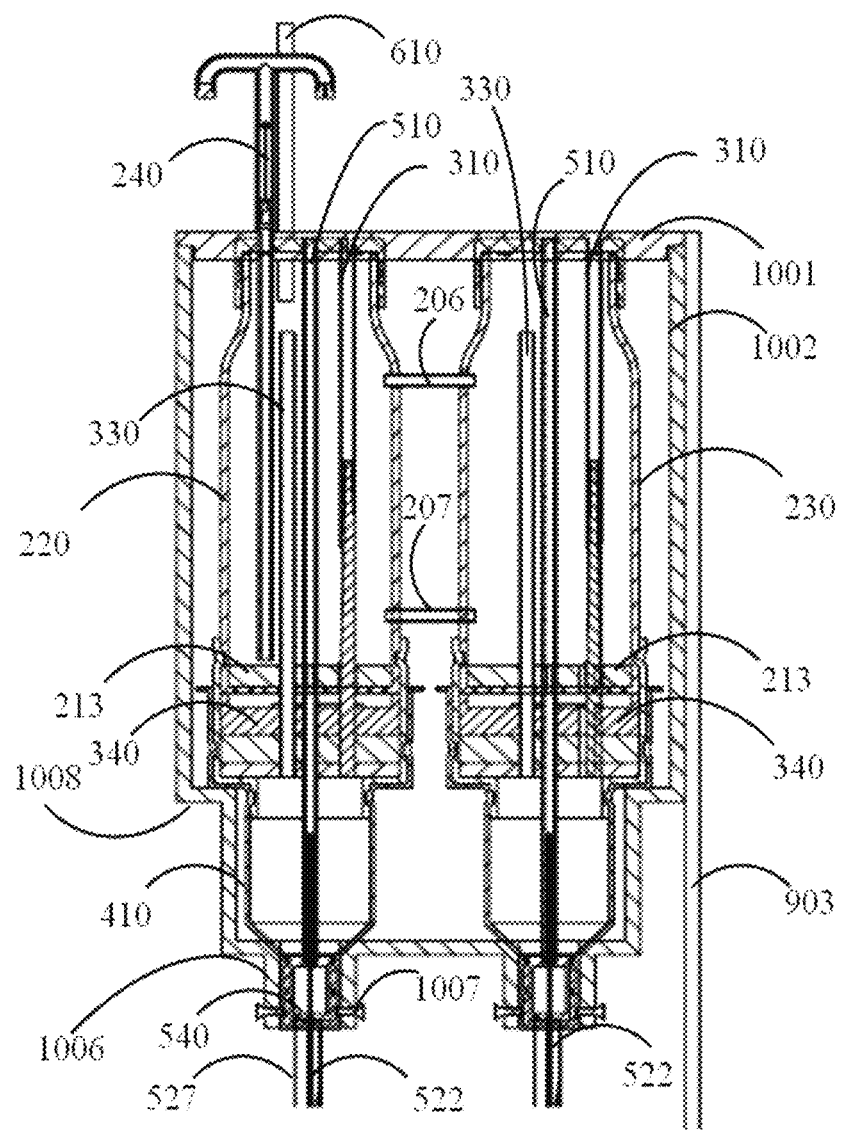
FIG. 1 is a sectional view of the top portion of the UIFR device.

Detail descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled on the art to employ the present invention in virtually any appropriately detailed system, structure or manner. Referring to the drawing figures, like reference numerals designate identical or corresponding elements throughout the several figures.

FIG. 1 is a sectional view of the top portion of the underground irrigation, fertilization, and respiration device (hereinafter UIFR device 750). The water inletting tubular structure 610 allows the water flowing from the water supply conduit into the first water container 220 and the second water container 230. The first pressure and air/gas releasing tubular structure 240 allows the pressure and the air/gas to be released from the first water container 220 and the second water container 230 to the atmosphere during the water is flowing into the containers. The second pressure and air/gas releasing tubular structures 330 allows the pressure and air/gas in the funnel water container 410 to be released to the atmosphere via the first pressure and air/gas releasing tubular structure 240. The reference numbers 510 represent the shafts of the adjustable anti-clogging bio-trap devices (hereinafter AAB device and see FIG. 5A to 5I for detailed structures). The shaft 510 is a hollow structure with pores on its top portion to form the third pressure and air/gas releasing tubular structure 521 (see FIGS. 5A, 5B and 5F for details). The third pressure and air/gas releasing tubular structure allows the pressure and air/gas in the soil and in the root area to be released to atmosphere through the first pressure and air/gas releasing tubular structure 240 via the anti-clogging water percolating and air/gas effusion and diffusion device (hereinafter AWPAE device 700, see FIGS. 7A and 7B for detail structures).

The reference numbers 310 represents the shaft of the water flow rate controlling device. Both the first water container 220 and the second water container 230 have a filter 213 to prevent any sand or any other unsolved particles from the clogging the pores on the bottom of each of the containers. The water drip speed controlling device 340 is used to control the water drip speed from the first water container 220 and the second water container 230 to the funnel water container 410 and further to the soil in the root area. The funnel water container 410 is a container for housing the water from the first water container 220 and the second water container 230 via the water drip speed controlling device 340. The funnel water container 410 is further fastened with the second tubular structure 530 (see FIGS. 5A and 5D for details) in the adjustable anti-clogging bio-trap device (hereinafter, AAB device). The tubular connecting structure 207 links the first water container 220 and the second water container 230 at the lower portion to form the water overflow way to allow the water flow from the first water container to the second water container.

The tubular connecting structure 206 links the first water container 220 and the second water container 230 at the top portion to form the pressure and air/gas releasing way to allow the pressure and air/gas releasing from the second water container to the first water container or fresh air from the first water container 220 to the second water container 230. The sample channel 903 is used to monitor the soil water content, nutrition content and pH value in the root area. The top portion of the UIFR device 750 is further placed into a protection box 1002, of which is covered with a lid 1001. The third tubular structure 540 is fastened with the tube 1006 in the bottom of the protection box 1002 by using the screw 1007. The step bearing structure 1008 of the protection box is used to mate with the step bearing structure 413 in the middle of the funnel water container 410 and further to hold first and second water containers. The water conduction channels 527 and the air/gas conduction channels 522 are further used to link the lower portion of the AWPAE device 700 (see FIG. 7A and FIG. 7B for detail structure) with the top portion to form an underground irrigation, fertilization and respiration device.

Figure 2A:
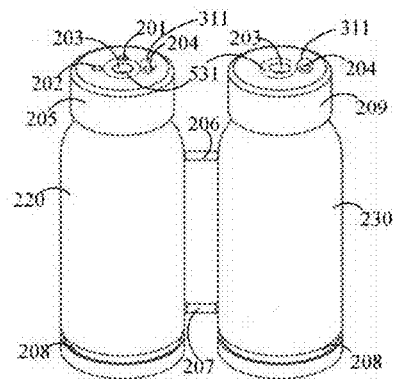
FIG. 2A to FIG. 2H are various perspective, front and exploded views to detail the structure of the first and the second water containers and the related structures.

FIG. 2A is a perspective view of the first water container 220 and of the second water container 230. The lid 205 used for the first water container 220 has four penetrative holes 201, 202, 203 and 204 for housing four different tubular structures and shafts. The penetrative hole 201 is used to house the water inletting tubular structure 610 to allow the water to flow into the first water container 220 directly and further to the second water container 230 via the water overflow way 207. The penetrative hole 202 is used to hold the first pressure and air/gas tubular structure 240 for the pressure and the air/gas releasing from the first water container 220 and the second water container 230 via the pressure and air/gas diffusion/effusion and releasing way 206 during the course of the water flowing into both containers, 220 and 230. The third penetrative hole 203 is used to hold the shaft 510 of the AAB device 500 (see FIGS. 5A and 5B for detail). The fourth penetrative hole 204 is used for holding the shaft 310 of the water flow rate controlling device 350 (see FIG. 3B for detail). The lid 209 for the second water container 230 has two penetrative holes, 203 and 204, for housing the shaft 510 of the AAB device 500 and for housing the shaft 310 of the water flow rate controlling device respectively.

The pressure and air/gas releasing way 206 links the first water container 220 and the second water container 230 together to allow the pressure and air/gas to exchange between the first water container and the second water container. The water overflow way 207 allows the water to flow from the first water container 220 to the second water container 230. The water overflow way 207 can be located at different vertical positions under the location of the pressure and air/gas releasing way 206 on the first water container 220 and the second water container 230. There are two shallow recess grooves 208 at the lower portion of the first water container 220 and the second water container 230. Each of the shallow recess grooves 208 is used to house a sealing washer first and then to mate with the shallow recess groove 306 on the upper portion of the vessel 320 (as showed in FIG. 3B) and the vessel 320 will fasten with the first water container 220 and the second water container 230 by using a plastic zip tie.

Figure 2B:
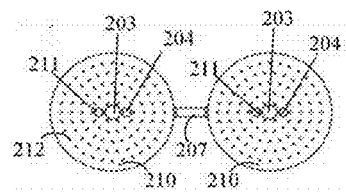

FIG. 2B is a bottom view of the first water container 220 and of the second water container 230. The bottoms 210 of the first water container 220 and the second water container 230 have three penetrative holes 211, 203 and 204 respectively. The penetrative hole 211 is used to house the second pressure and air/gas tubular structure 330, which allows the pressure and air/gas in the funnel water container 410 to be released to the top portion of the first water container 220 and the second water container 230, and further to be released to atmosphere via the first pressure and air/gas releasing tubular structure 240 during the water flowing into the containers. The pressure and air/gas in the second water container 230 will be released to the atmosphere via the pressure and air/gas releasing way 206 and the first pressure and air/gas tubular structure 240. The penetrative hole 203 and 204 are respectively used to hold the shaft 510 of the AAB device 500 and the shaft 310 of the water flow rate controlling device. The numerous pores 212, at the size of 0.2 mm to 0.5 mm in diameter, allow the water to pass through the bottom 210 of the first water container 220 and the second water container 230 and further to the funnel water container 410 via the water drip speed controlling device 340 or the water flow rate controlling device 350 or both simultaneously.

Figure 2C:
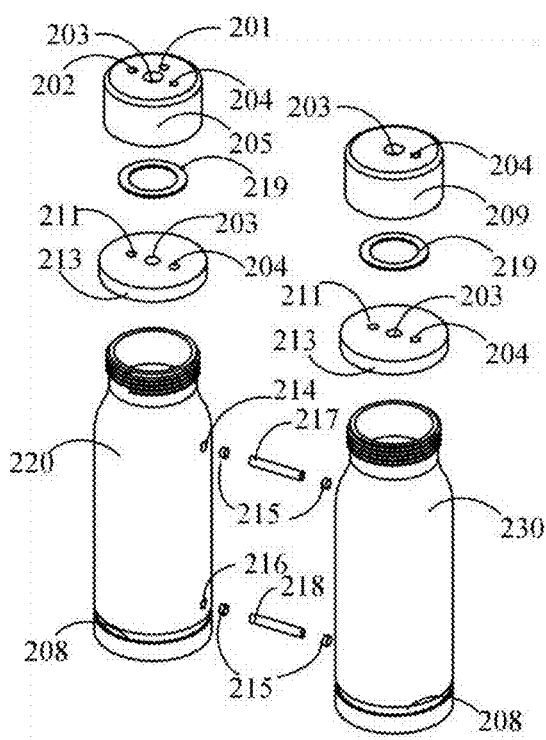

FIG. 2C is an exploded perspective view of the first water container 220 and the second water container 230. The two sealing washers 219 are used to seal each of the first water container 220 and the second water container 230 with the lid 205 and the lid 209. There are two penetrative holes, 214 at the upper lateral wall of the first water container 220 and the corresponding position of the second water container 230 (not shown here due to the position of the second water container 230). These two holes are used to house the sealing washer 215 and the twistable tubular connecting structure 217 to form the pressure and air/gas effusion/diffusion releasing way 206 as showed in FIG. 2A. The water overflow way 207 (see FIG. 2A) consists of two seal washers 215 and one twistable tubular connecting structure 218 to jointly link the first water container 220 and the second water container 230 together via the penetrative holes 216 on the lower lateral wall of the first water container 220 and the second water container 230.

The overflow way 207 (see FIG. 2A) allows the water flows from the first water container 220 to the second water container 230. The filters 213 are used to prevent any particles or sands or other tiny solid materials in the water to clog the pores 212 on the bottom 210 of the first and second water containers and any other structure in the UIFR device 750. All holes on the lid 205 and 209 are same as explained in FIG. 2A. The penetrative hole 211 is used to house the second pressure and air/gas tubular structure 330. The penetrative hole 203 and 204 are respectively used to hold the shaft 510 of the AAB device 500 and the shaft 310 of the water flow rate controlling device. Each of the shallow recess grooves 208 is used to house a sealing washer first and then to mate with the shallow recess groove 306 on the upper portion of the vessel 320.

Figure 2D:
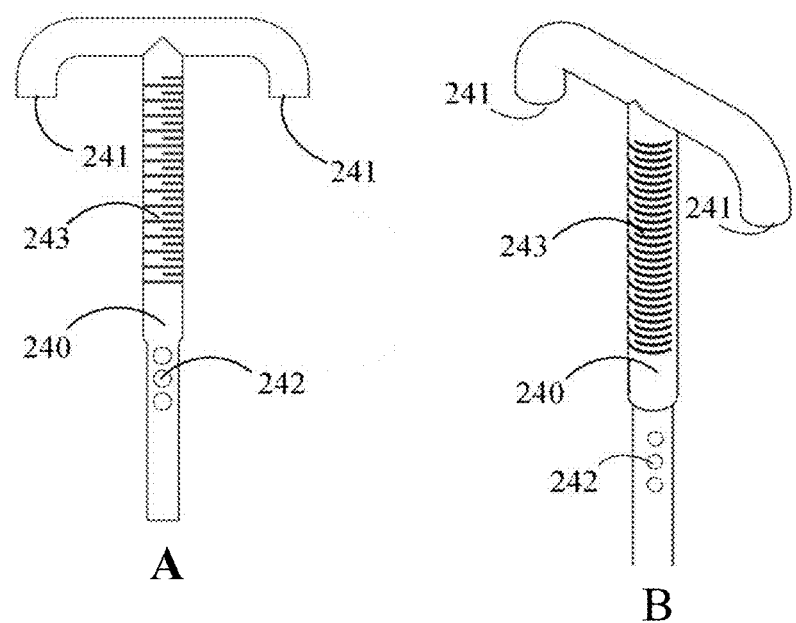

FIG. 2D is a front view of the first pressure and air/gas releasing tubular structure (a) and a perspective view of the first pressure and air/gas releasing tubular structure (b). The first pressure and air/gas releasing tubular structure 240 is the main channel for the pressure and air/gas releasing from the first water container 220 and the second water container 230. The first pressure and air/gas releasing tubular structure 240 comprises two air releasing tubes 241 downwards to land, which will prevent bacteria, fungus or spores from the plant root. The penetrative holes 242 at the middle portion of the first pressure and air/gas releasing tubular structure 240 is the channel for pressure and air/gas releasing from the first water container 220 to the atmosphere during the water flowing into the container and the fresh air inhaling from the atmosphere during the water percolating into the soil. Reference number 243 is the scale used to monitor the water level or water volume in the containers and the water percolating speed from the containers to the soil.

Figures 2E, 2F, 2G, 2H:
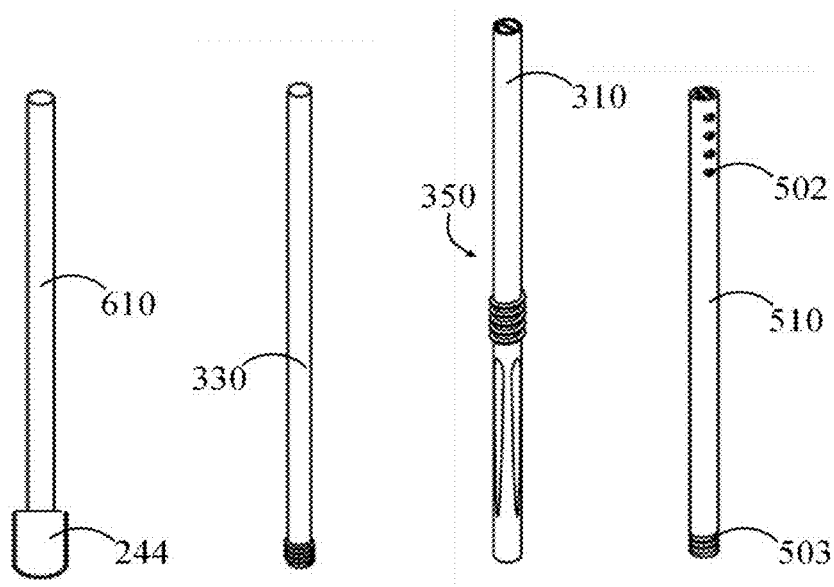

FIG. 2E is a front view of the water inletting tubular structure 610 with a stop part 244 to prevent the water inletting tubular structure 610 out from the first water container.

FIG. 2F is a front of view of the second pressure and air/gas releasing tubular structure 330.

FIG. 2G is a front view of the shaft 310 of the water flow rate controlling device 350.

FIG. 2H is a front view of the shaft 510 of the AAB device 500 and detailed structures are showed in FIGS. 5A and 5B. The shaft 510 is also used as the third pressure and air/gas releasing tubular structure linked with the air/gas conduction channel.

Figure 3A:
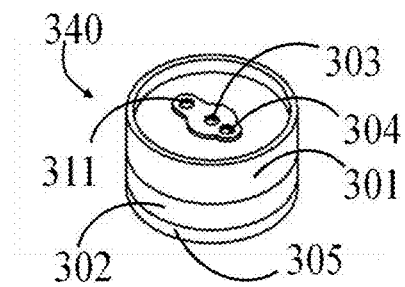
FIG. 3A to FIG. 3C are perspective views to detail the water drip speed controlling device structures.

FIG. 3A is a perspective view of the water drip speed controlling device 340. The water drip speed controlling device 340 comprises of a first filter 301, a second filter 302, a third filter 305 and three penetrative holes, 311, 303, and 304, for housing the second pressure and air/gas releasing tubular structure 330, the shaft 510 of the AAB device 500 and the shaft 310 of the water flow rate controlling device 350. The first filter 301 is a shallow container to receive water from the connected first and second water containers, 220 and 230. All three filters, 301, 302, and 305 are made of different materials to form water drip speed controlling device 340.

Figure 3B:
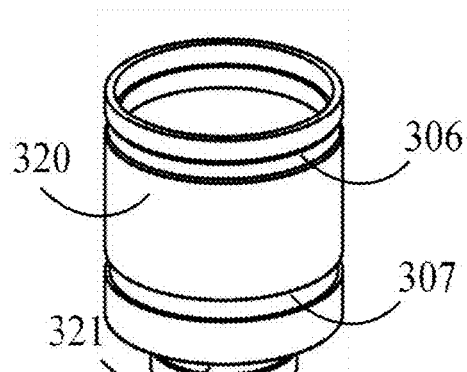

FIG. 3B is a perspective view of the vessel 320 used to house both of the water drip speed controlling device 340 and the water flow rate controlling device 350. The top shallow recess groove 306 is used to fasten with the shallow recess grooves 208 on the first water container 220 and the second water container 230. The shallow recess grooves 307 and 321 on the vessel are further used to connect with the shallow recess grooves 403 and 404 on the funnel water container 410.

Figure 3C:
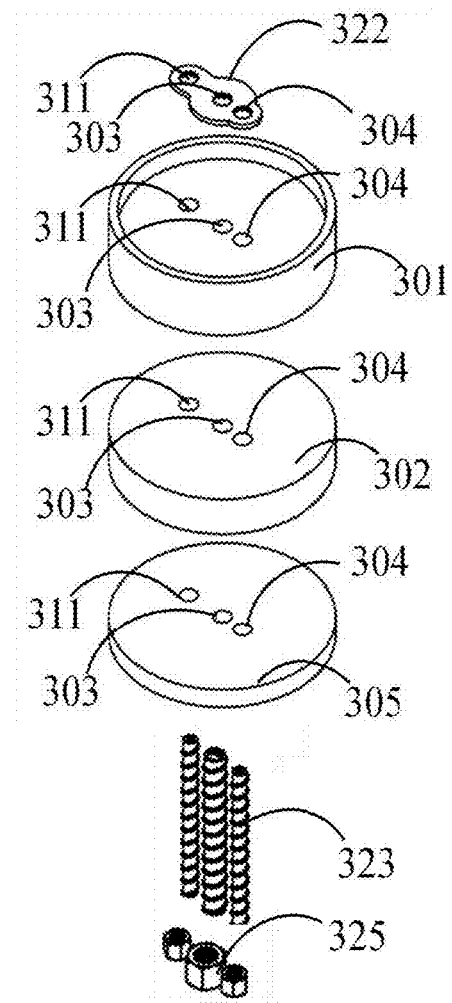

FIG. 3C is an exploded view of the water drip speed controlling device 340 to detail each of the parts with each of the penetrative holes. The binder 322 has three threaded penetrative holes, 311, 303 and 304. These three threaded penetrative holes are used to screw with three threaded penetrative binder bolts 323 and further to screw with the three threaded nuts 325 and finally to keep all three filters, 301, 302 and 305, together to form the water drip speed controlling device 340. The penetrative hole 311, on the binder 322, the first filter 301, second filter 302 and the third filter 305, is used to screw with the second pressure and air/gas releasing tubular structure 330. In fact, the second pressure and air/gas releasing tubular structure 330 is shared by both of the water drip speed controlling device 340 and the water flow rate controlling device 350 to allow the pressure and air released from the funnel water container 410. The penetrative holes, 303 and 304, are used to house the shaft 510 of the AAB device 500 and the shaft 310 of the water flow rate controlling device 350.

Figures 3D, 3E, 3F:
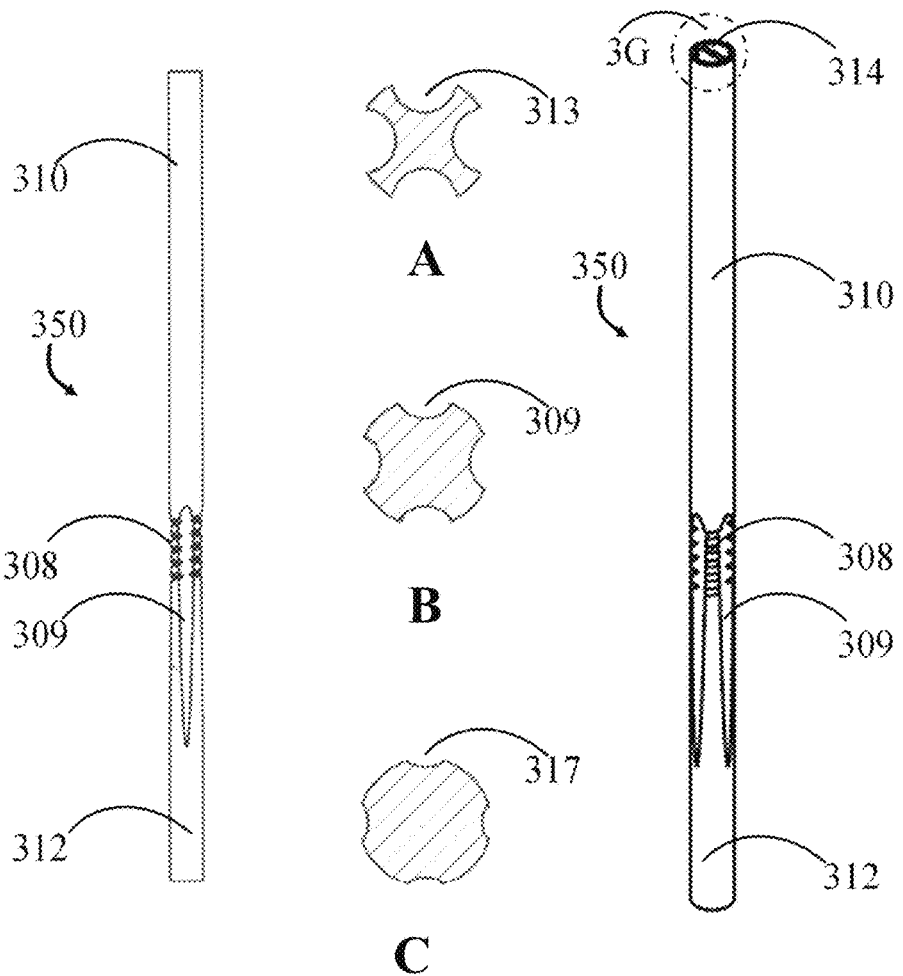

FIG. 3D is a front view of the water flow rate controlling device 350. The water flow rate controlling device 350 comprises of a long shaft 310 with threads 308 with different sizes of groove 309, the water stopper 312 and of the second pressure and air/gas releasing tubular structure 330 to form the water flow rate controlling device.

FIG. 3E (a) is a section and cut away view of the water flow rate controlling device to show that the water flow rate controlling device 350 will be very fast when the deepest and widest groove 313 is rotated out of the third filter 305.

FIG. 3E (b) is another section and cut away view of the water flow rate controlling device 350. When the middle part of the groove 309 is rotated out of the third filter 305, the water flow rate will be in the moderate rate.

FIG. 3E (c) is the third section and cut away view of the water flow rate controlling device 350. The water flow rate will be very slow due to the groove 317 is the most narrowest and shallowest part in the water flow rate controlling device 350, which limits the water to pass through.

FIG. 3F is a perspective view of the water flow rate controlling device 350. The screw 314 is used to adjust different parts of the grooves on the water flow rate controlling device 350. The broken circle line 3D illustrates the method to use the screw driver to adjust the water flow rate according to the scale as showed in FIG. 3G.

The water flow rate controlling device 350 is a special design used to adjust the water flow rate, especially used to speed up the water percolation speed when the water drip speed is too slow by using water drip speed controlling device 340 only. As showed in FIG. 3A to FIG. 3F above, both the water drip speed controlling device 340 and the water flow rate controlling device 350 are repairable or replaceable whenever they are damaged or work improperly and abnormally.

FIG. 3G is a top view of the disc-shaped guiding plate 311 used to direct the adjustment of the water flow rate controlling device 350. The screw 314 can be driven by a screw driver to adjust the water flow rate. When the screw with arrowhead points to "00", it means the water from the first water container 220 and the second water container 230 to the funnel water container 410 is only through the water drip speed controlling device 340, or the water flow rate controlling device 350 is at non-functional status. If the water speed from water drip controlling device 340 is too slow for any reason, it will be necessary to turn on the water flow rate controlling device 350 according to the information obtained from the first movable red flag indicating device 800, or/and from the LED light indicating device 850 or/and from the wireless and remote monitoring indicating device 880.

If the low flow rate is selected, the screw 314 on the tiptop of the shaft 310 must turn one lap clockwise, to turn from disc-shaped guiding plate "00" to the disc-shaped guiding plate "300". If the middle flow rate is selected, rotating the screw 314 clockwise to turn two laps from "00" disc-shaped guiding plate to the number "500" as referenced by 319. The disc-shaped guiding plate 311 is fixed at the top of the lids 205 and 209 surrounding the penetrative hole 204 to house the tiptop 315 of the shaft 310. The disc-shaped guiding plate 300, 500 or 800 mean and indicate 300, 500 or 800 water drips per minute or 15 ml, 25 ml or 40 ml water per minute to flow from the first water container 220 and the second water container 230 to each of the connected the funnel water container 410. The flow rate can be adjusted by selecting different sizes of water flow rate controlling device 350 according to the soil textures and the different plants at different seasons in the different area accordingly. The screw 314 on the tiptop of the shaft 310 is clockwise turned by using a screwdriver and the groove 309 will be screwed out from the water drip speed controlling device 340. Consequently, the water will flow from the groove 309 to the funnel water container 410.

FIG. 3H is a perspective view of the second pressure and air/gas releasing tubular structure 330, which allows the pressure and air/gas in the funnel water container 410 to be released from the tiptop 315 to the first water container 220 and the second water container 230. The second pressure and air/gas releasing tubular structure 330 is housed in the penetrative hole 311 via the threaded end 316 with the water drip speed controlling device 340. The second pressure and air/gas releasing tubular structure 330 is shared by both the water drip speed controlling device 340 and the water flow rate controlling device 350 for pressure and air/gas releasing from the funnel water container 410. As the pressure and air/gas releasing from the funnel water structure 410 via the second pressure and air/gas releasing tubular structure 330, the water, either drips from the water drip speed controlling device 340 or flows from the water flow rate controlling device 350, will flow easily to the funnel water container 410 without any pressure or air/gas resistance.

FIG. 4A is a perspective view of the funnel water container 410. The funnel water container 410 is a container for housing the water from the water drip speed controlling device 340 and water flow rate controlling device 350. The funnel water container 410 is also a connector for conjunction the AAB device 500 with each first and second water containers, 220 and 230. There are three shallow recess grooves, including the upper portion 403, the middle portion 404 and the lower portion 405 on the funnel water container 410. Both the top shallow recess groove 403 and the middle shallow recess groove 404 are used to match with the shallow recess grooves 307 and 321 on the vessel 320 as showed in FIG. 3B.

The shallow recess groove 405 in the lower portion of the funnel water container 410 is used to fasten with the shallow recess groove 507 on the second tubular structure 530 (see FIGS. 5A and 5B for detail). The half flange plate 402 with four penetrative holes 401 are used to hold the funnel water container 410, the water drip speed controlling device 340 and water flow rate controlling device vessel 320, the first water container 220 and the second water container 230 by wires (not drawing out) to the top portion of the wall of the protecting container 1002. This will prevent each of these mentioned parts from damage due to the heavy weight when all water containers filled with water.

Figure 4B:
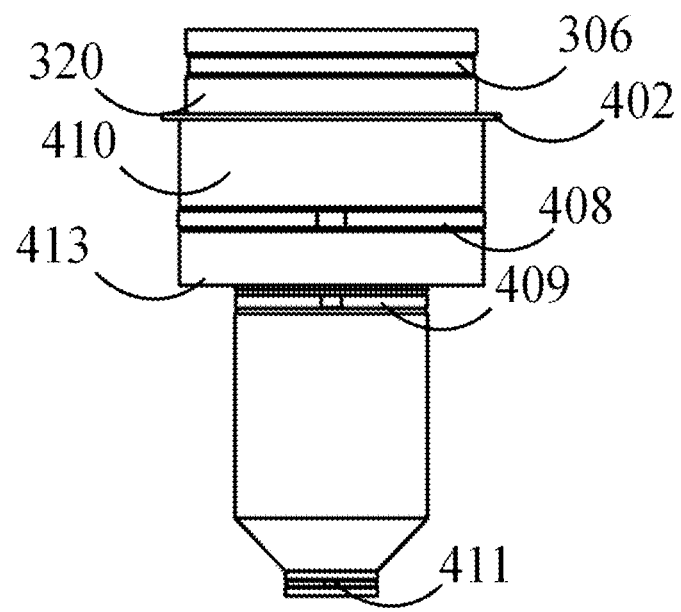

FIG. 4B is a front view of the well assembled of the water drip and water flow rate controlling device vessel 320 and the funnel water container 410. The shallow recess groove 306 of the vessel 320 is used to fasten with each of the shallow recesses grooves 208 on the first water container 220 and the second water container 230. The half flange plate 402 is used for holding the upper portion of the UIFR device 750 by using wires to couple with the hook on the inner protecting container wall 1002. The zip ties 408, 409 and 411 are used to fasten each of the mated shallow recess grooves together. The step bearing structure 413 is matched with the step bearing part 1008 as showed in FIG. 10A for the second way to protect the UIFR device 750 from damage due to the heavy weight when filed with the water.

Figure 4C:
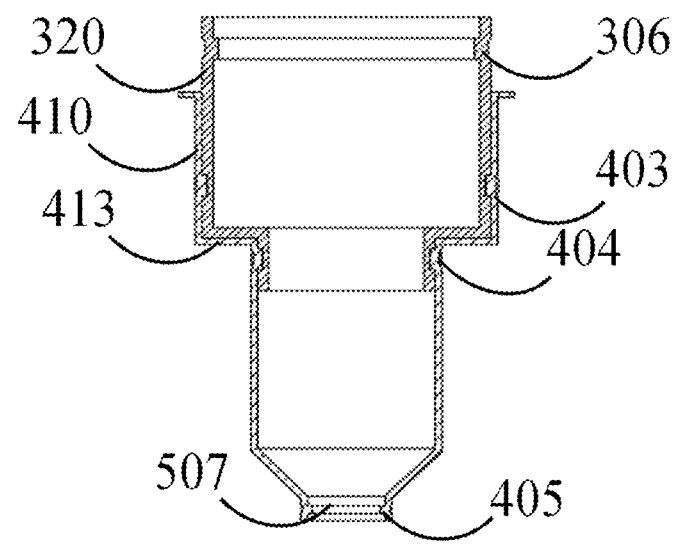

FIG. 4C is a cut away view of the well assembled water drip and flow rate controlling device vessel 320 and the funnel water container 410. The shallow recess groove 306 is used to mate with the shallow recess grooves 208 on the first water container 220 and the second water container 230. The shallow recess grooves 403 and 404 on the funnel water container 410 jointly matched with corresponding shallow recess grooves 307 and 321 on the vessel 320. The shallow recess groove 405 on the funnel water container 410 is jointly fastened with shallow recess groove 507 on the second tubular structure 530 (see FIGS. 5B and 5D for details). The step bearing structure 413 matched and further held by the step bearing structure 1008 as showed in FIGS. 1 and 10A for the second way to protect the UIFR device 750 from damage due to the heavy weight when filed with the water.

Figure 4D:
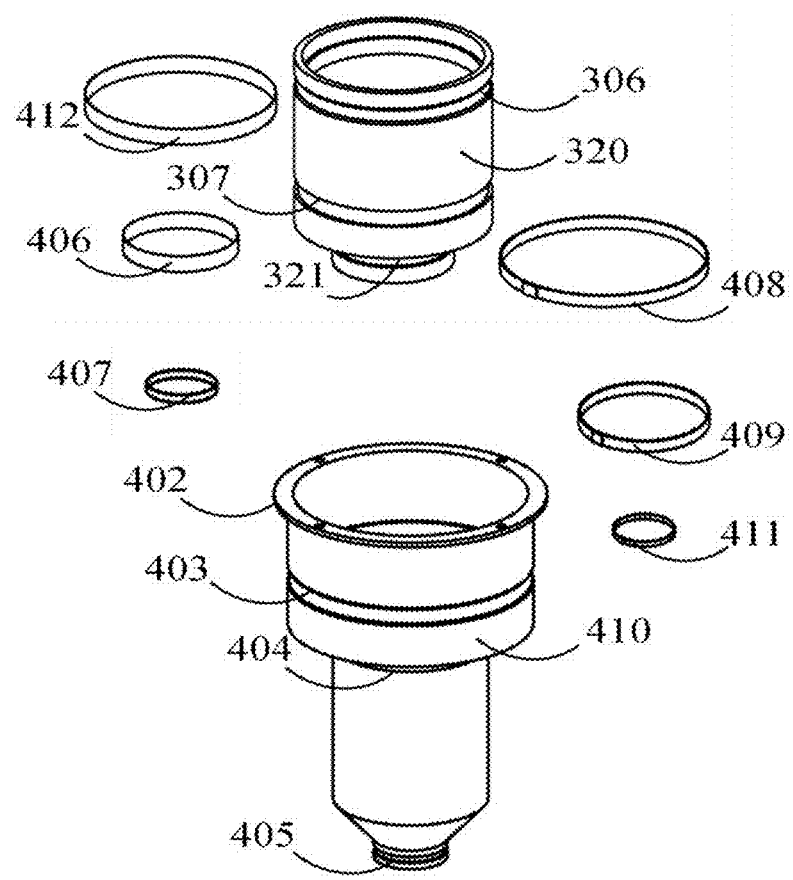

FIG. 4D is an exploded perspective view of the water drip speed and flow rate controlling device vessel 320 and the funnel water container 410 as showed in FIG. 4B. The sealing washer 412 is placed between the mated shallow recess grooves 307 and 403 and the mated shallow recess grooves are further fastened by the plastic zip tie 408. The sealing washer 406 is placed between the mated shallow recess grooves 321 and 404. The matched shallow recess grooves 321 and 404 are further fastened by plastic zip tie 409. The sealing washer 407 is placed between the mated shallow recess grooves 507 on the second tubular structure 530 and 405 on the funnel water container 410. Both the second tubular structure 530 and the funnel water container 410 are firmly fastened together by the plastic zip tie 411 via the mated shallow recess grooves 405 and 507.

FIG. 5A is a perspective view of a well assembled AAB device 500. The AAB device 500 is an adjustable watering device against the clog caused by roots in the root area when connected with AWPAE device 700. The well assembled AAB device 500 comprises a shaft 510, the third tubular structure 540, the second tubular structure 530, the rotatable first tubular structure 520. The shaft 510 is a hallow structure with the pores 502 together to form the third pressure and air/gas releasing tubular structure 521 (see FIG. 5F). The third pressure and air/gas releasing tubular structure 521 allows the pressure and air/gas in the AWPAE device 700 and the underground soil and plant roots to be released and further help the water to percolate into the soil in the root area (see FIGS. 7A, 7C and 7D for details). The third pressure and air/gas releasing tubular structure 521 enable the pressure and air/gas to be effused or diffused to the atmosphere or reverse to allow fresh air to be inhaled into soil via the first pressure and air/gas releasing tubular structure 240 as showed in FIG. 1 and FIG. 2D. Also the third pressure and air/gas releasing tubular structure 521 is a special way to protect plant from flooding damage by allowing the $CO_2$ and the gas to diffused from the soil to atmosphere and fresh air, such as $O_2$, inhaling into soil of root area via first pressure and air/gas releasing tubular structure 240.

The mark 506 on the second tubular structure will help to align with the mark 515 on the third tubular structure and further to jointly lock the second tubular structure 530 with the third tubular structure 540. There is an adjustable screw 501 at the tiptop of the shaft 510 to decide which AWPAE device 700 to be used to water a plant at different levels in different locations in the root area. The concave threaded grooves 512 of the third tubular structure 540 are used to jointly fix with the penetrative holes 1003 on the protecting container 1002 as showed in FIG. 10A. There is a directional groove 513 at the end portion of the third tubular structure 540, which will be used to direct the third tubular structure 540 to be jointly and easily fixed with the protecting container 1002 via the screws 1007 (see FIG. 10A for details).

FIG. 5B is an exploded perspective view of the AAB device 500. The AAB device 500 comprises of the third tubular structure 540, the second tubular structure 530, the first rotatable tubular structure 520 and the shaft 510. The two convex structures 511 (the second convex structure is not drawn out due to its position) on the upper portion of the third tubular structure 540 are used to fasten and further to lock the third tubular structure 540 with the second tubular structure 530 via the vertical groove 509 and the perpendicular groove 508. The two marks 515 on the third tubular structure 540 help to align the two marks 506 on the second tubular structure 530. The two directional grooves 513 mate with two convex structures 1009 on the lower portion of the protecting container 1002 and further to guide the other four concave grooves 512 on the third tubular structure 540 to match with the four penetrative holes 1003 on the tubular structure 1006 (see FIG. 10A for details). The mated penetrative holes 1003 on the protecting container 1002 and the four concave grooves 512 on the third tubular structure 540 are screwed together by the screws 1007.

The second tubular structure 530 has a pair of vertical grooves 509 and a pair of perpendicular grooves 508. The vertical groove 509 and the perpendicular grooves 508 on the second tubular structure house the convex structures 511 on the third tubular structure 540. After turn 90 degree clockwise, both the second and the third tubular structures are jointly fastened and locked together. It is a notably special key step and a very important way to separate the top portion 600 from the lower portion 710 for replacing or repairing damaged part (see FIG. 7G for details). The marks 515 on the third tubular structure 540 are used to align the marks 506 on the second tubular structure 530 in the initial position. The step groove 514 at the top inner wall of the second tubular structure 530 is used to mate with the circle convex 505 on the top portion of the rotatable first tubular structure 520. The shallow recess groove 507 on the top portion of the outside wall of the second tubular structure 530 is used to mate with the shallow recess groove 405 on the bottom portion of the funnel water container 410 as showed in FIG. 4A.

The first rotatable tubular structure 520 has a crossbeam 517 with a threaded penetrative hole 504 in the center to house the shaft 510 with the threaded end part 503. The circle convex 505 on the top portion of the first rotatable tubular structure 520 is used to match with the step groove 514 at the top inner wall of the second tubular structure 530. On the top portion of the shaft 510, there are pores 502 to allow the pressure and air/gas releasing from AWPAE device 700 via the water and air/gas diffusion channels 522 and 527. The tiptop 501 (see FIG. 5G for details) is used to adjust the watering patterns according to the information obtained from the wireless and remote monitoring indicating device 880, or the LED light indicating device 850 or movable red flag indicator 800 as showed in FIGS. 8C1 to 8C4, 8B1 to 8B7 and 8A respectively.

Figure 5C:
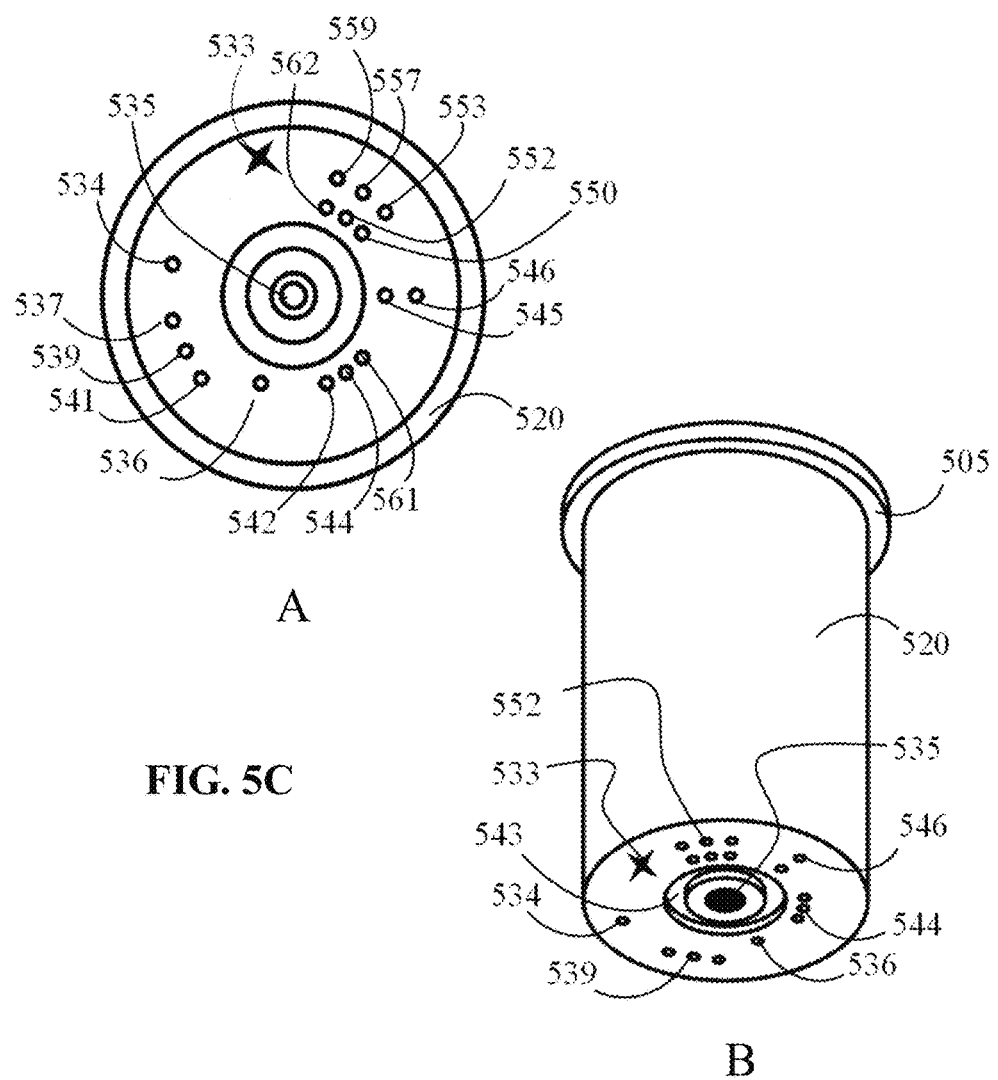

FIG. 5C (a) is a top view of the first rotatable tubular structure 520 of the AAB device 500 after the crossbeam 517 being taken away and (b) is a bottom view of the rotatable first tubular structure 520. The directing mark 533 on the first rotatable tubular structure 520 is used as a directing mark when the first rotatable tubular structure 520 assembled with the second tubular structure 530. This directing mark 533 is further corresponding with the adjusting scale plate 531 as showed in FIG. 2A. At the bottom center of the first rotatable tubular structure 520, there is a threaded penetrative groove 535 to house the threaded pressure and air/gas releasing linker 518. The linker 518 links the third pressure and air/gas releasing tubular structure 521 and all air/gas conduction channels in the AWPAE device 700 to form a pressure and air/gas releasing channel to allow the pressure and air/gas releasing from the underground soil in the root area.

In the present embodiment, there are 16 water channels on the bottom of the first rotatable tubular structure 520, including 534, 537, 539, 541, 536, 542, 544, 561, 546, 545, 553, 550, 557, 552, 559 and 562. Each of these water channels aligned with one water channel or some or all water channels on the second tubular structure 530 and the third tubular structure 540 will result the water from the UIFR device 750 to flow to the underground soil in the root area. Because the first tubular is rotatable via the shaft 510, it will be easily to imagine how many watering patterns will be created from each UIFR device 750 (see FIG. 5G for details).

The bottom view of the rotatable first tubular structure (b) in FIG. 5C is another way to see the rotatable first tubular structure. The half circle slide groove 543 will mate with the half circle 548 on the second tubular structure 530 to jointly form a whole circle slide to house beads 523 as showed in FIG. 5I. The beads will make the first rotatable tubular structure 520 easily to be rotated as desired to water the root area at different levels and in different locations as described in FIG. 5C (a) above and FIG. 5G below. The convex 505 on the top portion of the first rotatable tubular structure 520 is used to mate with step groove 514 on the top portion of the second tubular structure 530 as showed in FIG. 5B. The penetrative threaded groove 535 is used to house the threaded pressure and air/gas releasing linker 518, of which links all air/gas effusing and diffusing channels in the AWPAE device 700 (as showed in FIGS. 7A and 7C) with the third pressure and air/gas releasing tubular structure 521. All water channels as numbered in above can be viewed in another way and further help to understand how the water channels, in fact, are penetrative holes to allowed the water pass through. For example, water channels 534, 539, 536, 544, 546 and 552.

Figure 5D:
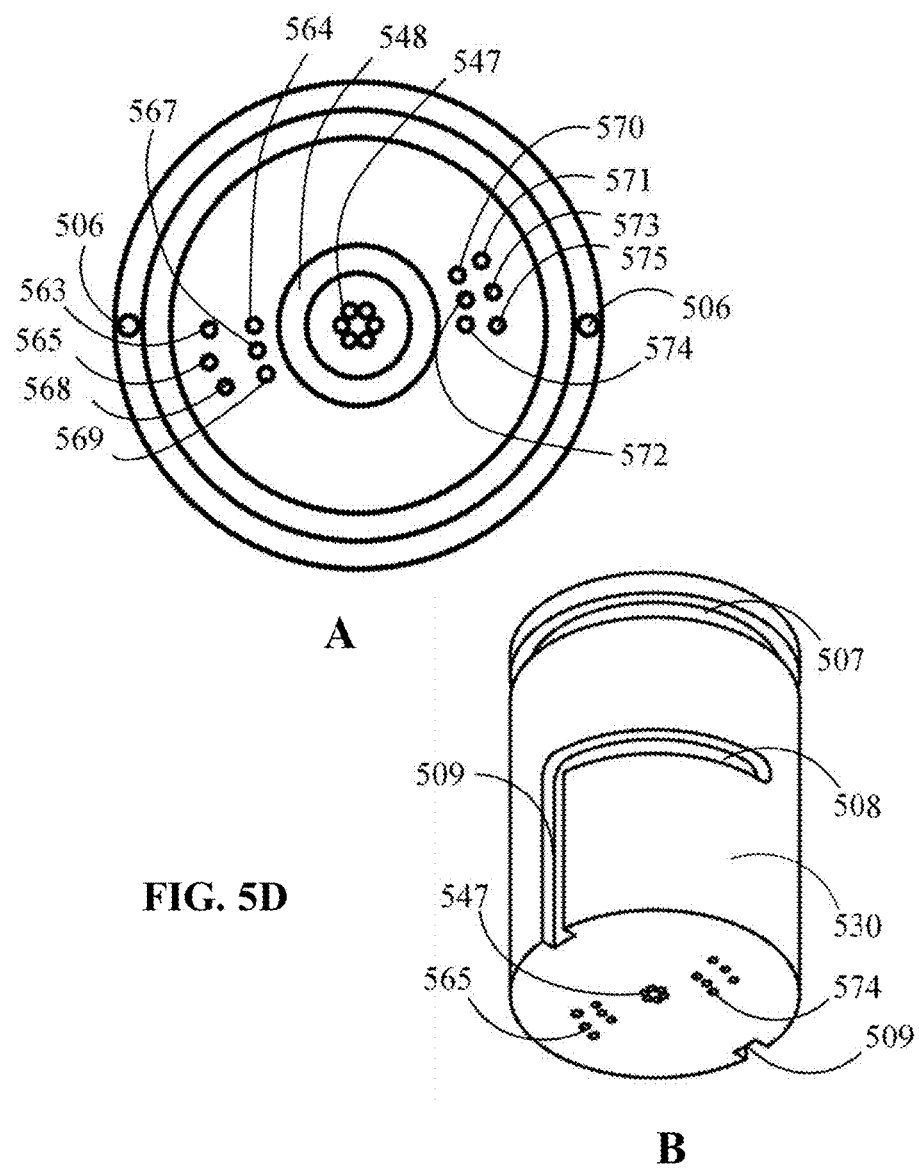

FIG. 5D (a) is a top view of the second tubular structure 530 and (b) is a bottom view of the second tubular structure 530. This is an example only to explain how to create different patterns to water a plant in the root area and further to against clogging. There should not be a limitation since there are many possible patterns to increase or reduce the water channel numbers at each of the second and the third tubular structures, 530 and 540, to create many patterns with the first rotatable tubular structure 520 as described in above for watering the plant roots and simultaneously for plant root and soil respiration. In the bottom center area, there are six air/gas diffusion channels 547 (only six air channels are draw and the other six air channels are not draw out to avoid confusion) used for pressure and air/gas effusing and diffusing from the root area via air/gas conduction channel 522 and the AWPAE device 700 as showed in FIGS. 5F, 5I, FIGS. 7A, 7C and 7D.

Figure 5E:
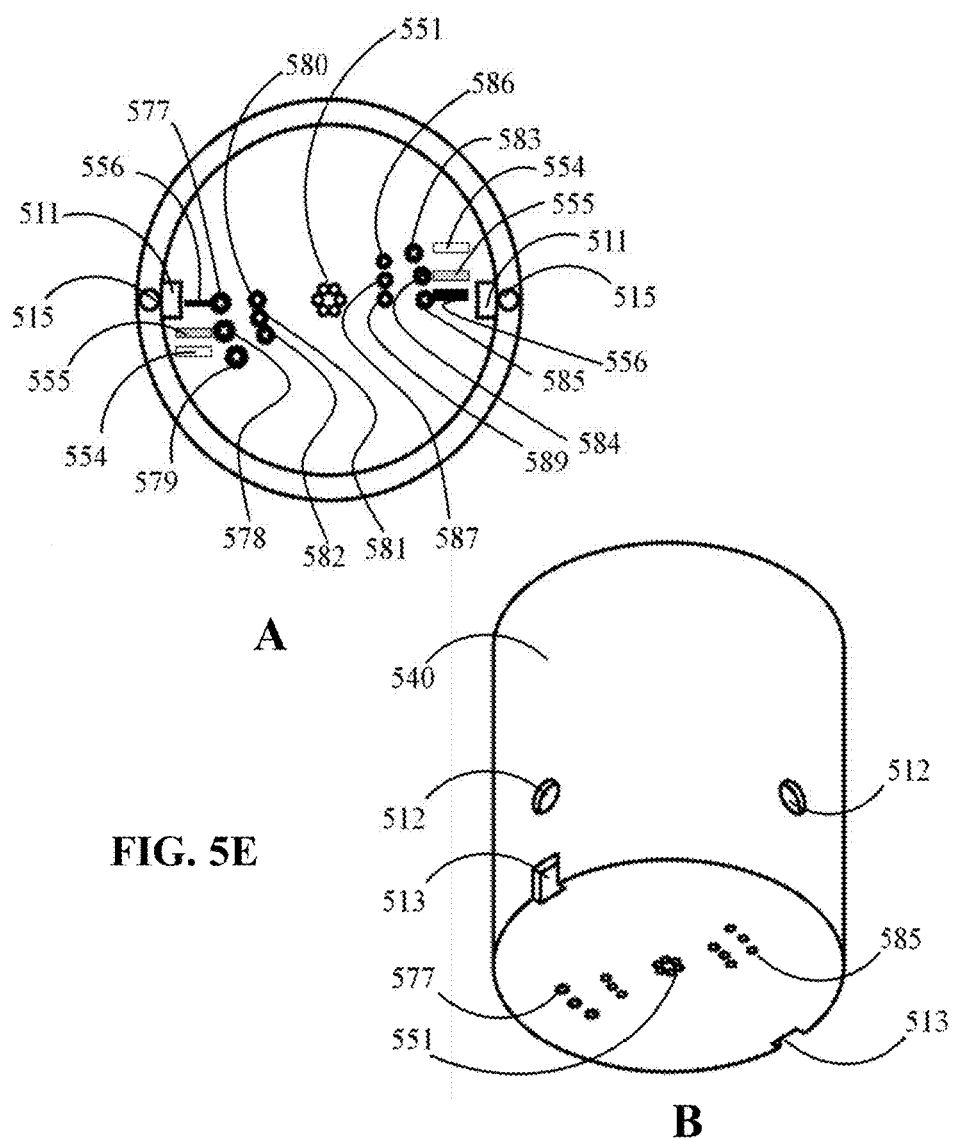
Figure 5G:
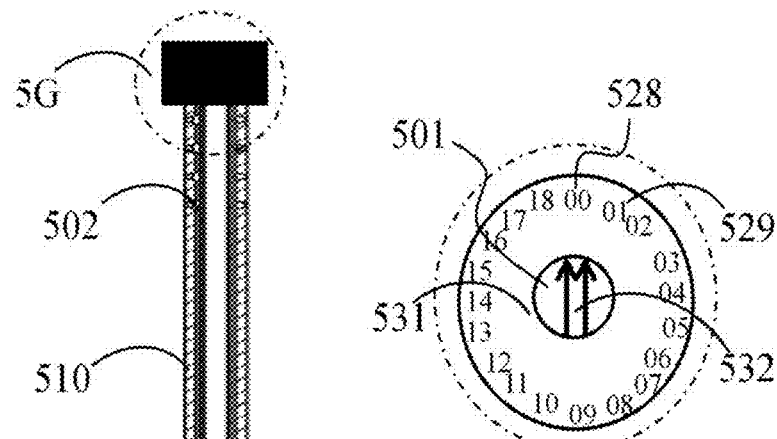
Figure 5F:
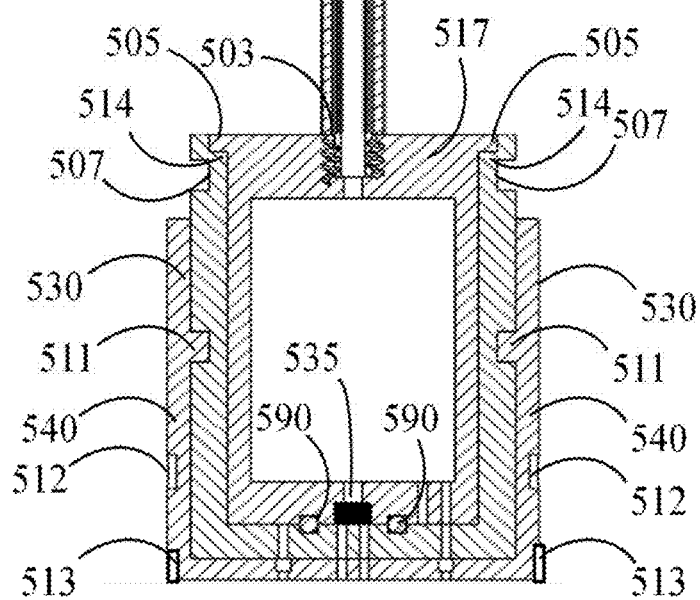

When water reaches to the root area by gravity, the gas in the AWPAE device 700 and soil nearby the AWPAE device 700 is effused to the first water container 220 via the third pressure and air/gas releasing tubular structure 521 as showed in FIGS. 5B, and 5F, the gas from the root area are further being released to the atmosphere by the first pressure and air/gas releasing tubular structure 240. The half circle groove 548 will form a circle slide 590 (see FIGS. 5F and 5I) with the other half circle groove 543 on the first rotatable tubular structure 520 as showed in FIG. 5C (b) to house the beads 523 as showed in FIG. 5I. The formed slide circle 590 with beads 523 will make the first tubular structure 520 to be easily rotated for the purpose to adjust the different watering patterns at different levels of a plant root as showed in FIG. 5G.

There are two groups of water channels outside of the half circle grooves on the right side and the left side of the second tubular structure 530 respectively. There are six water channels in the first group on the right side and are used as the working channel group, including 570, 571, 572, 573, 574, and 575. The water channels, numbered as 563, 564, 565, 567, 568, and 569, are constituted the second group as a reserved group. These reserved watering channels can be used to replace the working channels when the working channel group was damaged for any reason or water percolation became extremely slow according to the information obtained from various indicator device s, such as the movable red flag indicating device 800, the LED light indicating device 850 the wireless and remote monitoring indicating device 880.

Only one group of water channels will be used for the underground irrigation and the watering group is always located on the right side of the second tubular structure 530 and the third tubular structure 540 when the AAB device 500 is well assembled. The other group of water channels are used as a reserved group till the working group has to be replaced as indicated by the wireless indicator 880 or the LED light indicator 850 or the movable red flag indicator 800 (see FIGS. 8A, 8B to 8H and 8I to 8L for details), and then the reserved water channels will replace the damaged group of water channels. The method to exchange the first group of functioning water channels is explained in FIG. 7E. The mark 506 is a directing mark for assemble the second tubular structure 530 with the first rotatable tubular structure 520 (see FIG. 5C (a), FIG. 5G) and the third tubular structure 540.

The bottom view of the second tubular structure 530 in FIG. 5D (b) is another way to understand some of the structures. The shallow groove 507 is used to fix the AAB device 500 with the shallow recess groove 405 of the funnel water container 410 as showed in FIG. 4A. The air channels 547 is located in the center. The working water channel 574 and the reserved water channel 565 are located on the right and left side of the second tubular structure. The vertical groove 509 is used to house the convex 511 on the third tubular structure 540 so that the second tubular structure 530 can be inserted into the third tubular structure 540. The perpendicular groove 508 allows the convex structure 511 on the third tubular structure 540 to turn 90 degrees to align the mark 515 on the third tubular structure 540 with the mark 506 on the second tubular structure 530, as result, the second tubular structure 530 and the third tubular structure 540 are locked together. A special attention that the structure 508 and 509 on the second tubular structure is so important to be remembered to house the convex 511 on the third tubular structure 540 and further to jointly locked together when the second tubular structure being turned to 90 degree clockwise. This is a key important step when the top portion 600 links with the lower portion 710 as showed in FIGS. 6A and 6B, FIG. 7C, FIG. 10C, or the top portion 600 separated from the lower portion 710 for repair or change the reserved watering group to working watering group as showed in FIGS. 6A and 6B, FIGS. 7G and 10B.

FIG. 5E (a) is a top view and (b) is a bottom view of the third tubular structure 540. As described in (a), the six water channels in the working group are located on the right side, including 583, 584, 585, 586, 587 and 589. The six water channels in the reserved group are located on the left side of the second tubular structure, including 580, 581, 582, 577, 578 and 579. The reserved water channels are used to replace the working water channels whenever the working channels are damaged or the water percolating are becoming extremely slow from the UIFR device 750 according the information obtained from the indication device s of the movable red flag indicating, or the LED light indicating device or the wireless and remote monitoring indicating device. All water channels in the first and the second groups on the third tubular structure 540 must align the water channels of the first and the second groups on the second tubular structure 530.

The directing mark 515 is a simple way for assembling the third tubular structure 540 with the second tubular structure 530 (see FIG. 5D (a), FIG. 5G). The convex 511 is used to lock the third tubular structure 540 with the second tubular structure 530 by using the vertical grooves 509 and the perpendicular grooves 508 as explained in FIG. 5D (b) above. The air channels 551 (only six air channels are draw and the other six air channels are not draw to avoid confusion) will match with the air channel 547 on as showed in second tubular structure 530. Three color marks, 554, 555 and 556, are used to guide the assemble the AAB device 500 with the AWPAE device 700 via the water conduction channel 527 and the air/gas conduction channel 522. The number 554 is for the color used for the top root area identification; The number 555 is for the color used for the middle root area identification and the number 556 is for the color used for the deep root area identification. Each of the color must be matched with the color on the water conduction channel 527 as showed in FIG. 5L (c).

The bottom view in FIG. 5E (b) is another way to detail the third tubular structures 540. The threaded grooves 512 used to fix the third tubular structure 540 with the penetrative holes 1003 on the protecting container 1002. The two directing grooves 513 are used for guiding the penetrative holes 1003 at the lower portion of the protecting container 1002 to line up the grooves 512 and further to fix the third tubular structure 540 with the protecting container 1002 via the screws 1007 (see FIG. 10A for details). The air/gas channels 551 and first working group of the water channels 585 on the right side with the second reserved group of water channels 577 on the left side have been well explained with each of the numbers in FIG. 5E (a) above.

FIG. 5F is a sectional view of the well assembled AAB device 500 to detail each part of the AAB device. The threaded end 503 of the shaft 510 is jointly screwed with the threaded penetrative groove 504 on the crossbeam 517 of the rotatable first tubular structure 520. The shaft 510 is a hallow structure with pores 502 on the top portion of the shaft to form the third pressure and air/gas releasing tubular structure 521 for pressure and air/gas releasing from the soil in the root area via the AWPAE device 700. The shallow recess groove 507 on the upper portion of the second tubular structure 530 will mate with the shallow recess groove 405 at the lower portion of the funnel water container 410 as showed in FIG. 4A. The circle convex 505 on the first rotatable tubular structure 520 mates with the step groove 514 on the second tubular structure 530. There is a circle slide 590 formed by the half shallow groove 543 at the outside bottom of the first rotatable tubular structure 520 and the half shallow groove 548 on the inside bottom of the second tubular structure 530. The threaded penetrative groove 535 is used to house a threaded linker 518. The formed circle slide 590 holds at least four beads 523 to make the first tubular structure 520 to be easily rotated for adjusting the water percolation to the top, or the top and the middle, or the middle and the deep root area as described in FIG. 5C (a), FIG. 5G and FIG. 7D below. All other reference numbers have been explained in FIGS. 5C (a), 5D (a) and 5E (a).

FIG. 5G is a top view of the tiptop 501 of the shaft 510 with the circular guided plate 531 surrounded the penetrative groove 203 on the top of the lid 205 for first water container 220 and the lid 209 for second water container 230 respectively as showed in FIG. 2A. Two convex arrowheads 532 on the tiptop 501 of the shaft 510 formed a shallow recess groove used for a screwdriver to adjust the water channels on the first rotatable tubular structure 520 with the water channels on the second tubular structure 530 and third tubular structure 540. As result, such rotation will change the water to percolate into different levels at different root areas. For example, when the arrow 532 points to the circular guided plate number "01" as indicated by reference number 529, the water channel 534 on the first rotatable tubular structure 520 as showed in FIG. 5C (a) will align with the water channel 571 of the second tubular structure 530, as showed in FIG. 5D (a), and the water channel 583 on the third tubular structure 540 as showed in FIG. 5E (a). While when the arrow points to "00" as indicated by reference number 528, none of the water channels on the second tubular structure 530 and on third tubular structure 540 will be aligned with any water channels of the first rotatable tubular structure 520. The UIFR device is to stop working on the position.

FIG. 5G shows one of many possible adjusting circular guided plate 531 to adjust the first rotatable tubular structure 520 to create as many as 18 watering programs and methods for underground irrigation and fertilization. By changing the numbers of water channels on the first tubular structure 520, on the second and the third tubular structures, 530 and 540, and changing numbers on the scale plate 531, it is very flexible to create as many as desired watering patterns for underground irrigation and fertilization. These 18 watering programs and methods for the first water container 220 with an AAB device 500 to water the left side root area of a plant by using the adjusting scale plate 531, of which guided the movement of the first rotatable tubular structure 520 through the shaft 510 to allow one or more of the 16 water channels to align with one or two or all six water channels on the second tubular structure 530 and the third tubular structure 540 accordingly, These watering programs and methods are including:

1). To water the left back top (LBT) root area only, when the arrow 532 points to circular guided plate 01 (as showed in FIG. 5G), the water channel 534 on the first rotatable tubular structure 520 aligned with the water channel 571 on the second tubular structure 530 as showed in FIG. 5D (a), and the water channel 583 on the third tubular structure 540 as showed in FIG. 5E (a);

2). To water the left back middle (LBM) root area only, when the arrow 532 points to circular guided plate 02 (as showed in FIG. 5G), the water channel 534 on the first rotatable tubular structure 520 aligned with the water channel 573 of the second tubular structure 530 as showed in FIG. 5D (a), and the water channel 584 in the first tubular structure 540 as showed in FIG. 5E (a);

3). To water the left back deep (LBD) root area only when the arrow 532 points to circular guided plate 03 (as showed in FIG. 5G), the water channel 534 on the first rotatable tubular structure 520 aligned with the water channel 575 on the second tubular structure 530 as showed in FIG. 5D (a) and the water channel 585 on the third tubular structure 540 as showed in FIG. 5E (a);

4). To water the left back top and left back middle (LBT & LBM) root area only when the arrow 532 points to circular guided plate 04 (as showed in FIG. 5G), the water channels 537 and 539 on the first rotatable tubular structure 520 aligned with the water channels 571 and 573 on the second tubular structure 530 as showed in FIG. 5D (a) and the water channels 583 and 584 on the third tubular structure 540 as showed in FIG. 5E (a);

5). To water the left back top, the left back middle and the left back deep (LBT, LBM & LBD) root area in the same time when the arrow 532 points to circular guided plate 05 (as showed in FIG. 5G), the water channels 537, 539 and 541 on the first rotatable structure aligned with the water channels 571, 573 and 575 on the second tubular structure 530 as showed in FIG. 5D (a) and the water channels 583, 584 and 585 on the third tubular structure 540 as showed in FIG. 5E (a);

6). To water the left back middle and the left back deep (LBM & LBD) root area when the arrow 532 points to circular guided plate 06 (as showed in FIG. 5G), the water channels 539 and 541 on the first rotatable tubular structure 520 aligned with the water channels 573 and 575 on the second tubular structure 530 as showed in FIG. 5D (a) and the water channels 584 and 585 on the third tubular structure 540 as showed in FIG. 5E (a);

7). To water the left front top (LFT) root area only when the arrow 532 points to circular guided plate 07 (as showed in FIG. 5G), the water channel 536 on the first rotatable tubular structure 520 aligned with the water channel 570 on the second tubular structure 530 as showed in FIG. 5D (a) and the water channel 586 on the third tubular structure 540 as showed in FIG. 5E (a);

8). To water the left front middle (LFM) root area only when the arrow 532 points to circular guided plate 08 (as showed in FIG. 5G), the water channel 536 on the first rotatable tubular structure 520 aligned with the water channel 572 on the second tubular structure 530 as showed in FIG. 5D (a) and the water channel 587, on the third tubular structure 540 as showed in FIG. 5E (a);

9). To water the left front deep (LFD) root area only when the arrow 532 points to circular guided plate 09 (as showed in FIG. 5G), the water channel 536 on the first rotatable tubular structure 520 aligned with the water channel 574 on the second tubular structure 530 as showed in FIG. 5D (a) and the water channel 589 on the third tubular structure 540 as showed in FIG. 5E (a);

10). To water both the left front top and middle (LFT & LFM) and the left back top and middle (LBT & LBM) root in the same time when the arrow 532 points to circular guided plate 10 (as showed in FIG. 5G), the water channels 542 and 544 on the first rotatable tubular structure 520 as showed in FIG. 5C (a) aligned with the water channels 570 and 572 on the second tubular structure 530 as showed in FIG. 5D (a) and the water channel 586 and 587 on the third tubular structure 540 as showed in FIG. 5E (a);

11). To water all the left front and back top, middle and deep (LFT, LFM, LFD, LBT, LBM & LBD) root area in the same time when the arrow 532 points to circular guided plate 11 (as showed in FIG. 5G), the water channels 542, 544 and 561 on the first rotatable tubular structure 520 as showed in FIG. 5C (a) aligned with the water channels 570, 572 and 574 on the second tubular structure 530 as showed in FIG. 5D (a) and the water channel 586, 587 and 589 on the third tubular structure 540 as showed in FIG. 5E (a);

12). To water both left front and back middle and deep (LFM, LFD, LBM & LBD) root area together when the arrow 532 points to circular guided plate 12 (as showed in FIG. 5G), the water channels 544 and 561 on the first rotatable tubular structure 520 as showed in FIG. 5C (a) aligned with the water channels 572 and 574 on the second tubular structure 530 as showed in FIG. 5D (a) and the water channels 587 and 589 on the third tubular structure 540 as showed in FIG. 5E (a);

13). To water the left back and front top (LFT & LBT) root area together when the arrow 532 points to circular guided plate 13 (as showed in FIG. 5G), the water channels 546 and 545 on the first rotatable tubular structure 520 as showed in FIG. 5C (a) aligned with the water channels 570 and 571 on the second tubular structure 530 as showed in FIG. 5D (a) and the water channels 586 and 583 on the third tubular structure 540 as showed in FIG. 5E (a);

14). To water the left back and front middle (LFM & LBM) root area together when the arrow 532 points to circular guided plate 14 (as showed in FIG. 5G), the water channels 546 and 545 on the first rotatable tubular structure 520 as showed in FIG. 5C (a) aligned with the water channels 572 and 573 on the second tubular structure 530 as showed in FIG. 5D (a) and the water channels 587 and 584 on the third tubular structure 540 as showed in FIG. 5E (a);

15). To water both left back and front deep (LFD & LBD) root area together when the arrow 532 points to circular guided plate 15 (as showed in FIG. 5G), the water channels 546 and 545 on the first rotatable tubular structure 520 as showed in FIG. 5C (a) aligned with the water channels 574 and 575 on the second tubular structure 530 as showed in FIG. 5D (a) and the water channels 589 and 585 on the third tubular structure 540 as showed in FIG. 5E (a);

16). To water the left back and front top and middle (LFT, LFM, LBT & LBM) root area together when the arrow 532 points to circular guided plate 16 (as showed in FIG. 5G), the water channels 559, 557, 562 and 552 on the first rotatable tubular structure 520 as showed in FIG. 5C (a) aligned with the water channels 570, 571, 572 and 573 on the second tubular structure 530 as showed in FIG. 5D (a) and the water channels 583, 584, 586 and 587 on the third tubular structure 540 as showed in FIG. 5E (a);

17). To water the left back and front top, middle and deep (LFT, LFM, LFD, LBT, LBM & LBD) root area together, when the arrow 532 points to circular guided plate 17 (as showed in FIG. 5G), the water channels 559, 557, 553, 562, 552 and 550 on the first rotatable tubular structure 520 as showed in FIG. 5C (a) aligned with the water channels 570, 571, 572, 573, 574 and 575 on the second tubular structure 530 as showed in FIG. 5D (a) and the water channels 583, 584, 585, 586, 587 and 589 on the third tubular structure 540 as showed in FIG. 5E (a);

18). To water the left back and front middle and deep (LFM, LFD, LBM & LBD) root area together, when the arrow 532 points to circular guided plate 18 (as showed in FIG. 5G), the water channels 557, 553, 552 and 550 on the first rotatable tubular structure 520 as showed in FIG. 5C (a) aligned with the water channels 573, 575, 572 and 574 on the second tubular structure 530 as showed in FIG. 5D (a) and the water channels 584, 585, 587 and 589 on the third tubular structure 540 as showed in FIG. 5E (a).

The AAB device 500 connected with the second water container 230 has the exactly same 18 watering programs and methods as described above, except the AAB device 500 used for the right-side underground root area irrigation of the plant, including:

1). To water the left side of back top (LBT) root area only and simultaneously release the air/gas from the back top root area, when the arrow 532 points to circular guided plate 01 (as showed in FIG. 5G), the water channel 534 on the first rotatable tubular structure 520 will align with the water channel 571 on the second tubular structure 530 (as showed in FIG. 5D (a)) and the water channel 583 on the third tubular structure 540 (as showed in FIG. 5E (a)) via the watering connector 526, watering conduction channel 527, air/gas connector 516, air/gas diffusion channel 522 (as showed in FIG. 5L) and the AWPAE device 700 as numbered 777 (as showed in FIG. 7D);

2). To water the left side of back middle (LBM) root area only and simultaneously release the air/gas from the left back middle root area, when the arrow 532 points to circular guided plate 02 (as showed in FIG. 5G), the water channel 534 on the first rotatable tubular structure 520 (as showed in FIG. 5C (a)) will line up with the water channel 573 on the second tubular structure 530 (as showed in FIG. 5D (a)) and the water channel 584 on the third tubular structure 540 (as showed in FIG. 5E (a)) via the watering connector 526, watering conduction channel 527, air/gas connector 516, air/gas diffusion channel 522 (as showed in FIG. 5L) and the AWPAE device 700 numbered as 779 (as showed in FIG. 7D);

3). To water the left side back deep (LBD) root area only and simultaneously release the air/gas from the left back deep root area, when the arrow 532 points to circular guided plate 03 (as showed in FIG. 5G), the water channel 534 of the first rotatable tubular structure 520 (as showed in FIG. 5C (a)) will line up with the water channel 575 on the second tubular structure 530 (as showed in FIG. 5D (a)) and the water channel 585 on the third tubular structure 540 (as showed in FIG. 5E (a)) via the watering connector 526, watering conduction channel 527, air/gas connector 516, air/gas diffusion channel 522 (as showed in FIG. 5L) and the AWPAE device 700 numbered as 781 (as showed in FIG. 7D);

4). To water the left side back top and middle (LBT & LBM) root area together and simultaneously release the air/gas from the back top and middle root area, when the arrow 532 points to circular guided plate 04 (as showed in FIG. 5G), the water channel 537 and 539 on the first rotatable tubular structure 520 (as showed in FIG. 5C (a)) will align with the water channel 571 and 573 on the second tubular structure 530 (as showed in FIG. 5D (a)) and the water channel 583 and 584 on the third tubular structure 540 (as showed in FIG. 5E (a)) via the watering conduction channel 527, air/gas connector 516, air/gas diffusion channel 522 (as showed in FIG. 5L) and the AWPAE device 700 numbered as 777 and 779 (as showed in FIG. 7D);

5). To water the left side back top, middle and deep (LBT, LBM and LBD) root area and simultaneously release the air/gas from the back top, middle and deep root area, when the arrow 532 points to circular guided plate 05 (as showed in FIG. 5G), the water channel 537, 539 and 541 on the first rotatable tubular structure 520 (as showed in FIG. 5C (a)) will align with the water channel 571, 573 and 575 on the second tubular structure 530 (as showed in FIG. 5D (a)) and the water channel 583, 584 and 585 on the third tubular structure 540 (as showed in FIG. 5E (a)) via the watering connector 526, watering conduction channel 527, air/gas connector 516, air/gas diffusion channel 522 (as showed in FIG. 5L) and the AWPAE device 700 numbered as 777, 779 and 781 (as showed in FIG. 7D);

6). To water the left side back middle and deep (LBM and LBD) root area and simultaneously release the air/gas from the back middle and deep root area, when the arrow 532 points to circular guided plate 06 (as showed in FIG. 5G), the water channel 539 and 541 on the first rotatable tubular structure 520 as showed in FIG. 5C (a) will align the water channel 573 and 575 on the second tubular structure 530 as showed in FIG. 5D (a) and the water channel 584 and 585 on the third tubular structure 540 as showed in FIG. 5E (a) via the watering connector 526, watering conduction channel 527, air/gas connector 516, air/gas diffusion channel 522 (as showed in FIG. 5L) and the AWPAE device 700 numbered as 779 and 781 (as showed in FIG. 7D);

7). To water the left-side of front top (LFT) root area only and simultaneously releasing the air/gas from the top back root area, when the arrow points to circular guided plate 07 (as showed in FIG. 5G), the water channel 536 on the first rotatable tubular structure 520 as showed in FIG. 5C (a) will align the water channel 570 on the second tubular structure 530 as showed in FIG. 5D (a) and the water channel 586 on the third tubular structure 540 as showed in FIG. 5E (a) via the watering connector 526, watering conduction channel 527, air/gas connector 516, air/gas diffusion channel 522 (as showed in FIG. 5L) and the AWPAE device 700 numbered as 778 (as showed in FIG. 7D);

8). To water the left-side front middle (LFM) root area only and simultaneously releasing the air/gas from the top back root area, when the arrow points to circular guided plate 08 (as showed in FIG. 5G), the water channel 536 on the first rotatable tubular structure 520 (as showed in FIG. 5C (a)) will align the water channel 572 on the second tubular structure 530 (as showed in FIG. 5D (a)) and the water channel 587 on the third tubular structure 540 (as showed in FIG. 5E (a)) via the watering connector 526, watering conduction channel 527, air/gas connector 516, air/gas diffusion channel 522 (as showed in FIG. 5L) and the AWPAE device 700 numbered as 782 (as showed in FIG. 7D);

9). To water the left-side front deep (LFD) root area only and simultaneously releasing the air/gas from the top back root area, when the arrow points to circular guided plate 09 (as showed in FIG. 5G), the water channel 536 on the first rotatable tubular structure 520 (as showed in FIG. 5C (a)) will align the water channel 574 on the second tubular structure 530 (as showed in FIG. 5D (a)) and the water channel 585 on the third tubular structure 540 (as showed in FIG. 5E (a)) via the watering connector 526, watering conduction channel 527, air/gas connector 516, air/gas diffusion channel 522 (as showed in FIG. 5L) and the AWPAE device 700 numbered as 784 (as showed in FIG. 7D);

10). To water the left-side front top and middle (LFT & LFM) root area together and simultaneously releasing the air/gas from the top and middle front root area, when the arrow points to circular guided plate 10 (as showed in FIG. 5G), the water channel 542 and 544 on the first rotatable tubular structure 520 (as showed in FIG. 5C (a)) will align the water channel 570 and 572 (on the second tubular structure 530 as showed in FIG. 5D (a)) and the water channel 586 and 587 on the third tubular structure 540 (as showed in FIG. 5E (a)) via the watering connector 526, watering conduction channel 527, air/gas connector 516, air/gas diffusion channel 522 (as showed in FIG. 5L) and the AWPAE device 700 numbered as 778 and 782 (as showed in FIG. 7D);

11). To water the left-side front top, middle and deep (LFT, LFM and LFD) root area and simultaneously releasing the air/gas from the top and middle back root area, when the arrow points to circular guided plate 11 (as showed in FIG. 5G), the water channel 542, 544 and 561 on the first rotatable tubular structure 520 (as showed in FIG. 5C (a)) will align the water channel 570, 572 and 574 on the second tubular structure 530 (as showed in FIG. 5D (a)) and the water channel 586, 587 and 589 on the third tubular structure 540 (as showed in FIG. 5E (a)) via the watering connector 526, watering conduction channel 527, air/gas connector 516, air/gas diffusion channel 522 (as showed in FIG. 5L) and the AWPAE device 700 numbered as 778, 782 and 784 (as showed in FIG. 7D);

12). To water the left-side front middle and deep (LFM and LFD) root area and simultaneously releasing the air/gas from the top and middle back root area, when the arrow points to circular guided plate 12 (as showed in FIG. 5G), the water channel 544 and 561 on the first rotatable tubular structure 520 (as showed in FIG. 5C (a)) will align the water channel 572 and 574 on the second tubular structure 530 (as showed in FIG. 5D (a)) and the water channel 587 and 589 on the third tubular structure 540 (as showed in FIG. 5E (a)) via the watering connector 526, watering conduction channel 527, air/gas connector 516, air/gas diffusion channel 522 (as showed in FIG. 5L) and the AWPAE device 700 numbered as 782 and 784 (as showed in FIG. 7D);

13). To water the left-side of both back and front top (LFT & LBT) root area only and simultaneously releasing the air/gas from the top back root area, when the arrow points to circular guided plate 13 (as showed in FIG. 5G), the water channel 546 and 545 on the first rotatable tubular structure 520 (as showed in FIG. 5C (a)) will align the water channel 570 and 571 on the second tubular structure 530 (as showed in FIG. 5D (a)) and the water channel 586 and 583 on the third tubular structure 540 (as showed in FIG. 5E (a)) via the watering connector 526, watering conduction channel 527, air/gas connector 516, air/gas diffusion channel 522 (as showed in FIG. 5L) and the AWPAE device 700 numbered as 777 and 778 (as showed in FIG. 7D);

14). To water the left-side of both back and front middle (LFM & LBM) root area only and simultaneously releasing the air/gas from the top back root area, when the arrow points to circular guided plate 14 (as showed in FIG. 5G), the water channel 546 and 545 on the first rotatable tubular structure 520 (as showed in FIG. 5C (a)) will align the water channel 572 and 573 on the second tubular structure 530 (as showed in FIG. 5D (a)) and the water channel 587 and 584 on the third tubular structure 540 (as showed in FIG. 5E (a)) via the watering connector 526, watering conduction channel 527, air/gas connector 516, air/gas diffusion channel 522 (as showed in FIG. 5I) and the AWPAE device 700 numbered as 779 and 782 as showed in FIG. 7D;

15). To water the left-side of both back and front deep (LFD & LBD) root area only and simultaneously releasing the air/gas from the top back root area, when the arrow points to circular guided plate 15 as showed in FIG. 5G, the water channel 546 and 545 on the first rotatable tubular structure 520 (as showed in FIG. 5C (a)) will align the water channel 574 and 575 on the second tubular structure 530 (as showed in FIG. 5D (a)) and the water channel 589 and 585 on the third tubular structure 540 (as showed in FIG. 5E (a)) via the watering connector 526, watering conduction channel 527, air/gas connector 516, air/gas diffusion channel 522 (as showed in FIG. 5L) and the AWPAE device 700 numbered as 781 and 784 as showed in FIG. 7D;

16). To water the left-side both front and back of top and middle (LBT, LBM, LFT & LFM) root area together and simultaneously releasing the air/gas from the top and middle back root area, when the arrow points to circular guided plate 16 as showed in FIG. 5G, the water channel 559, 557, 562 and 552 on the first rotatable tubular structure 520 as showed in FIG. 5C (a) will align the water channel 570, 572, 571 and 573 on the second tubular structure 530 as showed in FIG. 5D (a) and the water channels 583, 584, 586 and 587 on the third tubular structure 540 as showed in FIG. 5E (a) via the watering connector 526, watering conduction channel 527, air/gas connector 516, air/gas diffusion channel 522 (as showed in FIG. 5L) and the AWPAE device 700 numbered as 777, 778, 779 and 782 as showed in FIG. 7D;

17). To water the left-side both front and back of all top, middle and deep (LBT LFT, LBM, LFM, LBD & LFD) root area together and simultaneously releasing the air/gas from the top and middle back root area, when the arrow points to circular guided plate 17 (as showed in FIG. 5G), the water channel 559, 557, 553, 562, 552 and 550 on the first rotatable tubular structure 520 (as showed in FIG. 5C (a)) will align the water channel 570, 572, 574, 571, 573 and 575 on the second tubular structure 530 (as showed in FIG. 5D (a)) and the water channels 583, 584, 585, 586, 587 and 589 on the third tubular structure 540 (as showed in FIG. 5E (a)) via the watering connector 526, watering conduction channel 527, air/gas connector 516, air/gas diffusion channel 522 (as showed in FIG. 5L) and the AWPAE device 700 numbered as 777, 778 779, 782, 781 and 784 as showed in FIG. 7D;

18). To water the left side both front and back of middle and deep (LBM, LFM, LBD & LFD) root area together and simultaneously release the air/gas from the front and back of middle and deep root area, when the arrow 532 points to circular guided plate 18 (as showed in FIG. 5G), the water channel 557, 553, 552 and 550 on the first rotatable tubular structure 520 (as showed in FIG. 5C (a)) will align with the water channel 572, 574, 573 and 575 on the second tubular structure 530 (as showed in FIG. 5D (a)) and the water channels 584, 585, 587 and 589 on the third tubular structure 540 (as showed in FIG. 5E (a)) via the watering connector 526, watering conduction channel 527, air/gas connector 516, air/gas diffusion channel 522 (as showed in FIG. 5L) and the AWPAE device 700 numbered as 779, 782, 781 and 784 as showed in FIG. 7D.

It should be emphasized that the combination of each watering programs and methods from the first AAB device 500 with each watering programs and methods from the second AAB device 500 can further create more than 300 watering programs and methods. As described each of the watering programs and methods for the right and left side underground roots, it helps to understand that over 300 watering programs and methods will be created by combinations of two AAB devices and no longer need to detail each of all watering programs and methods in detail.

Figure 5H:
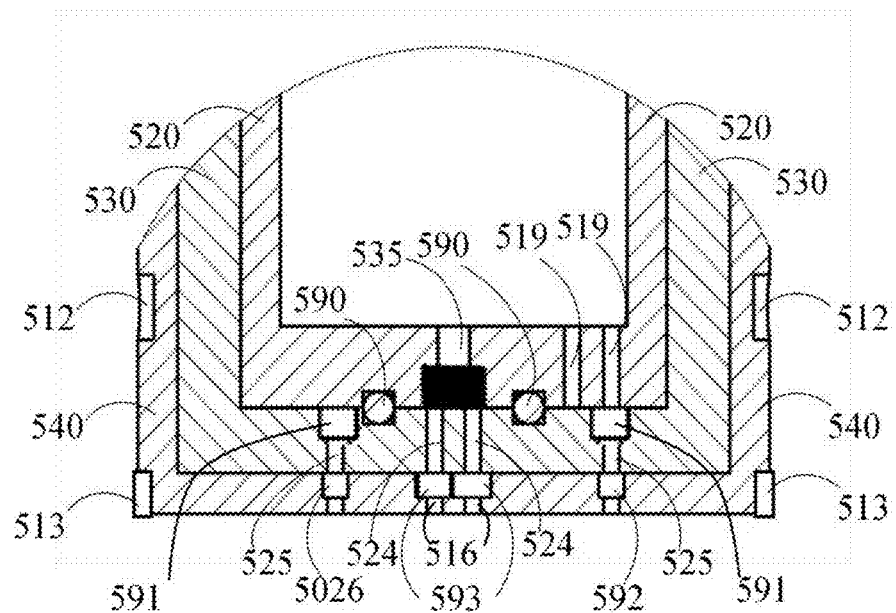

FIG. 5H is a partial enlarged section view to detail all grooves and channels of the assembled of the first, the second and the third tubular structures, 520, 530 and 540. The circle slide groove 590 is used to house at least four beads 523 to make the first rotatable tubular structure 520 to be easily rotated by using the screw to turn the shaft 510 and to chose any water channel as mentioned in FIG. 5C (a) and FIG. 5G. The water channel 519 on the first rotatable tubular structure 520 allows the water to pass through and to line up with the water channels on the second and third tubular structure 530 and 540. The step grooves 591 on the second tubular structure 530 are used to house a stopper 558 to block the water passing through since these water channels are used as reserved water channels or purposely inhibit the water passing through to water the root around the AWPAE device 700 or for any other reason.

Figure 5I:
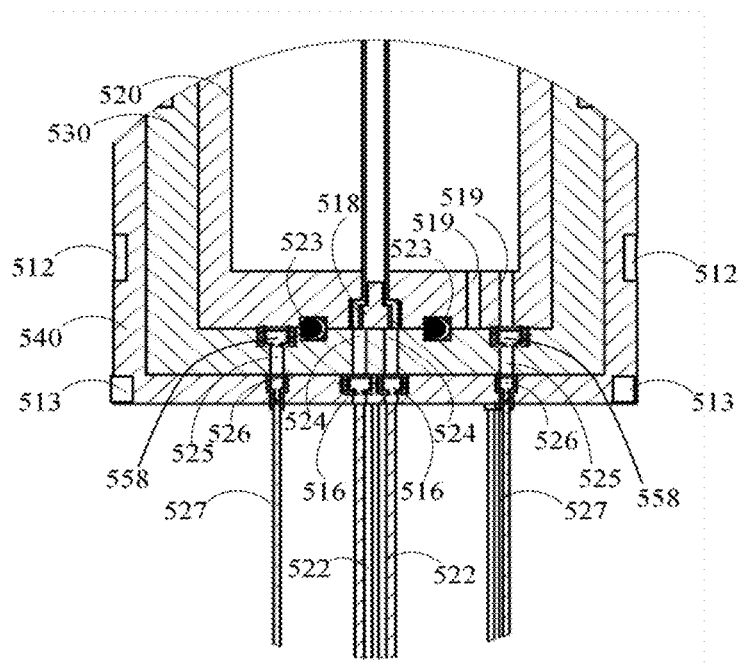
Figures 5J, 5K:
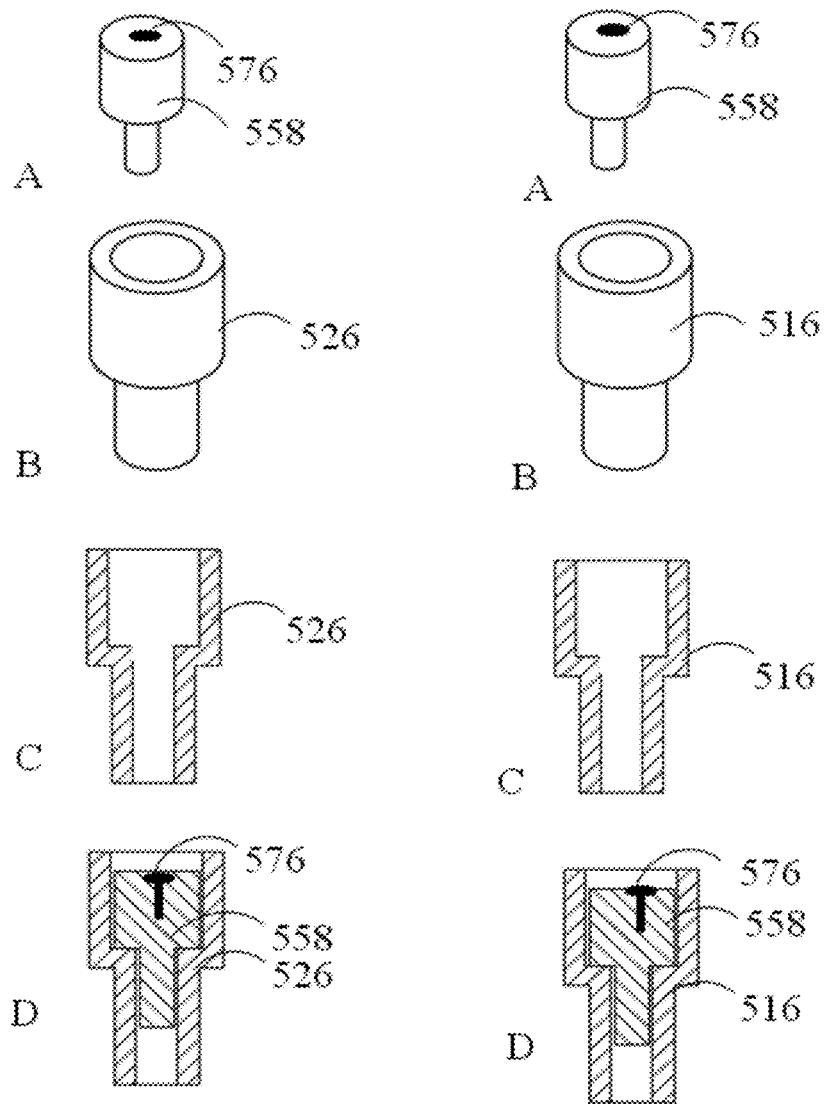
FIG. 5J to FIG. 5N are perspective, front, and sectional views to detail the structure of the water conduction channel and the air/gas conduction channel, of which link the top portion and lower portion together to form the UIFR device.
Figure 5L:
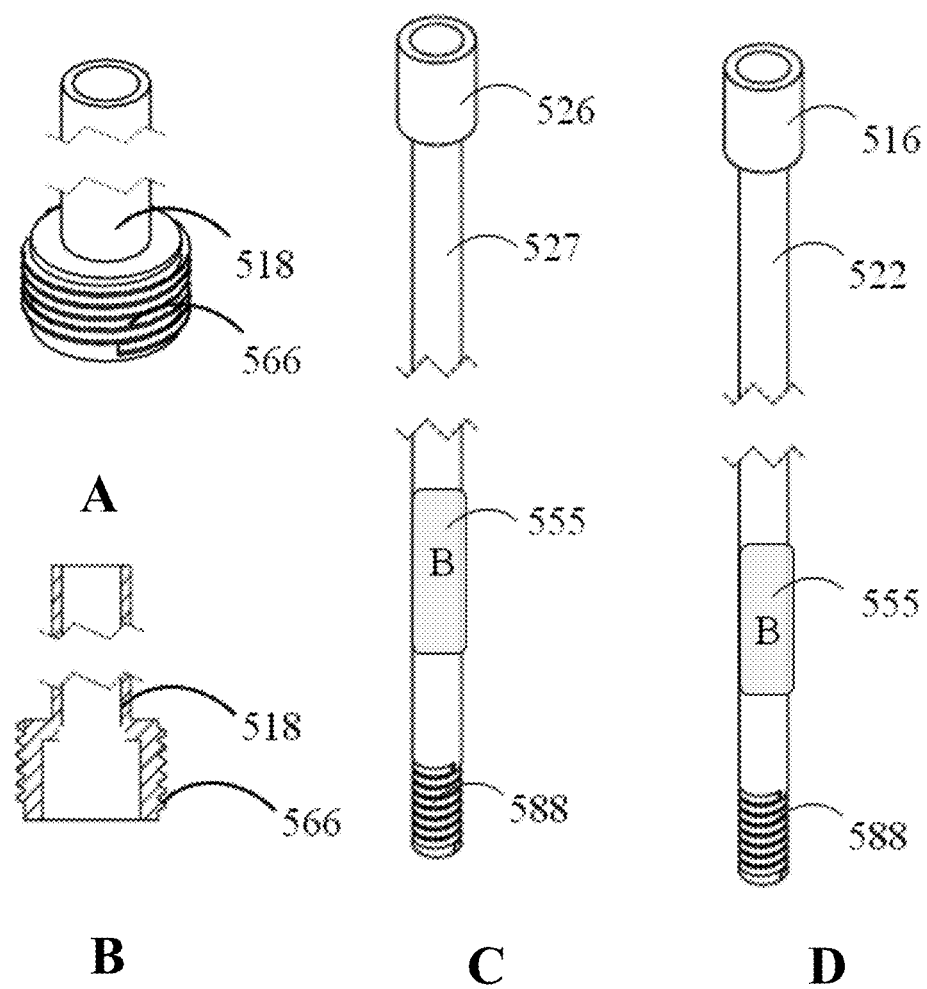

The grooves 593 are used to house the air connector 516 as showed in FIG. 5L. The grooves 592 of the third tubular structure 540 are used for housing the water connector 516 as detailed in FIG. 5L. The threaded groove 535 on the first rotatable tubular structure 520 is used to house the linker 518 as detailed in FIG. 5L (a) and (b). It should be pointed out that there are six air channels 516 on the third tubular structure 540 and six air channels 524 on the second tubular structure 530. These six air channels are converted into one air channel by the threaded pressure and air/gas releasing linker 518 on the first rotatable tubular structure 520 and further to jointly connected with the third pressure and air/gas releasing tubular structure 521 of the shaft 510 as showed in FIG. 5F and FIG. 5I.

FIG. 5I is a partial enlarged section view of the first, second and third tubular structure on the AAB device 500 to show each of the occupied grooves and channels as showed in FIG. 5H. The threaded pressure and air/gas releasing linker 518 is screwed with the threaded groove 535 on the rotatable first tubular structure 520. The beads 523 are occupied in the circle slide 590 to support the first rotatable tubular structure 520 and the second tubular structure 530, and further to make the first rotatable tubular structure 520 to be easily rotated via the shaft 510 as showed in FIG. 5A and FIG. 5G. The stoppers 558 are inserted into the step grooves 591 on the second tubular structure 530 to stop the water passing through due to these water channels are reserved for replacing those damaged or clogged AWPAE device 700.

The water connector 526 and the air/gas connector 516 are respectively inserted into each of the step grooves 592 and 593 on the third tubular structure 540. The water conduction channels 527 and air/gas conduction channels 522 are further linked with each AWPAE device 700 to perform their function for underground irrigation and soil and root respiration. The penetrative grooves 519 on the first rotatable tubular structure 520 are aligned with the water channels 525 and water connector 526 to create various watering methods for the underground irrigation. The penetrative grooves 524 on the second tubular structure 530 are connected with air connector 516 kept in the grooves 593 on the third tubular structure 540 to form the air conduction channels 522.

FIG. 5J is a perspective and a sectional view of the stopper 558 and water connector 526.
  (a). a perspective view of the stopper 558 with a steel 576 on the top of the stopper 558. The steel 576 is a way to help the stopper 558 to be taken out from the step groove 526 or for inserting it into the step groove 526 by using a tool;

(b). a perspective view of a water connector 526 of the water conduction channel 527. The water connector will be kept in the groove 593 on the third tubular structure 540;

(c). a section view of the water connector 526;

(d). a section view of the connector 526 with the stopper 558 and the steel 576.

FIG. 5K is a perspective and section view of the stopper 558 and air connector 516.

(a). a perspective view of the stopper 558 with a steel 576 on the top for taking out the stopper 558 from the connector 516 or for inserting it into the connector 516 using a tool;

(b). a perspective view of a connector 516 for air/gas conduction channel 522;

(c). a section view of the air/gas connector 516;

(d). a section view of the air/gas connector 526 with the stopper 558 and the steel 576.

FIG. 5L shows a perspective view to detail the structure of threaded pressure and air/gas releasing linker 518, the water conduction channel 527 and the air/gas conduction channel 522.

(a). is a perspective view of the threaded pressure and air/gas releasing linker 518 with a thread enlarged part 566 to screw with threaded groove 535. The top narrow part is connected with the third pressure and air/gas releasing tubular structure 521 of the shaft 510 as showed in FIGS. 5B, 5F and FIG. 5I.

(b). is a section view to detail the threaded pressure and air/gas releasing linker 518 with threaded at the outside wall of the enlarged part 566 used to screw with the threaded penetrative groove 535 on the first tubular structure 520.

(c). is a perspective view to show the water conduction channel 527 with the connector 526 at the top and the threaded end 588 at the bottom end. The threaded end 588 will screwed with the panel 705 on the AWPAE device 700 by using the screws 711 and 708 (see FIG. 7B for detail). The color mark 555 with letter B is used to indicate that this water conduction channel 527 to correspond with the AWPAE device 700 for left back middle (LBM) root area and further to correspond with the same color of the penetrative grooves on the third tubular structure 540 correctly as showed in FIG. 5E (a).

(d). is a perspective view to detail the air/gas conduction channel 522 with the connector 516 at the top and the threaded end 588 at the bottom end. The threaded end 558 fixes with the panel 705 on the AWPAE device 700 by using the screws 711 and 708 (see FIG. 7B). The colored mark 555 with letter B is used to indicate that this air/gas diffusion channel 522 to correspond with the AWPAE device 700 for the left back middle (LBM) root area and to correspond with the same color of the penetrative grooves on the third tubular structure 540 correctly as showed in FIG. 5E (a).

Figure 5M:
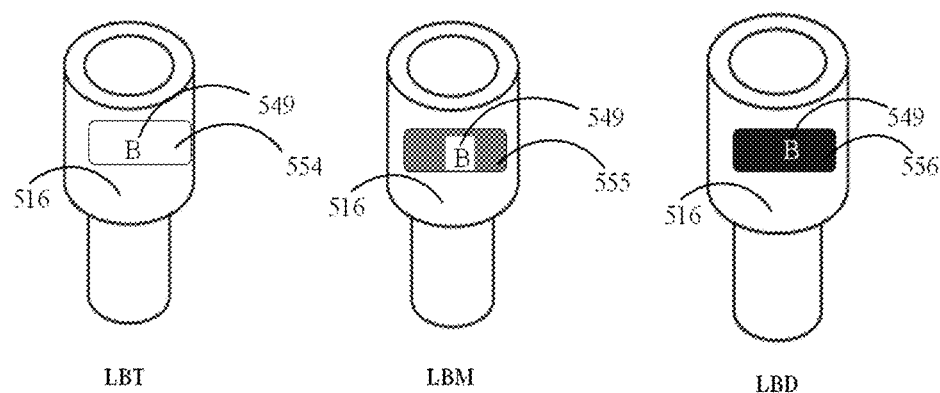

FIG. 5M illustrates the air/gas connector 516 with the identification color and abbreviated letter for air/gas releasing from the left side of the back root area. For example, the air/gas connector 516 with pale color 555 and abbreviated letter B tells that this connector will combine with water conduction channel 526 with same color 555 (see FIG. 5N) to become a pair of linkers, 522 and 527 as showed in FIG. 5L, and further to connect with a AWPAE device 700 for watering the left side back middle (LBM) root area when pressure and air/gas being released from the AWPAE. The different colors 554, 555 and 556 are same as the colors showed in FIG. 5E.

Figure 5N:
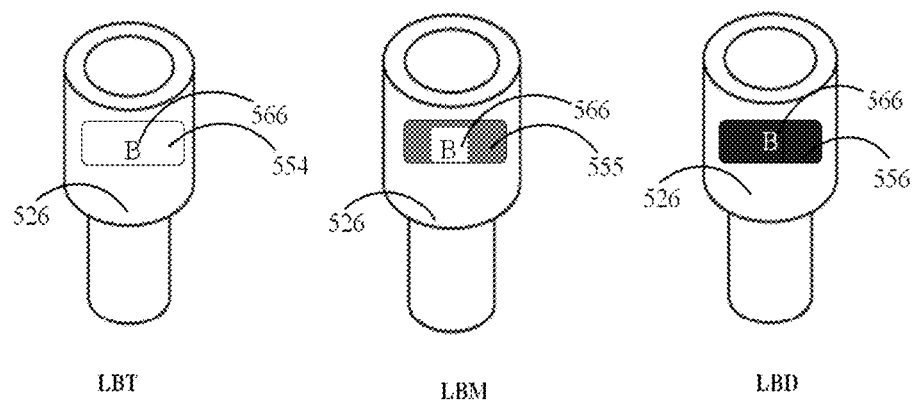

FIG. 5N is a perspective view of the water connector 526 with identification color and abbreviated letter. In order to precisely assembling the AWPAE device 700 with the AAB device 500 correctly, the water connector 526, for example, has a pale color 555 with letter B which is correspondence with the same color 555 to indicate the penetrative groove 584 on the third tubular structure (see FIG. 5E for detail) to house the water connector 526 for the left side back middle (LBM) root area. It is a very important issue to assemble the linkers, 522 and 527, with AAB device in the top portion and the AWPAE device by correctly housing the water connector 526 to the penetrative hole. Therefore the different color marked on the connector are same as the colors as showed in FIG. 5E.

Figure 6A:
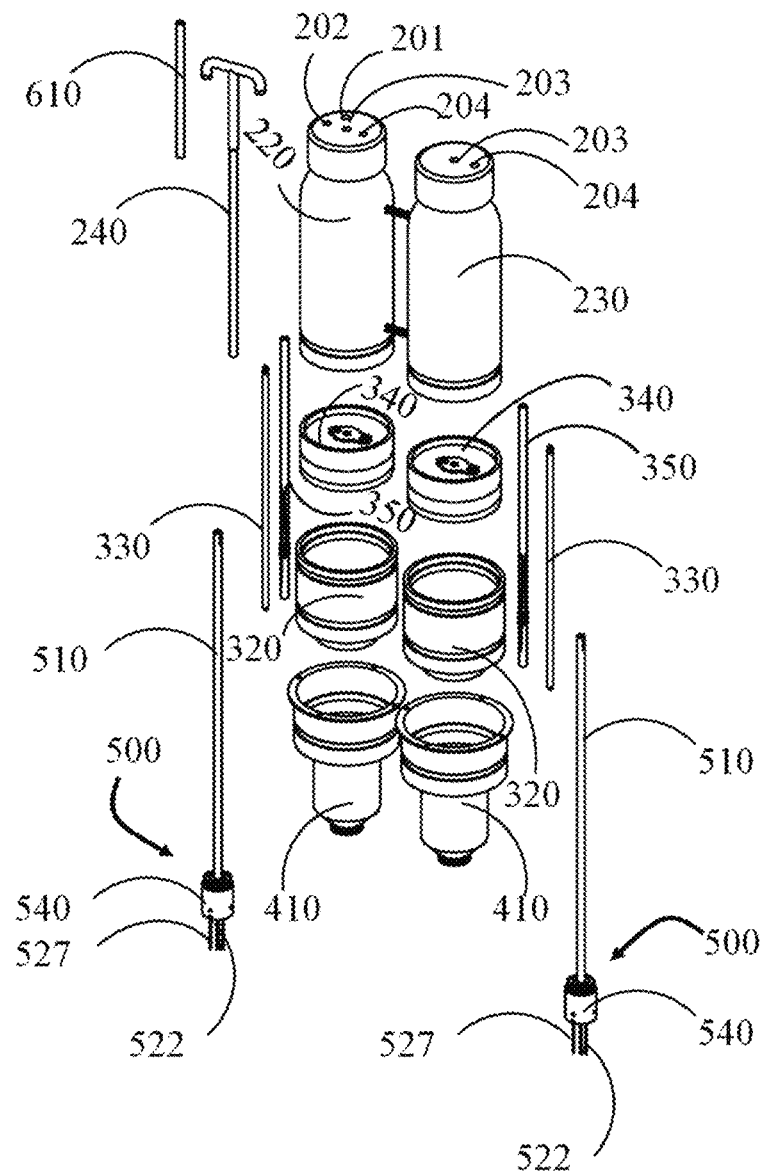
FIG. 6A is a perspective view of all assembly parts for the top portion.

FIG. 6A is a perspective view of the assembly parts for the top portion of an UIFR device 750. All assembly parts were detailed and showed in FIG. 2, FIG. 3A to FIG. 3G, FIG. 4A and FIG. 5A in above figures. The first water container 220 with four penetrative holes, 201, 203, 211 and 204, on the lid. The second water container 230 with two penetrative holes, 203 and 204 on the lid. On the top left side is the first air/gas releasing tubular structure 240 and the water inletting tubular structure 610. All other inside and outside structures of the first water container 220 and the second water container 230 had been well detailed in FIG. 2A to 2I1. The vessel 320, under the first and second water containers, is used to house both the water drip controlling device 340, the water flow rate controlling device 350 and the second air/gas releasing tubular structure 330. All other detailed structures with various connected ways were demonstrated in FIG. 3A to 3D. The funnel water container 410 is a container having a buffer effect to allow the water to be slowly percolated into the soil via the AAB device 500 and the AWPAE device 700. The funnel water container 410 also is a very important connector to link the AWPAE device 700 via the water conduction channel and the air/gas conduction channel to form a UIFR device 750. The detail structure with other parts in the UIFR device 750 were showed in FIGS. 4B, 4B and 4C. The lower part is the well assembled AAB device 500 with the shaft 510 and the second tubular structure 530. The detail structure of the AAB device 500 and the detail relationship with other parts had been well demonstrated in FIG. 5A to FIG. 5G.

Figure 6B:
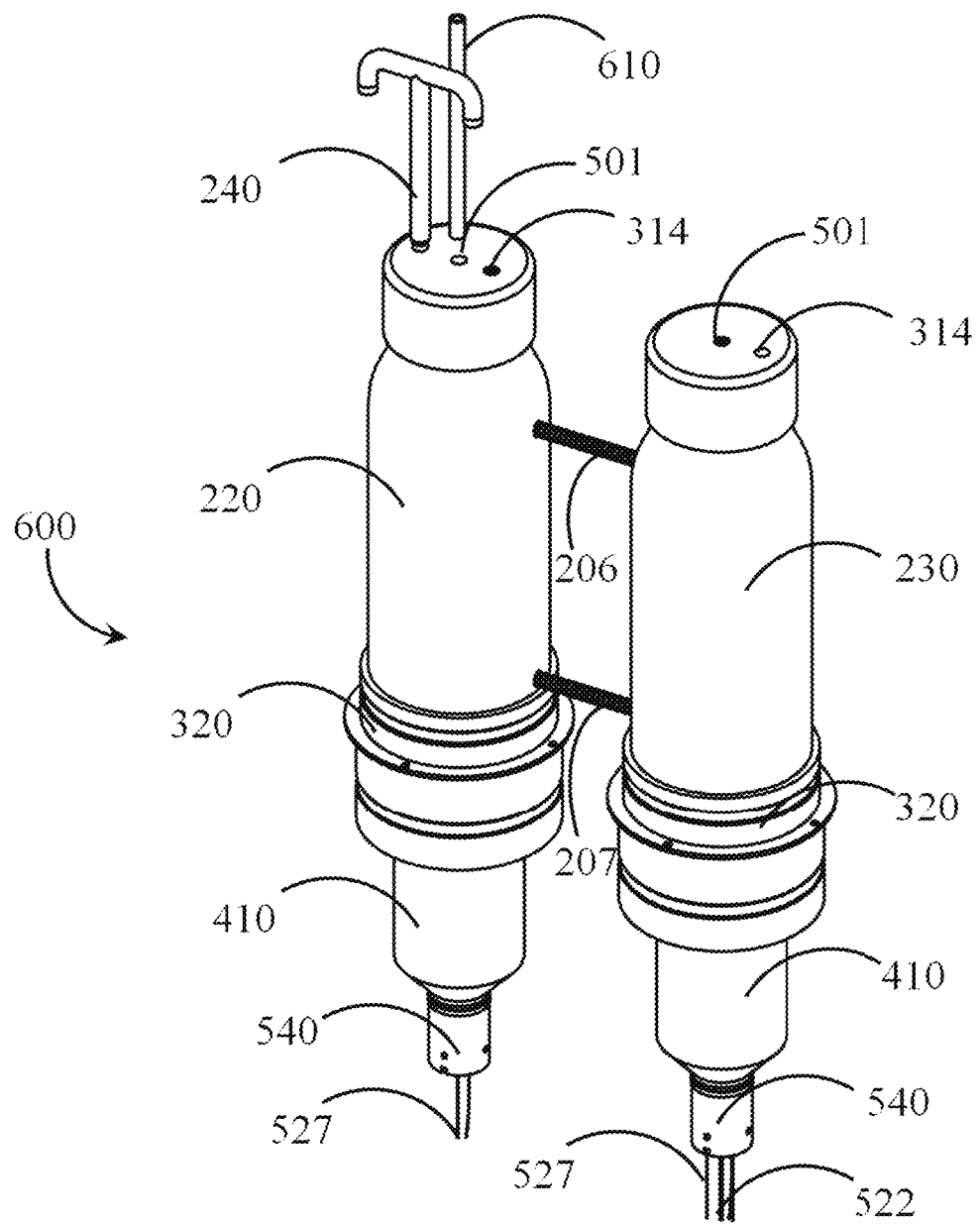
FIG. 6B and FIG. 6C are perspective view of an assembled top portion and sectional view of the assembled top portion of the UIFR device.

FIG. 6B is a perspective view of the well assembled top portion 600 of the UIFR device 750 with partial structure of the water conduction channel and air/gas conduction channel. The water tubular structure 610 allows the water to flow into the first water container 220 and further to the second water container 230 via the twistable water overflow tubular structure 207. The pressure and the air/gas in the first water container 220 will be released to outside of the atmosphere through the first pressure and air/gas releasing tubular structure 240. While the pressure and air/gas in the second water container 230 will be released to the first water container 220 through the pressure and air/gas releasing way 206 during the water flow from the first water container 220 into the second water container 230 through the water overflow way 207. The tiptop 501 on the shaft 510 of the AAB device 500 is used to adjust the irrigation method for the root area as described in FIGS. 5C (a) and 5G. The tiptop 314 of the shaft 310 of the water flow rate controlling device 350 is used to adjust the water drip or flow rate. The structure of the water conduction channel 527 and air/gas conduction channel 522 is further used to link with the AWPAE device 700.

Figure 6C:
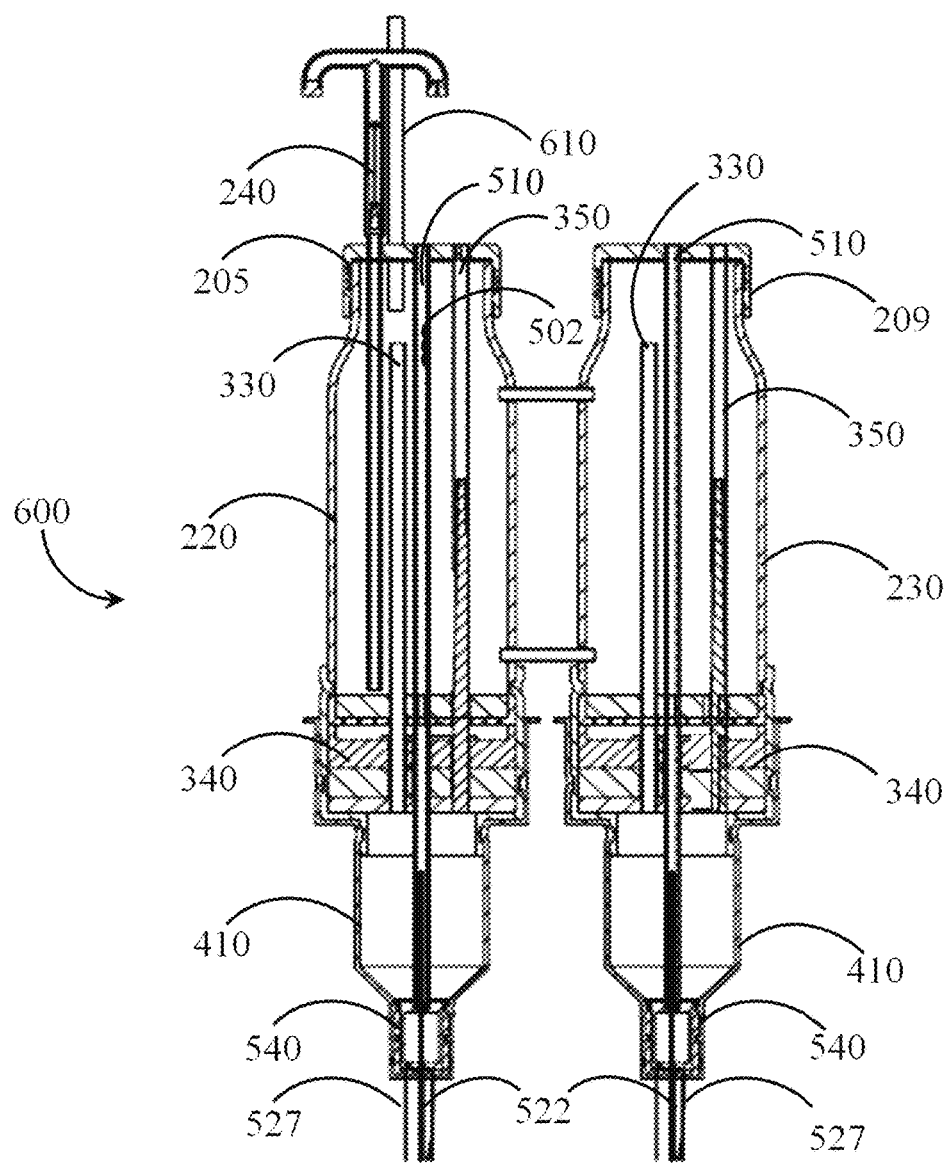

FIG. 6C is a section view of the well assembled top portion 600 of the UIFR device 750. The first water tubular structure 610 is inserted into the container 220 through the penetrative hole 201. The second pressure and air/gas releasing tubular structure 330 is a channel to release the pressure and air/gas from the funnel water container 410 to the first water container 220 and the second water container 230. While the pore 502 at the top portion of the shaft 510 to form the third pressure and air/gas releasing tubular structure 521, which is another channel for air/gas effusion and diffusion from the soil in the root area via the AWPAE device 700. The first pressure and air/gas releasing tubular structure 240 is the only and the main way in the present invention to release the pressure and air/gas from the first water container 220, the second water container 230 via the second and third pressure and air/gas releasing tubular structure 330 and 521. The water drip controlling device 340 and the water flow rate controlling device 350 are used to adjust the water percolating speed to the soil. It should be pointed out that the second pressure and air/gas releasing tubular structure 330 is shared by both of the water drip speed controlling device 340 and the water flow rate controlling device 350.

The funnel water container 410 is a container and connector to house the water from the first water container 220 and the second water container 230, and to conjointly link the AAB device 500 and the AWPAE device 700 with the first water container 220 and the second water container 230. The water conduction channel 527 and the air/gas effusion/diffusion channel 522 allow the water percolating continuously and slowly to the soil in the root area, and simultaneously the air/gas in the AWPAE device 700 is released to the first water container 220 and the second water container 230 via the third pressure and air/gas releasing tubular structure 521. The water percolating provides kinetic energy and pressure for air/gas to be effused from the AWPAE device 700 to the containers 220 and 230. The air/gas conduction channel 522 also provides an air/gas diffusion channel for fresh air diffusing into the soil in the root area. Therefore, the first and third pressure and air/gas releasing tubular structures, 240 and 521, in fact, are anti-flooding structure for each plant to allowed the $CO_2$/gas released from the root area.

Figure 7A:
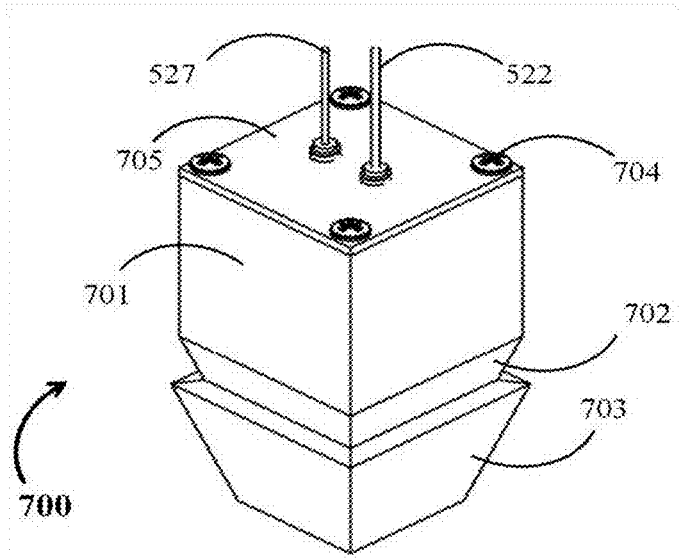
FIG. 7A to FIG. 7B are perspective and exploded views to show an AWPAE device structure.

FIG. 7A is a perspective view of the AWPAE device 700. The water conduction channel 527 and the air/gas effusion and diffusion channel 522 link the AWPAE device 700 with the top portion 600 to form an UIFR device 750. The top panel 705 is used to keep the main cube part 701 of the AWPAE device 700 closed by using the screw 704. The lower part 702 is a trapezoid shaped part and is further closed by a larger trapezoid filter 703.

Figure 7B:
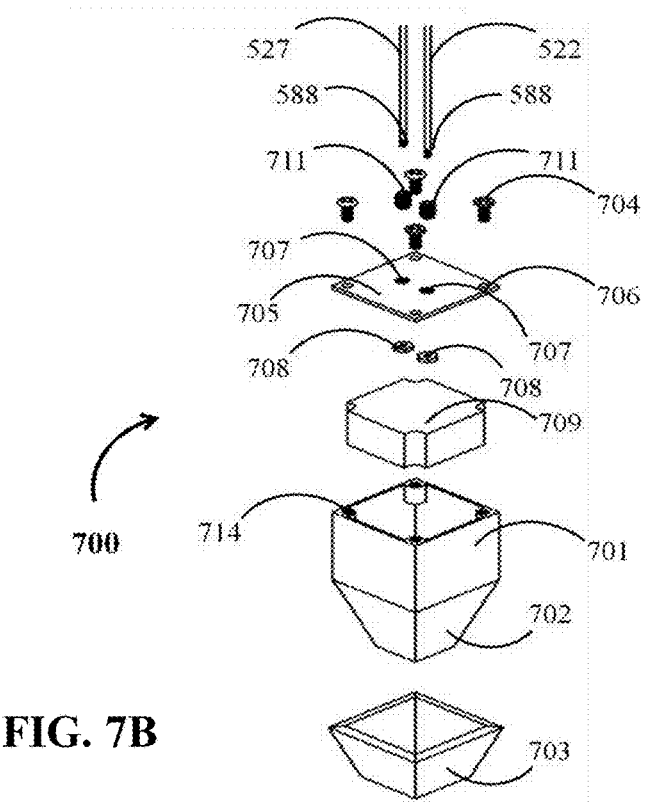

FIG. 7B is an exploded view of the AWPAE device 700. The water conduction channel 527 with the threaded end 588 and the air/gas diffusion channel 522 with the threaded end 588 are used to screw with two screws 711 first and then pass through the two threaded penetrative hole 707 on the top panel 705 to screw with the other two screws 708. There is a first filter 709 to fill the bottom portion of the cube 701. It is very important here that to have the top half portion of the cube part 701 and the whole lower trapezoid part 702 to be two separated empty space structures, of which inhibit any root, bacteria or living organisms survive and grow, especially when a AWPAE device 700 finish watering the plant, the most of time will keep the AWPAE 700 to be filled with air/gas without water; or the AWPAE device 700 being shuttled down according to the real time and real-location data provided by the wireless and remote monitoring indicating device 880, or LED light indicating device 850 and the movable red flag indicating device 800 as described in FIGS. 8L, 8G and 8C.

The second trapezoid shaped filter 703 is used to match with the trapezoid shaped water container 702 to prevent the root into the room 702 and further to pass through the filter 709 to clog both the water conduction channel 527 and the air/gas conduction channel 522 in the AWPAE device 700. Both the first filter 709 and the trapezoid shaped filter 703 are made of coconut fiber or plastic or similar materials to prevent the root growing through and further clogging both water conduction channel 527 and the air/gas effusion and diffusion channel 522.

Figure 7C:
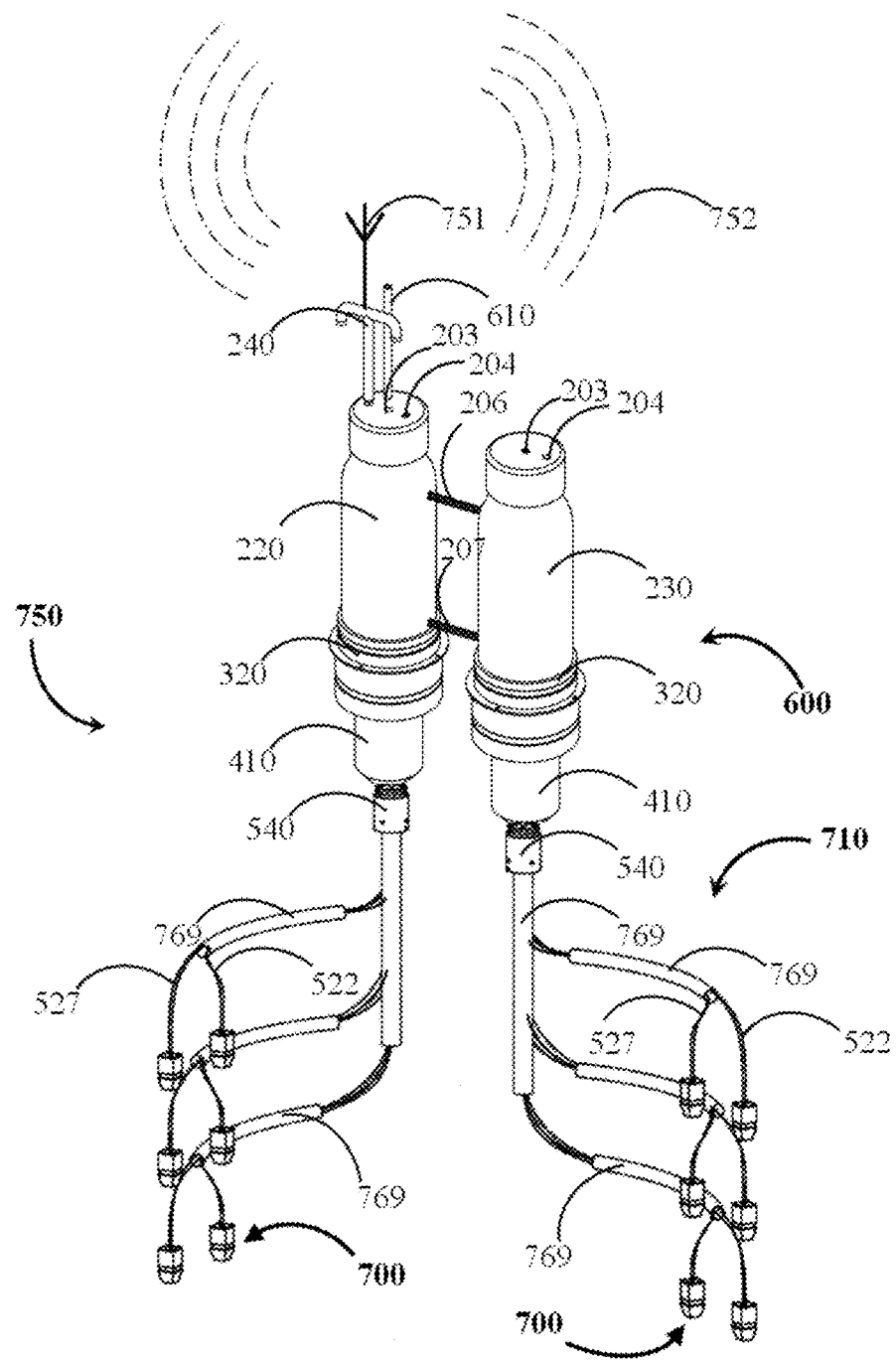
FIG. 7C is a perspective view of a well assembled UIFR device 750, including the top, the lower portions and the linkers to link both the top and the lower portions together to form an UIFR device.

FIG. 7C demonstrates a well assembled UIFR device 750. The multifunction UIFR device 750 comprises of the top portion 600 and the lower portion 710 linked by the water conduction channel 527 and air/gas conduction channel 522 to form a multifunctional UIFR device 750 for underground irrigation and fertilization of a plant in the root area. The reference number 751 indicates an antenna used by ZigBee End device and RFID tag to receive or emit data via radio frequency 752 related to the UIFR device 750 and the adjacent plant. As detailed in FIG. 6B, the top portion 600 comprises of the first water container 220 and the second water container 230. Both the first water container 220 and the second water container 230 linked by the first horizontal tubular structure 206 and the second horizontal tubular structure 207. Each of the first water container 220 and the second water container 230 further has connected with a water drip speed controlling device 340, water flow rate controlling device 350 and a AAB device 500 via the vessel 320 and the funnel water container 410.

The lower portion 710 comprises of the AWPAE device 700 and vinous of protection tubular structure 769 to protect the linkers, 522 and 527, for linking both the top portion 600 and the lower portion 710 together and to form a set of UIFR device 750. When water reaches to each of the AWPAE device 700, the air/gas inside of each of the AWPAE device 700 will be effused to the first water container 220 and the second water container 230 via the air/gas diffusion channel 522 and the third pressure and air/gas releasing tubular structure 521, and finally released to the atmosphere via the first pressure and air/gas releasing tubular structure 240. The water conduction channels 527 and the air/gas diffusion channel 522 are protected by the protection tubular structure 769 due to the force from plant root growing may damage those tiny thin channels 527 and 522 and further to affect the water flow and air/gas effusion/diffusion for the whole UIFR device 750. The PVC tubular structure or similar tubular material are used as protection tubular structure 769 to protect the water and air/gas conduction channels 527 and 522.

Figure 7D:
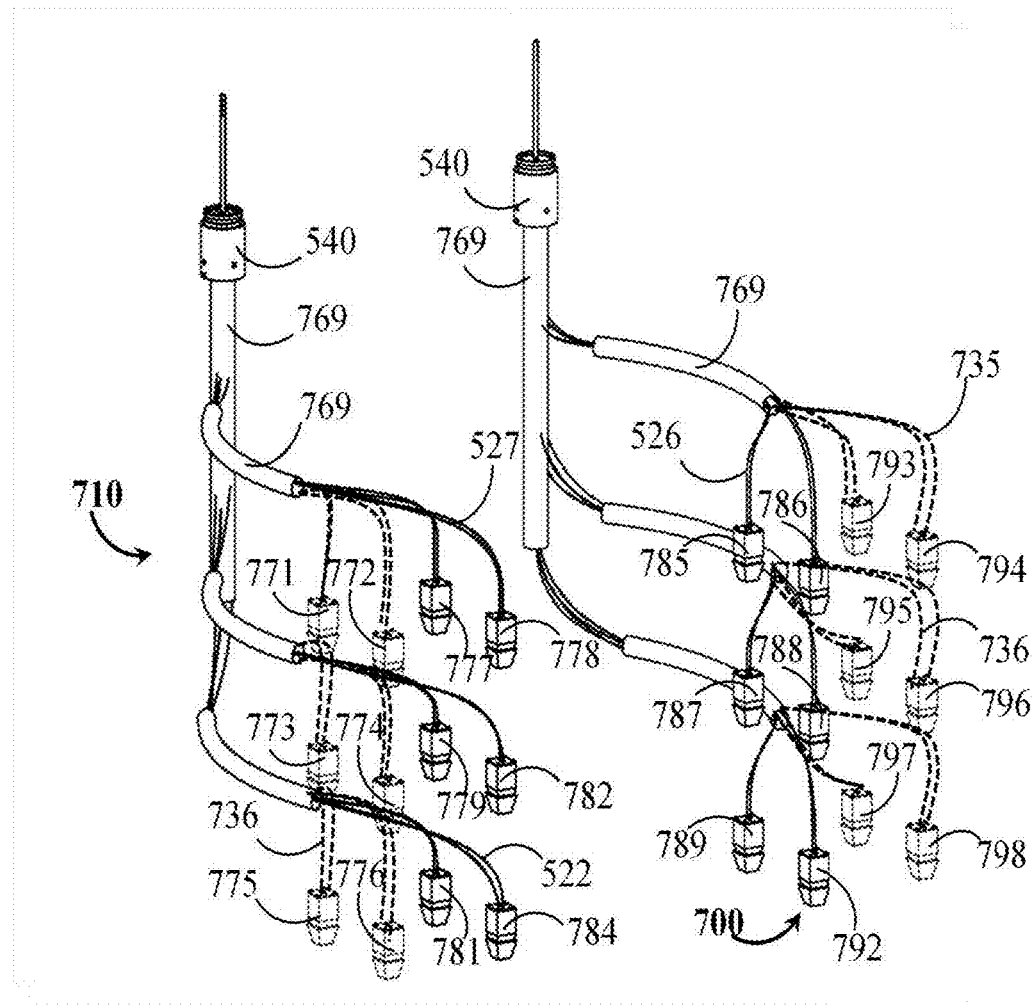
FIG. 7D is a perspective view of the lower portion of the UIFR device used in the field.

FIG. 7D is a partial perspective view to detail an example how the lower portion 710 of the UIFR device 750 distributes underground soil in the roots area. In order to demonstrate in a better view, all top portion being taken away and only show the third tubular structure 540 to connect with the water conduction channel and the air/gas diffusion channel, represented by solid lines 527 and 522 with protection tubular structure 769. The solid line, for water conduction channel lines and the air/gas conduction channel 522 and 527 connected with each AWPAE device 700 represented the working group. The breaking line for water conduction channel and air/gas conduction channels 735 and 736 connected with an AWPAE devices 700 to form a reserved group. These reserved group AWPAE devices 700 are used for replacing the working group if the water percolating speed become extremely slow according to the information obtained from indicators as showed in FIGS. 8A to 8L.

As afore described in FIG. 5G, the watering patterns are controlled by the AAB device 500 via the first rotatable tubular structure 520 and the second and third tubular structures, 530 and 540. Here is another way to help to understand how the watering patterns were controlled via the AAB device 500 and the AWPAE devices 700 linked by the water conduction channels 527 and the air/gas conduction channels 522:

A. At the top root area, there is a working group of the AWPAE device 700 placed around the plant. There are two AWPAE devices 700 on the left side of top root area, the number 777 is for the left back top (LBT) root area and the number 778 is for the left front top (LFT) root area; the other two AWPAE devices 700 are placed the at the right side of top root area, the number 785 is for the right back top (RBT) root area and 786 is for the right front top (RFT) root area.

To avoid future digging the device out for replacement of the damaged or over slow of an UIFR device 750 near or in the root area, we presented here that four reserved AWPAE device 700, as linked with broken lines 735 and 736, are reserved group for replacing the working group, in the case, the working group becomes extremely slow in water percolating from the water containers. These reserved AWPAE devices 700 linked with break lines, numbered as 735 and 736 linked with AAB device 500 are used for top root area. The AWPAE devices 700 numbered as 771 is used for the left back top (LBT) root area and the numbered as 772 is for the left front top (LFT) root area; The AWPAE devices 700 numbered as 793 is used for the right back top (RBT) root area; numbered as 794 is used for the right front top (RFT) root area.

B. In the middle roots area, four AWPAE devices 700 are put into the left side area, including device numbered as 779 for the left back middle (LBM) area, device numbered as 782 for the left front middle (LFM) area, device numbered as 787 for the right back middle (RBM) area, and device numbered as 788 for the right front middle (RFM) root area. There are also four reserved AWPAE devices 700, linked with an AAB device 500 with break lines, numbered as 735 and 736 for the middle root area. The reserved AWPAE devices 700, numbered as 795 is for the right back middle (RBM) root area; the reserved AWPAE device 700, numbered as 796 is for the right middle front (RFM) root area. While the reserved AWPAE devices 700, numbered as 773 is for the left back middle (LBM) root area and the reserved AWPAE device 700, numbered as 774 is for the left middle front (LFM) root area.

C. In the deep root area, four working AWPAE devices 700 are placed, including the AWPAE device 700, numbered as 781 for the left back deep (LBD) root area, the AWPAE device 700, numbered as 784 for the left deep front (LFD) root area, the device 789 for the right back deep (RBD) root area, and device 792 for the right front deep (RFD) root area. There are also four reserved AWPAE devices 700 linked with break lines in the deep root area. The reserved AWPAE device 700, numbered as 797 is located for the right back deep (RBD) root area; the reserved AWPAE device 700, numbered as 798 is for right front deep (RFD) root area. While reserved AWPAE devices 700, numbered as 775 is for the left back deep (LBD) root area and the reserved AWPAE device 700, numbered as 776 is for the left front deep (LFD) root area.

As demonstrated in FIG. 5C (a) and FIG. 5G, each AAB device 500 can create 18 watering programs and methods for irrigation of the left or for the right root area of a plant.

Therefore one UIFR device 750 with two AAB devices 500, linked with the first water container 220 and the second water container 230, can have more than 300 watering programs and methods for underground irrigation through various combination between the 18 watering programs and methods via the first AAB device 500 with the 18 patterns via the second AAB device 500 (see FIG. 5G for details).

In fact, one UIFR device 750 is also a anti-flooding channel to help the soil and plant root respiration, since the UIFR device 750 allows the pressure and air/gas released from the soil in the root area via the AWPAE device 700, from the funnel water container 410 and from the first water container 220 and the second water container 230. Please see FIGS. 2A, 2D, 3H, 5A, 5C (a), 5F and 7C for details. Because of the above described function of releasing the pressure and air/gas from the soil and root, the UIFR device 750 provides a powerful strategy to protect each of the plant from the damage caused by water-logging during the rainy season for the low-lying land in certain regions, since the first pressure and air/gas releasing tubular structure is a perfect channel for gas released from the soil and the root to anti-flooding.

Figure 7E:
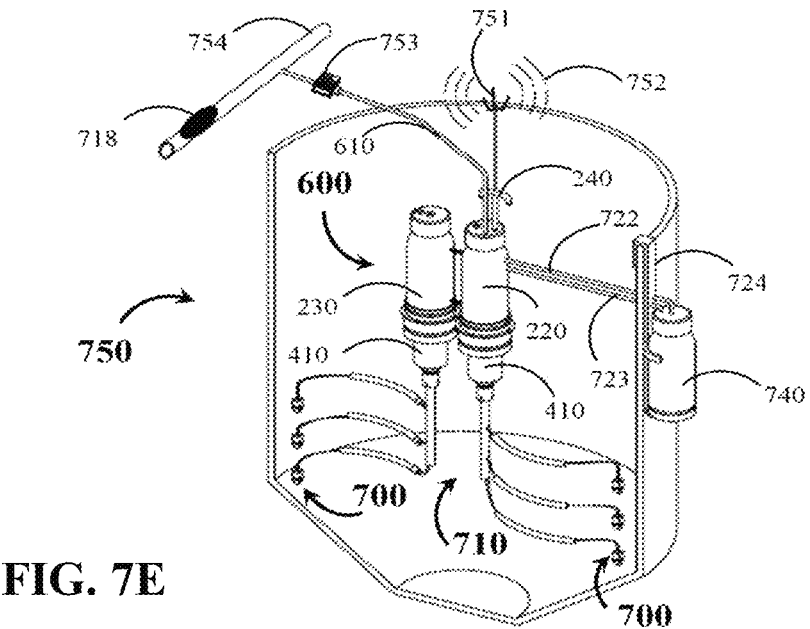
FIG. 7E and FIG. 7F are partial cut away and take away perspective views to show the application of an UIFR device used in a pot for plant cultured indoor or outdoor.

FIG. 7E is a perspective view after cutting away the pot and taken away all soil and tree to detail the UIFR device 750. The top portion 600 comprises of an antenna 751 for a ZigBee End device or RFID tag to emit RF signal 752 to transfer all collected data or receiving the order from the system or receive calling from data center as showed in FIG. 8L. The water inletting tubular structure 610 allows the water to flow into the first water container 220 and the second water container 230 via the water overflow way 207 as showed in FIG. 2A. The first wireless remote controlled switch 753 is used to control the water flowing into the first container. In order to avoid any possible overtime watering and further cause the nearby indoor or outdoor properties damage, there is a second wireless switch 718 being equipped on the conduit 754, which can shut down the water supply from conduit 754 to the first container 220 and the second container 230 (see FIGS. 8I to 8L for details).

The water supply from the conduit 754 will be turn out whenever the first and second water containers is over filled for any reason and the water is above the highest level, as result, the switch 753 will be turn on which will emit a signal to the wireless switch 718, the data center, the three-in-one data collector or the mobile phone. Once the second wireless switch 718 received the signal, it will immediately shut down the water. Therefore the UIFR device 750, in fact, is a remote controllable wireless device and it can be used for all plant culture indoor or outdoor for any purpose as desired.

As afore introduced, the first pressure and air/gas releasing tubular structure 240 allows all pressure and air/gas to be released from both the UIFR device 750 and the soil in the root area. Except the two horizontal tubular structures, 206 and 207, for pressure and air/gas and the water releasing or exchanging between the first water container 220 and the second water container 230, there are two tubular structures, 722 and 723, to link the overflow water container 740 with the first water container 220. The tubular structure 722 is used for the air/gas to be released from the overflow water container 740 when overflow water is flowing from the first container 220 to the overflow water container 740 via the tubular structure 723. The overflow water container holder 724 is used to hold the overflow water container 740. The top portion 600 of the UIFR device 750, including the first water container 220, the second water container 230, the vessel 320, the funnel water container 410 and the second tubular structure 530 of the AAB device 500, is further connected with the AWPAE device 700 to form an UIFR device 750 for the potted plant.

Figure 7F:
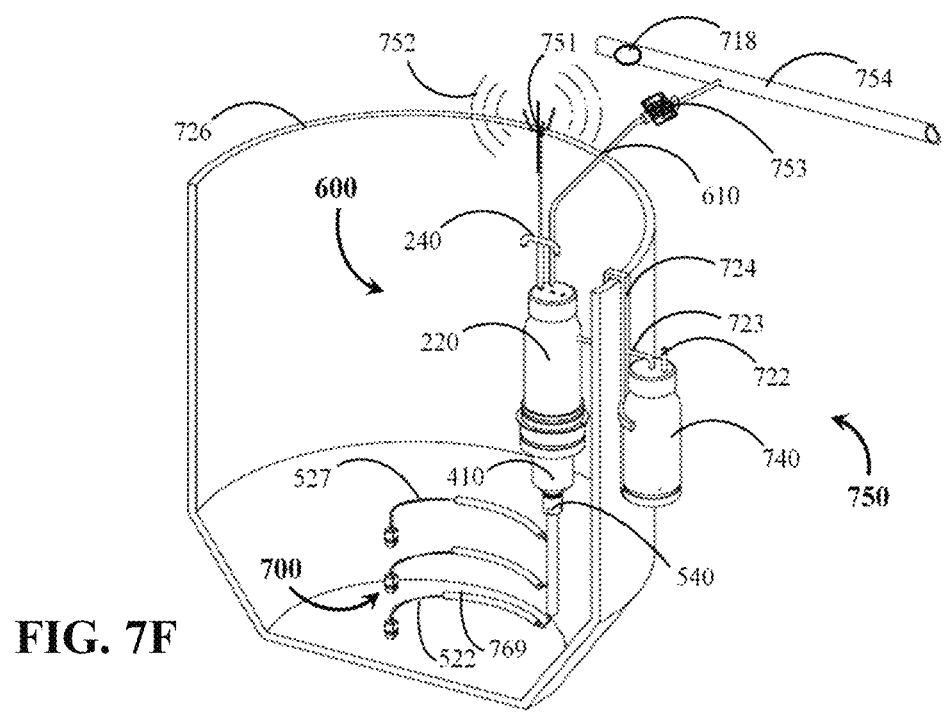

FIG. 7F is another taken away perspective view to show another possible way to use an UIFR device 750 for small plant in the small pot or the small container cultured indoor or outdoor. The UIFR device 750 showed exactly the same system as showed in FIG. 7E, except only one AAB device 500 with one water container 220 connected with the AWPAE devices 700 to form an UIFR device 750 for the potted plant via the water conduction channel 527 protected by the protection tubular structure 769 and air/gas diffusion channel 522 for the small or slow growing plant the pot or container.

Figure 7G:
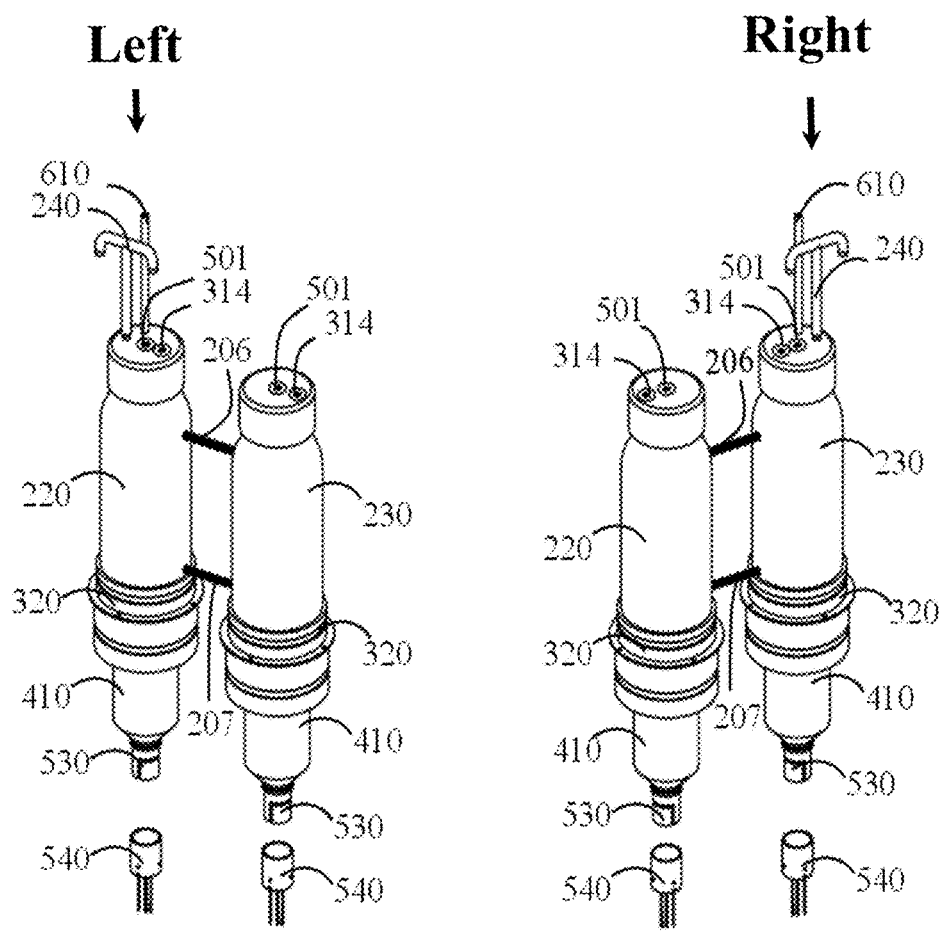
FIG. 7G is a perspective view to detail how to maintain or repair an UIFR device, especially demonstrates how to turn the reserved water channels into working channels.

FIG. 7G is a perspective view to show the way how to turn the reserved watering group to working group if the working group is damaged or water percolating speed become too slow. As arrowed with word "left", the first pressure and air/gas releasing tubular structure 240 and the water inletting tubular structure 610 are always located on the left side. To hold the top portion 600 and turn 90 degree in counterclockwise direction, The convex structure 511 on the inner wall of the third tubular structure 540 will now locate in the groove 509 on the second tubular structure 530 (see FIGS. 5B, 5D and 5E (A) for detail structures). Then hold the top portion 600 and vertically pull upward, the second tubular structure 530 will separated with the third tubular structure 540. After free the second tubular structure 530 with the funnel water container 410, to pull out each of all the stoppers 558 from each of the watering connector 526 or keep some the stoppers to the each of the watering connector.

Otherwise, simply turning the whole top portion 180 degree first (attention here) to keep the first pressure and air/gas releasing tubular structure 240 and the water inletting tubular structure 610 on the right side, and then insert the second tubular structure 530 into the third tubular structure 540, in fact, allowed the convex 511 to match with groove 509, following by turning the top portion 600 for 90 degree in clockwise direction. As result, the water channels, 570, 571, 572, 573, 574 and 575 on the second tubular structure 530 will align with 577, 580, 578, 581, 579 and 582 on the third tubular structure (see FIGS. 5C, 5D and 5E). The lid 1001 for cover the protecting container 1002 must turn 180 degree so that to keep both the first pressure and air/gas releasing tubular structure 240 and the water inletting tubular structure 610 on the right side. The next time changing, both the first pressure and air/gas releasing tubular structure 240 and water inletting tubular structure 610 must turn 180 degree to keep both tubular structures, 240 and 610 on the left side.

FIG. 8A is an exploded perspective view of the movable red flag indicating device 800. The triangle movable red flag 820 is fixed onto the top shaft 830. The end of the flag post 830 further fixes onto the foamed plastic floating structure 835. The movable red flag indicating device 800 residents in the first pressure and air/gas releasing tubular structure as showed in FIG. 2D (a) and FIG. 2D (b). When the water is flowing into the first water container 220, the foamed plastic floating structure 835 floats on the surface of the water so that the movable red flag 820 will rise up in the first pressure and air/gas releasing tubular structure 240 accordingly. In order to collect accurate data from the movable red flag indicating device 800 for each of all underground irrigation devices used for each individual plant, it is important to keep each of all indicator devices to be balanced with the equal weight. The volume scale 243 (see FIG. 2D (a) for detail) is also used to calculate the water percolating speed from the first water container 220 and the second water container 230 by recording the time for movable red flag 820 from the highest water volume level to the lowest water volume level. The movable red flag indicating device 800 simply makes the watering process to be visible, but the monitoring each of all trees in culture will be a high labor cost and very slow process. The movable red flag indicating device 800 provides a visible way to see if the underground irrigation is working well or not.

FIG. 8B is a perspective view of the first pressure and air/gas releasing tubular structure 240 used for housing the sensors and the LED light device 850 and the sensors and the wireless and remote monitoring indicating device 880. The penetrative window 804 is a special structure for protecting both sensors and the devices. The window is located at the middle portion and is above the lid 1001 of the protection container 1002 used as a water overflow way to avoid the water overflow from the upper portion of the first pressure and air/gas releasing tubular structure 240, if over-irrigation happened.

FIG. 8C is a perspective view to show the inner structure of the cylinder foamed plastic structure 840. The inner structure of the cylinder foamed plastic structure 840 is a identical structure as the outer of the foamed plastic floating structure 835, which is used to float the shaft 830, the movable red flag 820 and the LED lights 803. The movable cylinder foamed plastic structure 840 and the window 804 (see FIG. 8B) form the safety valve to prevent the water overflowed from the upper portion of the first pressure and air/gas releasing tubular structure 240 to damage the LED lights 803 fixed on the movable red flag 820. The cylinder foamed plastic structure 840 is another way to keep both the red flag 820 and the movable metal connectors 807 and 809 to be suspended above the window and they will not fall into the container which caused position change and further damage any part, because the initial watering period is an unstable condition. The impact force of inletting water from the water inletting tubular structure 610 and the internal pressure releasing force from the UIFR device 750 will cause the floating parts damage and material fatigue. In order to overcome these affecting factors, it is a better way to keep both the sensor and the floating parts to be suspended busing the cylinder foamed plastic structure 840.

FIG. 8D is an exploded perspective view of the LED light indicating device 850. The LED lights 803 are fixed onto the movable red flag 820. The movable metal connectors 809 and 807 on each side of the movable red flag 820 form a movable sensor when each of the metal connectors is connecting with the power lines (see FIGS. 8E, 8B5 and 8B6 for details) and the plastic lines. The movable metal connector 809 is used to switch the LED light on when the metal connector 809 connects with the metal power lines 890 and each of the break metal lines. The movable red flag 820 is fixed with the top end of the shaft 830. The lower end of the shaft 830 fixes with the foamed plastic floating structure through the penetrative hole on the cylinder foamed plastic structure 840. The circle with broken line shows a perspective bottom view of the cylinder foamed plastic structure 840 (see FIG. 8C) to detail the inner structure, which has a similar shape as the floating foamed plastic floating structure 835. The movable cylinder foamed plastic structure 840 and the window 804 form the safety valve to prevent the water overflowed from the upper portion of the first pressure and air/gas releasing tubular structure 240, if water is overflow happened for any reason.

FIG. 8E is sectional view of the movable sensors and the second LED light indicating device 850 resided inside of the first pressure and air/gas releasing tubular structure 240. The well assembled LED light indicating device 850 includes the movable red flag 820, the shaft 830, the cylinder foamed plastic structure 840, the foamed plastic floating structure 835 and the first pressure and air/gas releasing tubular structure 240 to form the sensor. The safety valve is in the opened condition since the window 804 is opened and the cylinder foamed plastic structure 840 is jointed with the floating foamed plastic floating structure 835 in the location above the window 804.

When the cylinder foamed plastic structure 840 raised up by the floating foamed plastic floating structure 835, it means that all over-irrigating water will flow to the outside ground from the container 220 through the window 804. When the movable red flag 820 is raising up during the course of the irrigation through the first water container 220 and the second water container 230, the movable metal connector 809 will connect with the power lines 890 and each of the broken metal lines, what we call the main parts of the sensor, the LED light is then switched on. Both the movable metal power line 890 and each of the broken metal lines, 822, 823, 824, 825, fixed inside of the direction groove on the wall of the first pressure and air/gas releasing tubular structure 240 to form the various sensors to detect the increased water volume and the decreased water volume. Therefore, the sensors can not only detect changes in the volume of water, but also can monitor UIFR equipment working conditions real-time and real-time.

However, when the movable metal connector 809 in the sensor aligned with the plastic line 870, the LED light is switched off. Therefore the movable red flag 820 with the movable metal line 809, each of the broken metal lines 822, 823, 824, 825, the metal line 890 (see FIG. 8H for details) and the plastic lines 870 together form a various movable sensors with the ability to turn on/off the LED light 803 automatically to indicate the whole underground irrigation process, including the water flowing into the first water container 220 and the second water container 230 and the water percolating from the first water container 220 and the second water container 230 to the soil in the root area. The different colors of the LED light provide another easy way to monitor how many gallons or liters or milliliters of water have flowed into the first and the second water container, 220 and 230. When the movable red flag 820 raised to the highest level and the water supply is stopped, each of the LED lights 803 on the movable red flag 820 will further provide more information about how many gallons or liters or milliliters of water are percolated into the underground soil in the root area from the first water container 220 and the second water container 230 according to each color of the LED light on and the volume scale 243.

The total time spent for the total water percolating into the soil in the root area will further provide more information about the soil structure, the working condition of the AAB device 500 and the AWPAE device 700. According to the information mentioned above, timely adjusting the water drip speed controlling device 340 or water flow rate controlling device 350 or adjusting watering pattern via the shaft 510 in the AAB device 500 will benefit each of the individual plant. It is also important to timely replace the problematic working group of AWPAE device 700 with the reserved group of the AWPAE devices 700 as described in FIGS. 5C (a), 5F1, FIG. 7D and FIG. 7G.

The data about the total water volume in the UIFR device 750 can be compared and further corrected with the data obtained from the movable irrigation controlling device as showed in FIG. 12. The total water volume for each plant through the UIFR device 750 can be expressed as:

$$TW = W1 + W2 + W3$$

of which the TW represents the total water volume used during the irrigation process; W1 represents the water in the first water container 220 and the second water container 230; W2 represents the water in the funnel water container 410 and W3 represents the total amount of water percolating into the soil via the AWPAE device 700 during the time water start to flow into the first water container 220 to the time when the water supply stop flowing into the first water container 220. Calculating the total amount of water and recorded the total time used for water percolating into the soil, It will be exactly to know the water drip speed or water flow rate and to monitor the working condition of an UIFR device 750 and each related parts. Also, these time related data can be used to adjust the water drip speed controlling device 340 and the water flow rate controlling device 350. Furthermore, all these data will be very helpful for plant culture management and knowingly know exactly how many galleons or liters water are efficient and enough for plant growing in different stage. Also this data will further help to know the total amount of fertilizer required by each individual plant to achieve the best result for fruit yield. This is what modern horticulture required and the same for scientific research.

FIG. 8F and FIG. 8G are sectional views of the first pressure and air/gas releasing tubular structure 240 with the LED light indicating device 850. The metal power lines 890 and the broken metal line 825 are buried inside of the directing groove 806 on the tubular structure 240. The directing grooves 806 are used to house the movable metal connector 809 and 807 on the side of the movable red flag 820 to allow the movable red flag 820 to move up or down along each of the directing grooves 806. The shaft 830 is at the center of the tubular structure 240. The plastic line 870 is a place for stopping the electrical currency and as a result, the LED light is turned off.

Figure 8H:
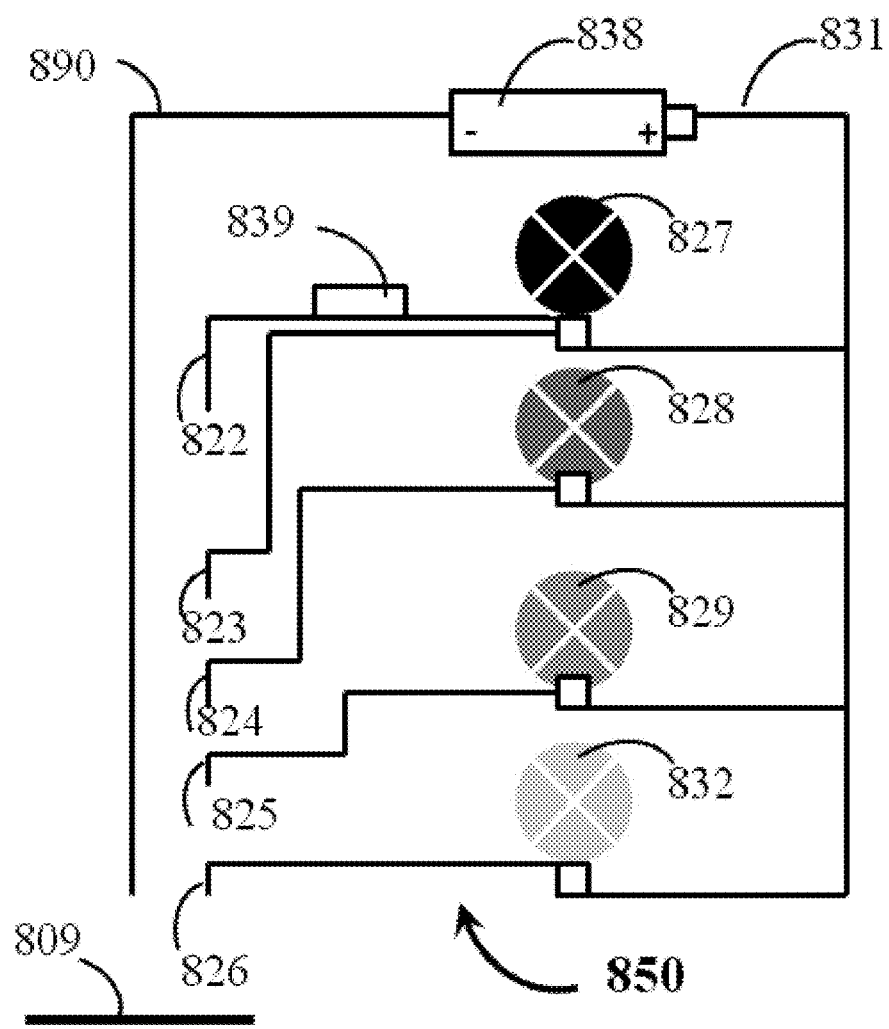

FIG. 8H is a schematic diagram shows the components and interconnections of the circuit for the LED lights indicating device 850. The movable metal connector 809 is fixed on the lateral side of the movable red flag 820. The battery or rechargeable battery 838 is the power source for each of the LED lights 832, 829, 828 and 827. When the movable metal connector 809 on the movable red flag 820 is connected with the negative electrode line 890 and each individual of those broken negative electrode lines, 826, 825, 824, 823 and 822, the LED lights 832, 829, 828 and 827 are on. The positive line 831 from the battery directly linked with each of the LED lights. As afore said, to record the time when each LED light is on and the number on the volume scale 243 where the movable red flag 820 pointed, it tells the true amount of water is flowing into the first water container 220, the second water container 230, the funnel water container 410, and is percolating to the soil in the root area via the AWPAE device 700. The top LED light 827 has two negative electrode lines 823 and 822.

When the line 823 is linked with the line 890, it indicates that the water is at the highest position in the first water container 220 and the second water container 230. If the movable metal 809 is linked with a flash module 839 via the line 822, the LED light 827 will be on in a flashing way. This indicates that over-irrigation is happening to this individual irrigation device.

When water reached to the highest point and the LED light 827 is on, it is the time to finish water supply. From the time when the watering stopped, it is the time for water to percolate to the soil in the root area. To record the time and the irrigation volume when each color LED light is on due to the movable connector metal 809 is linked the negative electrode line 890 and each broken metal lines, 826, 825, 824, 823 and 822. These data will indicate the soil texture, the irrigation device working condition and water drip speed or flow rate or both, furthermore these data will show the whole horticulture to be managed at an individual level for each plant and the individual UIFR device 750 with real time and real location.

Figure 8I:
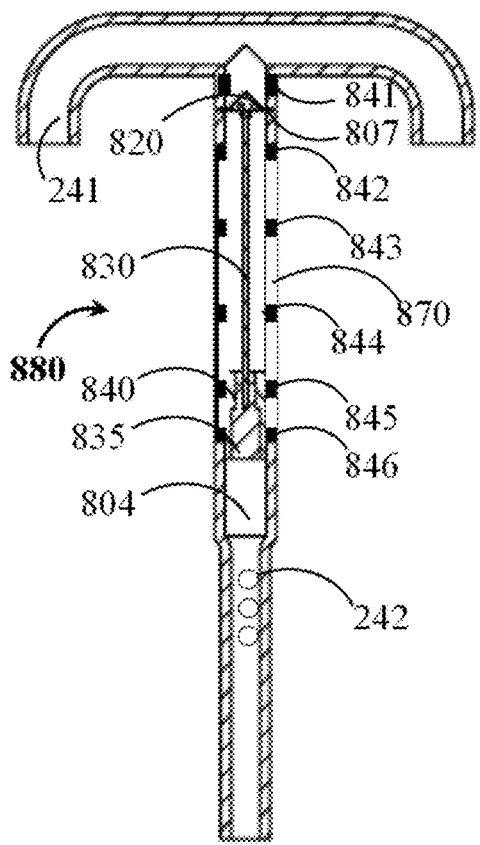
FIG. 8I to FIG. 8L are perspective, sectional and schematic diagrams to detail the structure of the wireless and remote monitoring indicator and the sensors used to monitor and remote control each of the UIFR devices.

FIG. 8I is a sectional view of the structure of various sensor used for the wireless and remote monitoring indicating device 880. The first pressure and air/gas releasing tubular structure 240 is the main part of the sensor. That the first pressure and air/gas releasing tubular structure allow the movable red flag 820, the shaft 830, the cylinder foamed plastic structure 840 and the foamed plastic floating structure 835 to reside inside. The two directing grooves 806 keep the red flag to move upward or downward straight alone the grooves 806. These two directing grooves are very important parts to use the buoyancy of the increased or decreased water in the UIFR device to further allow the movable metal connector 860 to match with each of break lines, 846, 845, 844, 843, 842 and 841, to form various sensors for detecting the different water levels. The sectional view of the wireless and remote monitoring indicating device 880 is in the location where the safety valve is opened since the cylinder foamed plastic structure 840 stays above the window 804. The cylinder foamed plastic structure 840 raised up by the foamed plastic floating structure 835. It means that all over-irrigation water will flow from the first water container 220 to the outside ground through the window 804.

Both the metal negative electrode power line 860 and the break negative electrode metal lines, 841, 842, 843, 844, 845, and 846 are fixed on the wall of the directing groove 806 (see FIG. 8J and FIG. 8L) of the first pressure and air/gas releasing tubular structure 240. The directing groove 806 is used to hold the movable red flag 820. When the movable red flag 820 is raising up along the directing groove 806 during the course that the water is flowing into the first water container 220 and the second water container 230, the movable metal connector 807 will connect with the metal power line 860 and the broken metal line 846, and the watering data collecting (hereinafter, WDC) device. The WDC device linked with a Zigbee® device 858 is then switched on.

When the movable metal connector 807 moves to the directing groove 806 without any metal line, the WDC device linked with a Zigbee® device 858 is switched off. Therefore the movable red flag 820 with the movable metal connector 807, the negative electrode metal line 860 and the different level broken negative electrode metal lines, 846, 845, 844, 843 and 842, formed various movable sensors at different levels to detect the water volume in the UIFR device. According to the negative electrode broken metal lines, 846, 845, 844, 843 and 842 at the different levels in the first pressure and air/gas releasing tubular structure 240, each time switch on/off actually tells the real time of the water volume in the UIFR device 750 via the RF signal emitted by ZigBee End device 858 when each correspondent switch being turned on. The WDC device linked with a Zigbee® device is automatically turned on and off according to the water volume increasing in the UIFR device 750, of which lead to the movable red flag 820 raised up along the directing groove 806 with floating foamed plastic floating structure 835 and as a result of the water increasing or decreasing in the first water container 220, the WDC device linked with a Zigbee® device is then turned on or off accordingly.

Figure 8J:
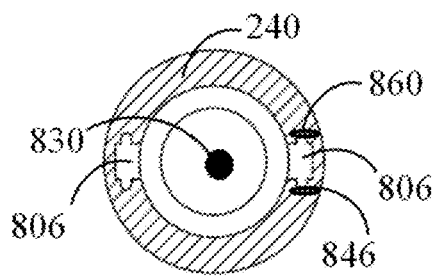
Figure 8K:
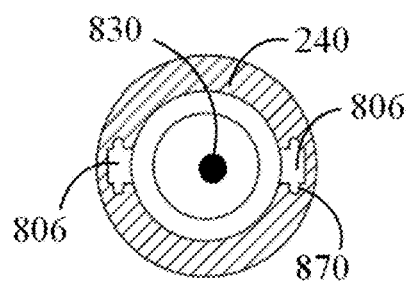

FIG. 8J and FIG. 8K are sectional views of the first pressure and air/gas releasing tubular structure 240 with the resident of the wireless and remote monitoring indicating device 880. The metal lines 860 and 845 are buried inside the directing groove 806 of the first pressure and air/gas releasing tubular structure 240. The directing grooves 806 are used to house the movable metal connectors 807 on the lateral side of the movable red flag 820 to allow the movable red flag 820 to move up or down along each of the directing grooves 806. The shaft 830 is in the center of the first pressure and air/gas releasing tubular structure 240. The reference number 870 is the place without metal line and isolated from the electrical and as result, the WDC device linked with a Zigbee® device 858 is turned off.

Figure 8L:
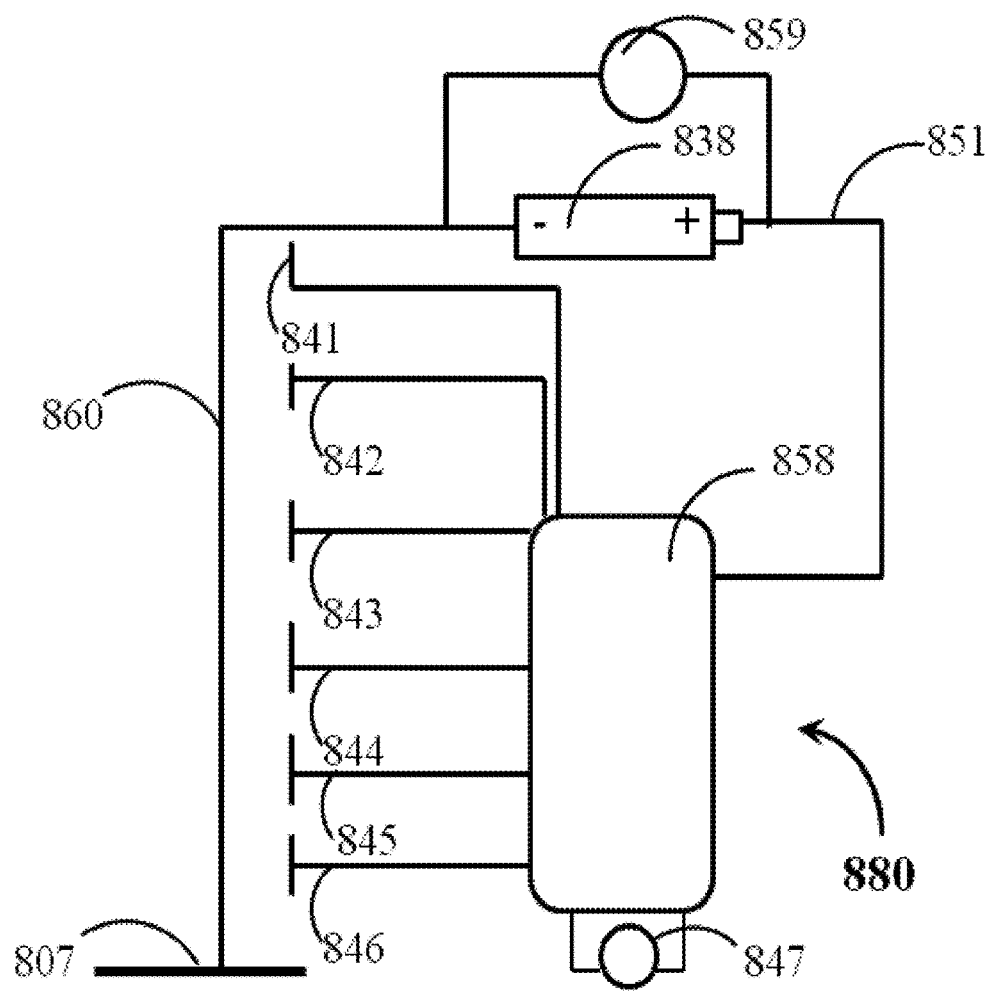

FIG. 8L is a schematic diagram shows the components and interconnections of the circuit for the wireless and remote monitoring indicating device 880. The movable metal connector 807 is fixed on the lateral side of the movable red flag 820. The battery 838 is an independent power source for the WDC device linked with a Zigbee® device 858. The battery 838 will supply power to the WDC device linked with a Zigbee® device 858 when each of sensors detect the water increased to each different volumes in the UIFR device. The WDC device linked with a Zigbee® device 858 will emit signal to the ZigBee Coordinator directly or via ZigBee Router. The data center will record all received signals from each of all UIFR devices with real time and real location. As showed in FIG. 8H, if a LED light indicator 850 is also used in a UIFR device, the battery 838 is shared by both the LED light indicator 850 and the wireless and remote monitoring indicating device 880.

The battery can be either a normal battery or a rechargeable one 838. If the battery 838 is a rechargeable one, it can be a solar or the power from wind generator or D/C electrical power from electrical supplies. The rechargeable battery can be also a wireless rechargeable which will lower the labor cost for battery replacing. No matter what type of battery 838 being employed, it is an independent power resource to enable the various sensors work with the WDC device. Whenever the WDC device linked with a Zigbee® device 858 has power supplied from the independent battery 838, the WDC device linked with a Zigbee® device 858 will emit signal with real time information. Data center will process all data received and further add real location data to form a real time and real-location data for each individual plant and UIFR device.

When the movable metal connector 807 on the movable red flag 820 is connected with the negative power line 860 from the battery 838 and each individual of those broken negative lines 846, 845, 844, 843 and 842, the WDC device linked with a Zigbee® device 858 is on. The positive line 851 from the battery linked directly with the WDC device linked with a Zigbee® device 858. The battery 847 is all time connected with the WDC device linked with a Zigbee® device 858 to enable the WDC device linked with a Zigbee® device 858 to emit signal or receive calling from the ZigBee coordinator whenever to be waked up as programmed.

The WDC device linked with a Zigbee® device 858 is designed to have a special function to emit a signal whenever the WDC device linked with a Zigbee® device 858 gets power supplied from the battery 838 via the movable connector 807 in the sensor connecting with the negative metal line 860 and each of the broken negative lines 846, 845, 844, 843 and 842 at different levels inside the first pressure and air/gas releasing tubular structure 240. All information can be also emitted as programmed time after the data being recorded by the WDC device linked with a Zigbee® device 858 or saved in the WDC device linked with a Zigbee® device 858 till the system order or as programmed to transfer all recorded and saved data to data center directly or via ZigBee routers accordingly.

When the movable metal connector 807 connects with the negative line 860 and the line 846 linked with the WDC device linked with a Zigbee® device, the WDC device linked with a Zigbee® device 858 is turned on. Once the power is supplied, the WDC device linked with a Zigbee® device 858 will emit signal with information as programmed and the data controlling center equipped with a ZigBee coordinator can receive the signal directly or via a Router accordingly. For example, when the movable connector 807 is linked with the negative metal line 860 from the battery 838 with the first line 846 connected with the WDC device linked with a Zigbee® device 858, the WDC device linked with a Zigbee® device 858 is switched on and the WDC device linked with a Zigbee® device 858 will immediately record the real time and further save the real time data. The first line 846 represents that the water volume in the first water container 220 and the second water container 230 reach to the first report volume, e.g.: 200 ml or any desired water volume number that the system programmed.

When the movable connector 807 is linked with the negative power line 860 from the battery 838 with the second line 845 connected with the WDC device linked with a Zigbee® device 858, the WDC device linked with a Zigbee® device 858 is switched on and the WDC device linked with a Zigbee® device 858 will immediately record the real time when the power is supplied and further save the real time data in the tag. The second line 845 represents that the water volume in the first water container 220 and the second water container 230 reach to the second report volume, e.g.: 400 ml or any desired volume number that the system programmed;

When the movable connector 807 is linked with the negative power line 860 from the battery 838 with the third line 844 connected with the WDC device linked with a Zigbee® device 858, the WDC device linked with a Zigbee® device 858 is switched on and the WDC device linked with a Zigbee® device will immediately record the real time and further save the real time data. The third line 844 represents that the water volume in the first water container 220 and the second water container 230 reached to third report volume, e.g.: 600 ml or any desired volume number that the system programmed;

When the movable connector 807 is linked with the negative power line 860 from the battery 838 with the fourth line 843 connected with the WDC device linked with a Zigbee® device 858, the WDC device linked with a Zigbee® device 858 is switched on and WDC device linked with a Zigbee® device 858 will immediately record the real time and further save the real time data. The fourth line 843 represents that the water volume in the first water container 220 and the second water container 230 reached to report volume, e.g.: 800 ml or any desired volume number that the system programmed.

When the movable connector 807 is linked with the power line 860 from the battery 838 with the fifth line 842 connected with the WDC device linked with a Zigbee® device 858, the WDC device linked with a Zigbee® device 858 is switched on and the WDC device linked with a Zigbee® device 858 will immediately record the real time and further saved the real time data. The fifth line 842 represents that the water volume in the first water container 220 and the second water container 230 reached to report volume, e.g.: 1000 ml or any desired volume number that the system programmed.

If the fifth line 842 is not connected within the programmed time period for watering, The WDC device linked with a Zigbee® device 858 will issue a warning signal to the system and the system will further automatically issue a check order to the manager, operator or owner. The individual UIFR device 750 must be checked and report the check result to the system within 24 hours or any longer or shorter time as programmed.

When the movable connector 807 is linked with the negative power line 860 from the battery 838 with the sixth line 841 connected with the WDC device linked with a Zigbee® device 858, the WDC device linked with a Zigbee® device 858 is switched on and the WDC device linked with a Zigbee® device 858 will immediately record the real time and further save the real time data. The recorded real time can be immediately emitted right away to the datacenter. When the WDC device linked with a Zigbee® device 858 being connected with the six line 841, the WDC device linked with a Zigbee® device 858 will also send a switch off signal to shut down the switch 718 on water supply conduit 754 (see FIG. 7E for details) to cut off the water supply to avoid over time and over amount water being sent to the first water container 220 and the second water container 230, further to avoid any potential damage caused by overflow water. Especially, when the UIFR device 750 used for pot or container cultured plant indoor or outdoor, it become so important to have a smart switch to enable automatically to shut down the water switch at any time when overflow happened.

After the water filled up the first water container 220 and the second water container 230 as programmed, e.g.: 1000 ml in the first water container 220 and 1000 ml in the second water container 230, the irrigation time is over and the time is to start for water percolating from the containers into the soil in the root area via the AWPAE 700. As designed, the WDC device linked with a Zigbee® device 858 will record each water percolating volume with real time data as following:

When the movable connector 807 is linked with the power line 860 with the sixth line 841 connected with the WDC device linked with a Zigbee® device 858, the WDC device linked with a Zigbee® device 858 is switched on and the WDC device linked with a Zigbee® device will immediately record the real time data and save the data in the tag. The sixth line 841 represents that the water volume in the first water container 220 and the second water container 230 reduced from the over-irrigating volume e.g.: 1100 ml or over in the first water container 220 and 1100 ml or over in the second water container 230.

When the movable connector 807 is linked with the power line 860 with the fifth line 842 connected with the WDC device linked with a Zigbee® device 858, the WDC device linked with a Zigbee® device 858 is switched on and the WDC device linked with a Zigbee® device 858 will immediately record the real time data and save the data in the tag. The fifth line 842 represents that the water volume in the first water container 220 and the second water container 230 reduced the first 100 ml or 100 ml of water are percolated into the soil in the root area.

When the movable connector 807 is linked with the power line 860 from the battery 838 with the fourth line 843 connected with the WDC device linked with a Zigbee® device 858, the WDC device linked with a Zigbee® device 858 is switched on and the WDC device linked with a Zigbee® device 858 will immediately record the real time data and save the data in the tag. The fourth line 843 represents that the water volume in the first water container 220 and the second water container 230 reduced 200 ml or 300 ml of water are percolated into the soil in the root area.

When the movable connector 807 is linked with the power line 860 from the battery 838 with the third line 844 connected with the WDC device linked with a Zigbee® device 858, the WDC device linked with a Zigbee® device 858 is switched on and the WDC device linked with a Zigbee® device will immediately record the real time data and save the data in the tag. The third line 843 represents that the water volume in the first water container 220 and the second water container 230 reduced 200 ml or 500 ml of water are percolated into the soil in the root area.

When the movable connector 807 is linked with the power line 860 from the battery 838 with the second line 845 connected with the WDC device linked with a Zigbee® device 858, the WDC device linked with a Zigbee® device 858 is switched on and the WDC device linked with a Zigbee® device 858 will immediately record the real time data and save the data in the tag. The second line 845 represents that the water volume in the first water container 220 and the second water container 230 reduced 200 ml or 700 ml of water are percolated into the soil in the root area;

When the movable connector 807 is linked with the power line 860 from the battery 838 with the first line 846 connected with the WDC device linked with a Zigbee® device 858, the WDC device linked with a Zigbee® device 858 is switched on and the WDC device linked with a Zigbee® device 858 will immediately record the real data and save the data in the tag. The first line 846 represents that the water volume in the first water container 220 and the second water container 230 reduced the fifth 200 ml or about 900 ml of water is percolated into the soil in the root area.

FIG. 8I to FIG. 8L demonstrated both visible and hearable ways to remote and monitor if an UIFR device 750 is performing properly as desired by combining the update Zigbee and RFID technology with the UIFR devices.

Figure 9A:
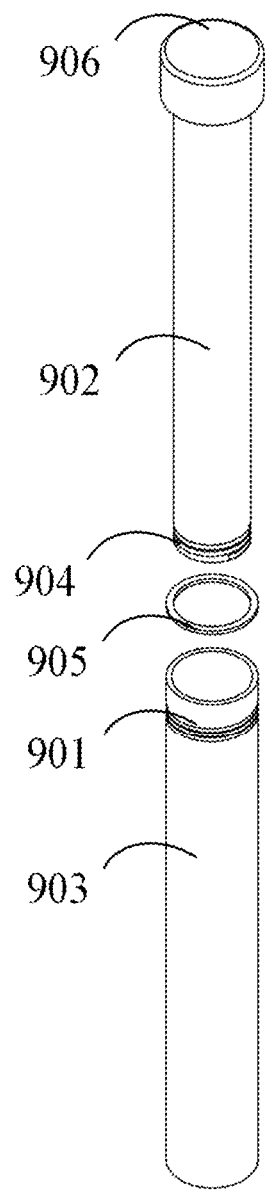
FIG. 9A to FIG. 9C are perspective and sectional views to show the structure of the sample channels used for various purposes to monitor both the UIFR device and the plant.

FIG. 9A is an exploded sectional view of the sample channel 903. The solid column 902 has a jointed threaded cup 906 on the top portion and has a threaded end 904 on the bottom portion. The sealing washer 905 is used to keep the sample channel 903 to be tightly sealed with the solid column 902 to avoid any air/gas releasing, moisture losing or changing in temperature and any other effect related to data measurement or plant root growing and developing. The solid column 902 is further inserted into the sample channel 903, tightly closed by jointly screwing the threaded cup 906 with threaded on the outside wall of the upper portion of the sample channel 903 and to screw with threaded end 904 with threaded inner wall 9004 at the lower end portion of the sample channel 903.

Figure 9B:
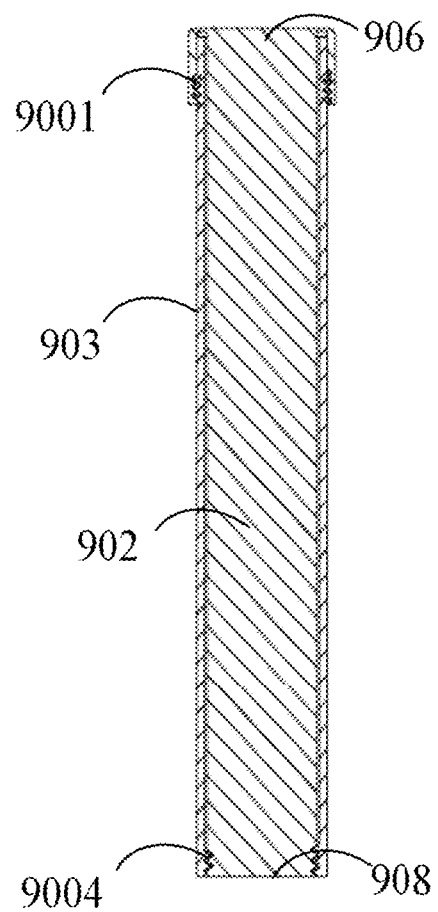

FIG. 9B is a sectional perspective view of the assembled sample channel 903. The solid column 902 is jointly inserted into the sample channel 903. Both the solid column 902 and the sample channel 903 are tightly jointed together via the cup 906 through the threaded inner wall 9001 with threaded outside wall 901 on the upper portion of the sample channel 903 and via the threaded outside end part 904 on the lower portion of the solid column 902 with threaded inner wall 9004 of the sample channel. The solid shaft end part 908 is well connected with the underground soil in the root area. The channel 903, after the solid column 902 being taken out, allows the probes connected with various equipments, such as pH meter, thermometer, water content analyzer and nutrient content analyzer, to measure at different deep underground soil in the root area in live. The data obtained through the sample channel will benefit precision management of horticulture and adjust watering amount, different fertilizer apply at different growing stages. All data obtained from the channel 903 can be also used for scientific researches for different purpose, for different approaches and for different projects.

Figure 9C:
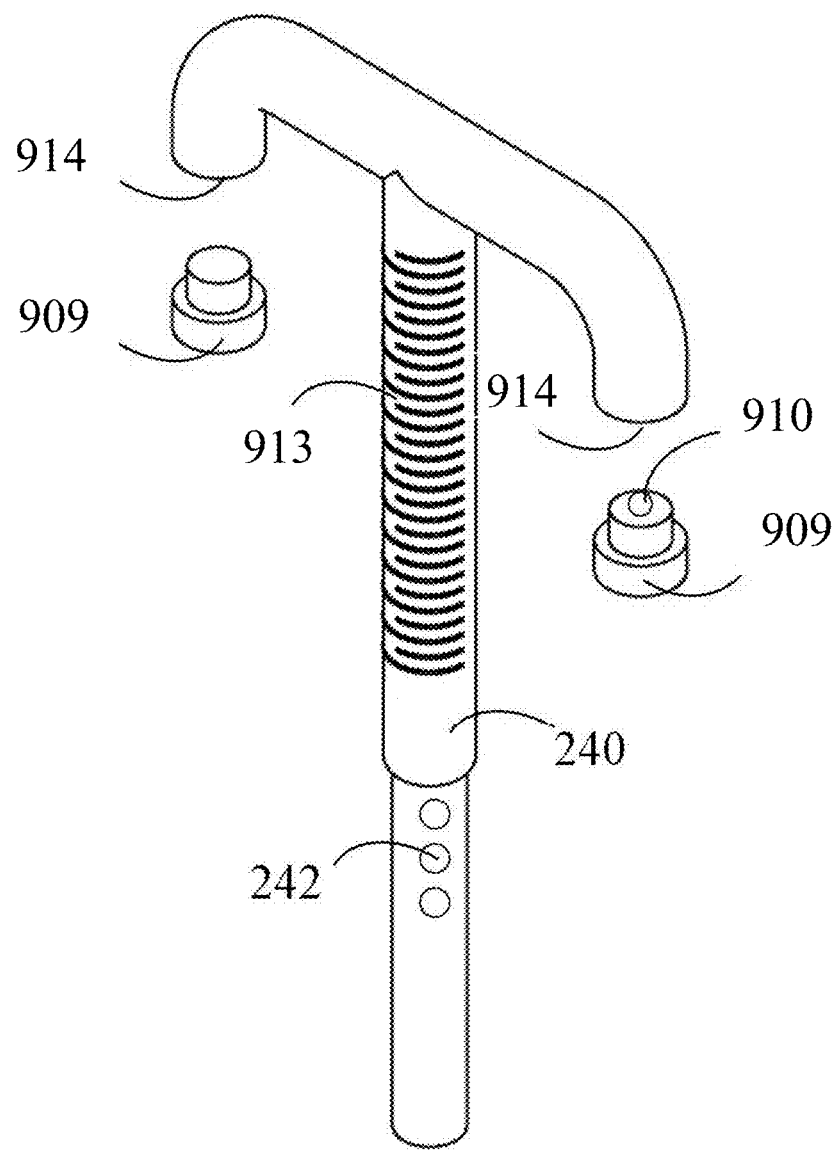

FIG. 9C is a perspective view of the sample channel for air/gas analysis in live or collecting sample for laboratory analysis. The first pressure and air/gas releasing tubular structure 240 is used for air/gas sample channel for air/gas sample collecting and analysis in live when connected with an air/gas analysis equipment. As we demonstrated in above, when the water flows into the first water container 220 and the second water container 230 through the water flowing tubular structure 610, it is a process to exhale both the pressure and air/gas from the UIFR device 750 and the underground soil in the root area. As we repeatedly introduced the first pressure and air/gas releasing tubular structure 240, the second pressure and air/gas releasing tubular structure 330 and the third pressure and air/gas releasing tubular structure 521, it is a key issue for underground irrigation successfully to establish a channel for both pressure and air/gas to be released from the containers and underground soil, otherwise the underground irrigation will be failure, because the pressure and air/gas in the UIFR device 750 and in the soil will become a resistant force and further block the water to flow and further to percolate into soil properly.

On the other hand, the established pressure and air/gas releasing tubular structure 240 is an ideal channel to monitor the soil and plant root respiration. During the pressure and air/gas releasing from the device via the first pressure and air/gas releasing tubular structure 240, the exhale air/gas can be collected via a needle to insert into the penetrative hole 910 on the one of the plug 909. The other plug without the penetrative hole is simple to plug into the hole 241 to allow all air/gas releasing only through the penetrative hole 921. The released air/gas should contains air inhaled from the atmosphere during the water percolating to the soil and also the gas effused from the soil in the root area via the AWPAE device 700 and the air/gas conduction channel 522.

Figure 10A:
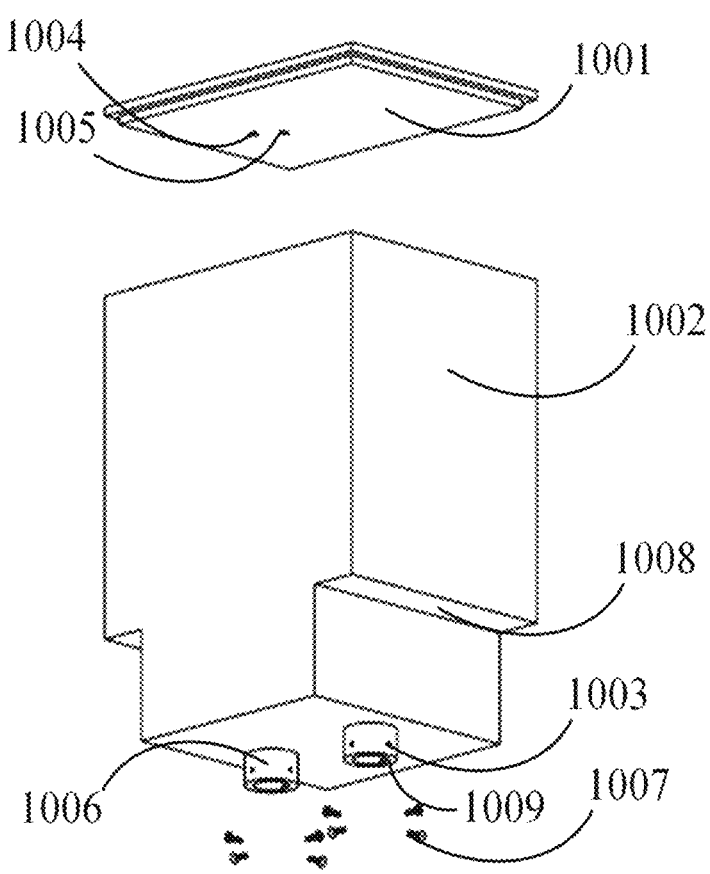
FIG. 10A to FIG. 10C are perspective and exploded views to detail the protection box used to house an UIFR device.

FIG. 10A is an exploded perspective view of the protecting container used for protecting the top portion 600 of the UIFR device 750. The protecting container 1002 comprises of a cover lid 1001 with two penetrative holes, 1004 and 1005, to allow the first pressure and air/gas releasing tubular structure 240 and the water flowing tubular structure 610 to pass through and further to reach to the first water container 220. The protecting container 1002 is used to house the top portion 600 of the UIFR device 750. The step structure 1008 is used to match with the step structure 413 of the funnel water container 410 to hold the top portion 600 of the UIFR device 750. The lower portion of the protecting container has a tubular structure 1006 to house the third tubular structure 540. The convex structure 1009 is used to mate with the directing grooves 513 on the third tubular structure 540 so that the penetrative hole 1003 on the tubular structure 1006 will be easy to align with the threaded groove 512 on the third tubular structure 540.

The aligned penetrative holes 1003 and the grooves 512 are further fixed with screws 1007 to keep both the protecting container and the third tubular structure 540 together so that it will allow the second tubular structure 530 to be separated from the third tubular 540 and further allow the top portion 600 to be taken off from the protecting container for many other purposes as afore mentioned in FIG. 7G.

Figure 10B:
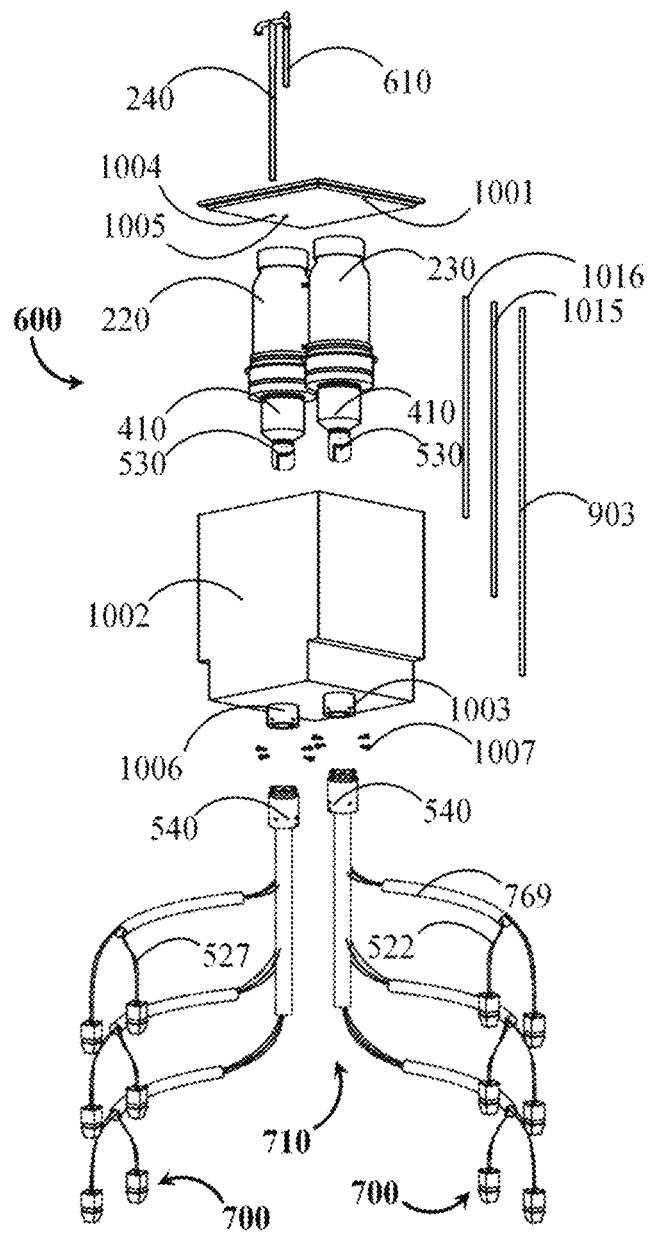

FIG. 10B is an exploded perspective view of the protecting container 1002, the top portion 600 and the lower portion 710 of the UIFR device 750. The cover lid 1001 with two penetrative holes, 1004 and 1005, allow the first pressure and air/gas releasing tubular structure 240 and the water flowing tubular structure 201 to pass through and further to reach to the first water container 220. The container 1002 is used to house the top portion 600 of the UIFR device 750. The lower portion of the protecting container has a tubular structure 1006 to house the third tubular structure 540. The penetrative hole 1003 on the tubular structure 1006 allows the screw 1007 to pass through and align with the threaded groove 512 on the third tubular structure 540. The penetrative holes 1003 allows the screw to pass and fix with the threaded grooves 512. The third tubular structure 540 will totally fixed with the tubular structure 1006. The second tubular structure 530 is able to separate from the third tubular 540 and further allow the top portion 600 to be taken off from the protecting container for many other purposes as afore detailed in FIG. 7G.

The sample channels, 903, 1015 and 1016 are used for monitoring the underground water contents, nutrition, pH value and other related information in the root area in deep, in the middle soil and in the top soil. The lower portion 710 will be very well connected with top portion 600, after the convex 511 on the third tubular structure 540 locked in the perpendicular groove 508 on second tubular structure 530. The perpendicular groove 508 allows the convex structure 511 on the third tubular structure 540 further to turn 90 degrees to align the mark 515 on the third tubular structure 540 with the mark 506 on the second tubular structure 530, as result, the second tubular structure 530 and the third tubular structure 540 are locked together (see FIG. 5B and FIG. 5F (b) for detail structure of the convex 511, the vertical groove 509 and perpendicular groove 508).

Figure 10C:
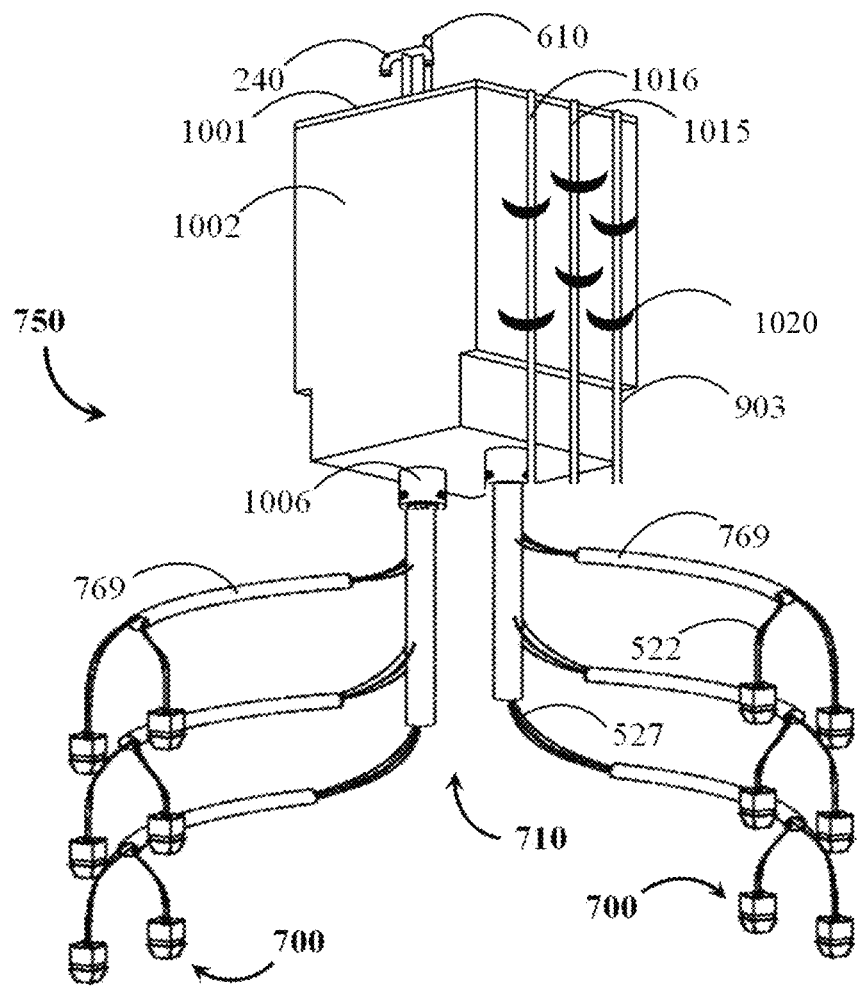

FIG. 10C is a perspective view of the well assembled UIFR device 750 in the protecting container 1002. The top portion 600 of the UIFR device 750 is placed inside the protecting container 1002, except the first pressure and air/gas releasing tubular structure 240 and the water flowing tubular structure 610 are on the top lid 1001 of the protecting container 1002. All sample channels 903, 1015 and 1016 are fixed to the outside wall of the protecting container 1002 with the fastened hook 1020. It shall be point out that the whole protection box with the UIFR device 750 are buried underground, except the cover lid 1001 with the first pressure and air/gas releasing tubular structure 240 and the water tubular structure 610 must to be above the land.

Figure 11:
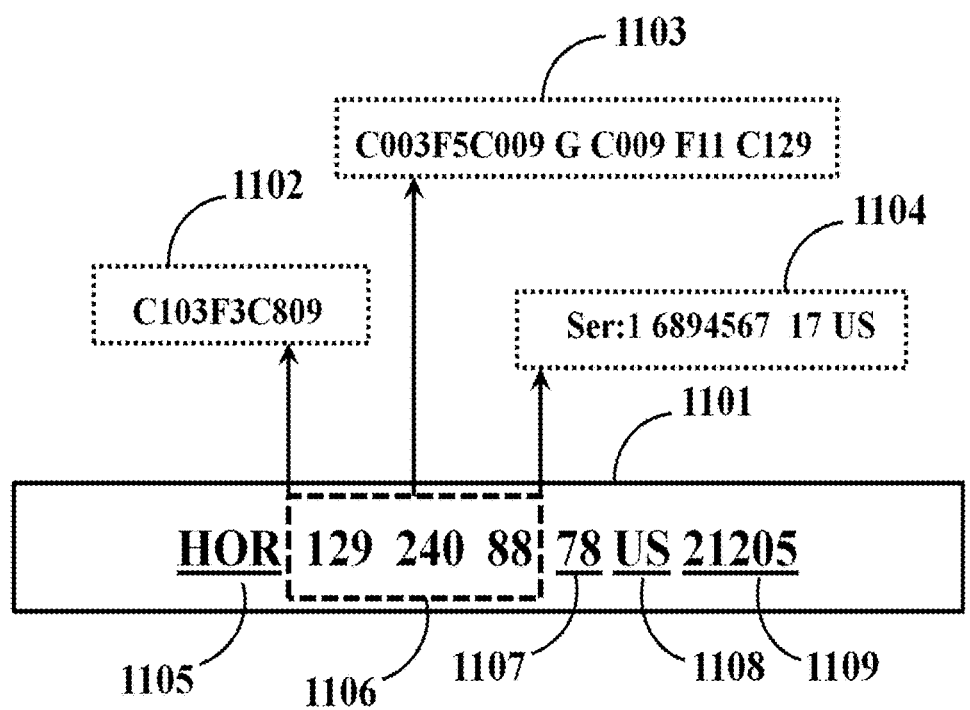
FIG. 11 is a sample of the universal label used for each individual UIFR and the plant.

FIG. 11 is an example of an universal unique label 1101 for each individual plant and the UIFR device 750. The universal unique label for each individual UIFR device 750 and adjacent plant comprises six alphanumeric parts. The first part 1105 of the universal label is represented by letters of "HOR", which allows a RFID reader to read these label used for horticulture only. This will be a way to improve and enhance read rate of a RFID reader, and it also a way for both the user and system to work in a very specific way. The second part 1106 is the real-location of a plant and a UIFR device used for that plant. The real-location part 1106 is comprised of three group data, including the row number, the plant location number in the row and both the row and plant in the site. The row number is limited by the third group data that is the site number in a limited and restricted facility as define by the third part 1107, the fourth part 1108 and the fifth part 1109. For example, the real-location of a plant as expressed in the label is located in 129 row, the No. 240 tree in the site 88.

It should be pointed out that between first group row data and the second group tree number data, the second group tree number data and the site number data must keep two spaces to form three data groups as showed in the box with break line.

The plant number is always combined with the row number and site number. The site number must be one or above. One owner or facility can have at least one site. The site size decided by the number plants and the natural condition. As we described in FIG. 8I to FIG. 8L, the total ZigBee End Devices decided the size of a site. For example, ZigBee's addressing scheme is capable of supporting more than 60,000 nodes per network. However, the geographical location may limit the numbers in a mesh network, many other factors may also affect the network, such as the selected FR, outdoor range, output and environmental characteristics.

The real-location part 1106, as showed in the box "129 (row number) 240 (the plant location number in the row) 88 (the site number)", is the most important part in the universal unique label, which represents the real location of a UIFR device and the plant. The real-location part 1106 must be printed in a human readable form and a barcode reader readable form on the inner wall of protection box 1002, on the lid 1001 to cover the protection box 1002, on the pressure and air/gas releasing tubular structure 240 or any place is available of the UIFR device and the adjacent plant. This is a special important part, which makes a label to be read at three manners, including to read by a RFID reader, or by a barcode reader or to be read in person directly. This means that if the RFID reader cannot read the label for the UIFR device and the adjacent plant for any reason, the label can still be read by the barcode reader, or the label can be manually read directly through the typing human readable part to the device. The part, human readable or barcode readable part, can also be recorded via voice recording or taking a picture and further used for data system for data collection and analysis. Ensuring the collection of real-location data for each UIFR device and its adjacent plants in the field is critical for the precise management of commercial fruit tree farming, and researches. This is the reason why an universal unique label is described in detail in the present embodiment.

The Owner code 1107 is the legal certification number for fruit tree growing business. The purpose of adding the owner code to the tag is to prevent the two tags with same data in one zip code. The owner number is another way to ensure and guarantee the real location data to be true and correct. Therefore the owner number can use last two of a business certification number. Assuming that there are more than two growers in the same zip code, two of them have the same last two digits, for example, one who may hold his or her fruit tree farming certificate number is 57738 and the other who may hold his or her fruit tree farming certificate number is 9857738. Owner with fewer total numbers has the right to use the last two numbers "38" as the owner number 1107 for label creation. The other owner must use the last three numbers as the owner code 1107 for label creation, which is 738.

The country code used as the fourth part 1108 provides many advantages to create an universal unique label in the world. It might be possible that there are many label come out with the same data. Country code will largely reduce the possibility to have same or similar label to identify a cultured plant worldwide. On the other hand, the combination of country code and all other parts of the tag provides a powerful tool for controlling the epidemic, preventing the spread of epidemics from one place to another, and even around the world, in particular the controlling plants and fruits export and import, which is the main channel for the spread of pests and diseases.

The zip code used as the fifth part 1109 is one of the easiest way to have enough unlimited endless unique labels and to identify a plant location. Also it is one of the most powerful way to monitor if the labels used in the whole system correctly. It allows an owner with one legal certification number for fruit tree growing business to have more than one facilities in different place and further to create totally different unique labels. For example, There are approximately 43,000 ZIP Codes in the United States. This not only provides a great opportunities to created unlimited unique label for each plant and each UIFR device, also provides the most easy way to locate a single individual plant and an UIFR device in the country and even in the world. As we repeatedly emphasized, it is so important to label a plant and a UIFR device with the real-location data. The real-location data will result growers, researchers and authorities to perform a precision management for each controlling level at the real time and the real-location manner.

The sixth part is the plant name with brief information 1102 and 1103 and the UIFR device information 1104. Anyone who need the detail information on the plant or the UIFR device has to have a data key. The data key is the human readable parts or barcode reader readable part or the whole tag read by RFID reader. This is simple but efficient way to protect grower's trade secrets and privacy. Plant brief and detail information in a management system, especially for independent grower, nursery, research and government control agent, is important part. The example as showed in FIG. 11, there are two ways for brief information on a plant. The reference number 1102 is showed that a plant is original from hybridization and third generation, so the plant father's name, "C103" and mother's name "C809" are showed in the label. The capital C represented the genus of the plant and the number represented the true species name of the plant. In one genus, there might be over hundred even thousand species named with different Latin. According to the alphabetical order of each species in the genus expressed by Arabic numerals, it will make the label preparation to be easy. The reference number 1103 is showed that a plant was original from grafting, so both rootstock and the bud or section stem part must detail their parents name and linked with capital letter "G".

The UIFR device information 1104, in fact, tells four different information. The first number, "1", indicates that the UIFR device is the first generation type. Any improve or added extra part to form a new with more functional device, the generation number will change from "1" to a proper correspond number. The second part "6894567" is the serial number of the device. The third part, "17", is the manufacturer code and the fourth part is the country code. These information are enough to know who manufactured this UIFR device and the device generation, it will help to find the usage information or back order parts or whole device.

An universal unique label that can be read by three ways provides convenient way to locate a plant and a UIFR device for any purpose related to plant management or the UIFR repairing. The three-in-one device further provides to locate individual plant and individual UIFR device. Same or similar to our U.S. Pat. No. 8,786,407, the wireless and remote monitoring indicating device 880 can be remote controlled by the three-in-one device or any devices allowed and supported by the system. The three-in-one device or any other allowed device has a RFID reader, a barcode reader and a data collector via typewriting or voicing or picturing.

The three-in-one device or any other allowed device comprises a GPS, a GLONASS, a GALILEO POSITIONING, a CHINESE COMPASS NAVIGATION SYSTEM and a GSM supported information module. The pre-saved each of all RFID tag number for each of plants and each of the UIFR devices 750 constitute a special filter, of which enable the three-in-one collector or any other allowed device to read each of matched tag data only. All read and filtered out information, in another word, all unrelated RFID tag data will be recorded and let the data center to analyze the meaning of all filtered RFID tag data for safety reason. Importantly, before communicating with a ZigBee End Device 858 or RFID tag, each remote controlling device, including the three-in-one data collector or mobile phone or laptop computer or similar devices, must pass through the data center system checking and further issued a password. Each time, the remote controlling device must use the correct password first and then can dialogue with each ZigBee End Device 858 for the purpose to download collected data or to place an order via the Zigbee coordinator to water a plant via the UIFR device 750.

Figure 12A:
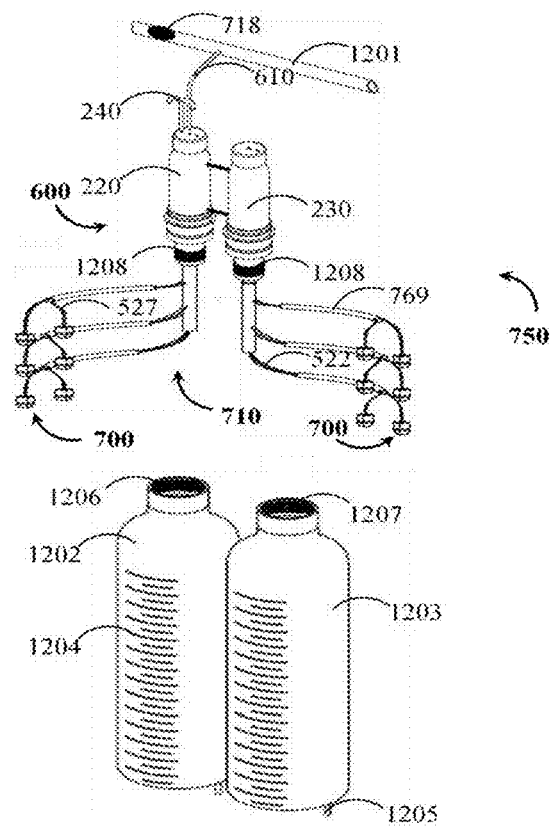
FIG. 12A and FIG. 12B are an exploded perspective and a front views to detail the movable controlling device used to monitor and further to calibrate one or nearby or all UIFR devices in the field.

FIG. 12A is an exploded perspective view of the moving able controlling device. The water inletting tubular structure 610 is connected to the water supply conduit 1201, which allows the water to flow into the UIFR device 750. The first pressure and air/gas releasing tubular structure 240 allows the pressure and air/gas to release from the first and second water containers, 220 and 230. The threaded lower portion 1208 of the third tubular structure 540 are used to screw with the threaded top portion 1206 and 1207 on the first and second water containers, 1202 and 1203. All the lower portion 710 of the UIFR device 750 will be placed inside of the first water container 1202 and the second water container 1203 to measure the true volume of the water through the UIFR device 750 by using all three indicators, including the movable red flag indicator device 800, the LED light indicator device 850 and the wireless and remote monitor indicating device 880. The scales 1204 on the first water container 1202 and the second water container 1203 are the true water volume from the UIFR device 750. All data obtained from the movable controlling device will be used to calibrate each UIFR device 750 or a group of UIFR devices 750 or all UIFR device 750 in the one row or even one site of the facility. The tap 1205 is used to release the water from the first water container 1202 and the second water container 1203.

Figure 12B:
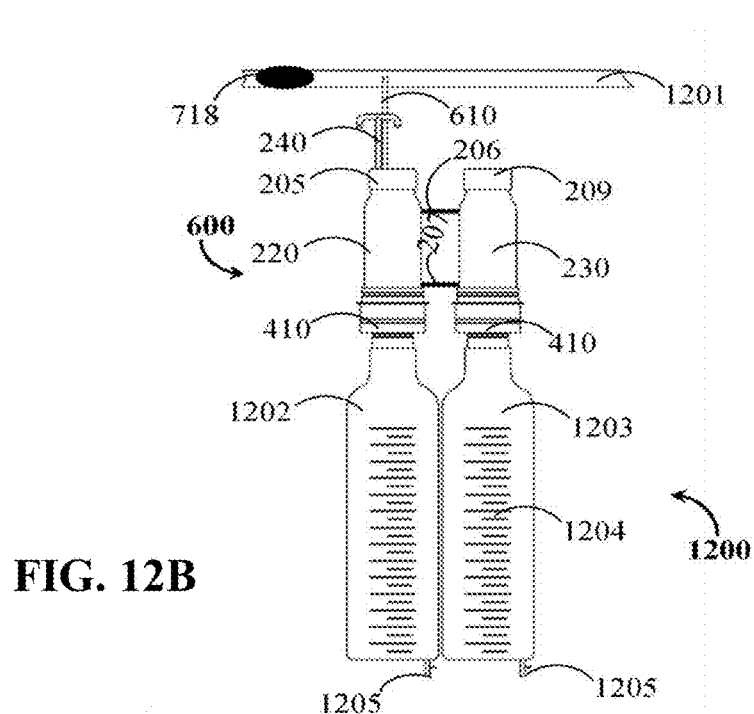

FIG. 12B is a front view of the moving able controlling device 1200. The UIFR device 750 is connected with the first water container 1202 and the second water container 1203 to form the moving able controlling device 1200 for calibrating each UIFR device 750 or a group of the UIFR devices 750 or all UIFR devices 750 in one site or even in the whole facility. The water flowing tubular structure 610 is connected with the water supply conduit 1201 to allow the water flowing into the UIFR device 750 and further to the first water container 1202 and the second water container 1203 of the moving able controlling device 1200. The total volume water data in the first water container 1202 and the second water container 1203 will be used to calibrate each individual UIFR device 750 or a group of the UIFR devices or even all UIFR devices 750 in one site of the whole facility.

Still other objects, features, and attendant advantages of the present invention will become apparent to those skilled on the art from the reading of the above detailed embodiments con strutted in accordance there with, taken in conjunction with the accompanying drawings. While the invention has been described in connection with a preferred embodiment, it is not intended to limit the scope of the invention to the particular form set forth, but on the contrary, it is intended to cover such alternatives, modifications, and equivalents as may be included with on the spirit and scope of the invention as defined by the appended claims.

It will be appreciated by those skilled on the art that the present invention can be embodied in other specific forms without departing from the spirit or essential characteristics thereof. The presently disclosed embodiments are therefore considered in all respects to be illustrative and not restricted. The scope of the invention described by the foregoing includes all changes that come within the meaning, range and equivalence thereof and is intended to be embraced therein.

We claim:

1. A multifunctional underground irrigation system (hereinafter, system) comprising:
    a plurality of irrigation devices,
        wherein one of the at least one irrigation devices comprising:
            an upper portion,
            a lower portion, and
            a plurality of tube links to link said upper portion and said lower portion together to form an underground irrigation fertilization and respiration (hereinafter, UIFR) device to provide water, fertilizers and air for field plants and potted plants,
    at least one first air/pressure releasing tubular structure,
    at least one second air/pressure releasing tubular structure, and
    at least one third air/pressure releasing tubular structure,
    a global universal unique identification label (hereinafter, label); and a label reader,
    at least one first monitoring device, at least one second monitoring device and at least one third monitoring device to monitor the working condition of said UIFR device,
    a plurality of sample collecting channels and measuring devices,
    a moveable monitoring device,
    an irrigation system, and
    a data center;
    wherein the upper portion of the UIFR device comprising:
        a water inletting tubular structure to supply water to the UIFR device to water plants in the field or in the pot,
        a wireless technologies or/and a mobile communication system supported wireless remote control/programmed/manually enabled switch to control the water from the sub-water conduit or water inletting tubular structure to the UIFR device,
        at least one first water container with a lid and multi-micro pores on the bottom; and at least one second water container with a lid and multi-micro pores on the bottom,
        an additional water container only when the UIFR device is used for potted plant,
        a safety valve device only when the UIFR device is used for a field plant,
        a first water drip speed controlling (hereinafter, WDSC) device connected with the first water container used to control water; and a second WDSC device connected with the second water container comprising:
            a plurality of filters with three penetrative holes,
            a binder with three penetrative holes,
            a plurality of hollow bolts with a plurality of movable screw nuts,
            an air/pressure releasing tubular structure and a vessel;
        a first water flow rate controlling (hereinafter, WFRC) device connected with the first water container; and a second WFRC device connected with the second water container to adjust water flow from said water container to the root area, comprising:
            a disc-shaped guiding plate,
            an adjustable solid rod with a pair of arrow shaped convexes on the tiptop end,
            a plurality of grooves on the lower portion of said rod,
            an air/pressure releasing tubular structure shared with said WDSC device;
        a first adjustable anti-clogging bio-trap (hereinafter, AAB) device connected with the first water container; and a second AAB device connected with the second water container, comprising:
            a circular guiding plate with a penetrative hole,
            a shaft,
            a funnel water container,
            a first rotatable tubular structure with a plurality of water channels,
            a second tubular structure with a plurality of water channels,
            a third tubular structure with a plurality of water channels, and
            an air/pressure releasing tubular structure;
        a protecting box used to house the upper portion of the UIFR devices;
    wherein the lower portion of the UIFR device having at least one anti-clogging water percolating and air/gas effusion/diffusion (hereinafter, AWPAE) device, wherein one of the at least one AWPAE device comprising: a cubic water container, a trapezoid water container and a trapezoid filter water container;
    wherein at least one tube link for water and at least one tube link for air/pressure releasing to link the upper portion and lower portion together to form the UIFR device;
    wherein the first air/pressure releasing tubular structure is used to release air/pressure from the first and the second water containers to the atmospheres,
    wherein the second air/pressure releasing tubular structure is used to release air/pressure from the AAB devices to the first and the second water containers, and
    wherein the third air/pressure releasing tubular structure is used to release air/pressure from said at least one AWPAE device to the first and the second water containers;
    wherein the label comprising:
        a first part represented by letters "HOT",
        a second part is a real-location of the UIFR device and a plant in the field or in a green house or in a building,
        a third part is an owner certification or business certification numbers,
        a fourth part is a country code represented by two letters, a fifth part is a zip code or an area code of a phone number in a country where said facility located in, and a sixth part is a file with detailed information of both the individual plant and the individual UIFR device which can be only viewed by a computer or any device with screen, said file is allowed and supported by the system in a data center after an user's password and a data key being confirmed;

said first part, the second part, the third part, the forth part and the fifth part form a global universal unique identification label;

wherein the label reader is a three-in-one device, comprising:
a radio-frequency identification (hereinafter, RFID) reader,
a barcode reader, and
a data collector;

wherein the at least one first monitoring device is a moveable and visible colored sign indicating device, comprising:
a moveable and visible colored sign,
a "T" shaped tubular structure, and
a post and a floating structure;

wherein the at least one second monitoring device is a light indicating device, comprising:
a plurality of different colored lights,
a plurality of sensors, and
a power supply source;

wherein the at least one third monitoring device is a wireless and remote monitor device, comprising:
a plurality of sensors,
a watering data collecting (hereinafter, WDC) device, and
a monitor;

wherein the UIFR device has at least one or at least two or all three of said monitoring devices for monitoring working condition at a real time and a real-location manner;

wherein one of the at least one sample channels comprising:
a gas sample collecting channel,
a plurality of underground sampling channels, and
a plurality of analysis devices to monitor the result of underground irrigation;

wherein the movable monitoring device used to monitor the irrigation system, to calibrate the UIFR device or a group of UIFR devices in a site or a whole facility, further to calibrate all data obtained from UIFR devices, comprising:
a set of UIFR device,
a pair of sampling water containers, and
a label;

wherein the irrigation system or the prior exist irrigation system supply water for said UIFR device to irrigate plants in the field or potted plants;

whereby the data center supported by the wireless technologies or/and the mobile communication system for remote control, data collecting, remote monitor, trouble shooting and data analysis for help to make a precision decision in plant culture management.

2. The system according to claim 1, wherein said water inletting tubular structure has an enlarged part on the lower end which used to keep the water inletting tubular structure inside of said first water container;

wherein said switch can be remotely controlled by a website internet via a Wi-Fi router, a phone or a mobile phone or computer or the three-in-one label reader or any means of device supported by the data center to water a plant as desired;

wherein the lid of the first water container having four penetrative holes to house the water inletting tubular structure, the first air/pressure tubular structure, the shaft of the AAB device, and the rod of the WFRC device;

wherein the lid of the second water container having two penetrative holes to house the shaft of the AAB device and the rod of the WFRC device;

wherein the first or the second water containers having a filter to prevent the blockage of multi-micro pores by sands or other particles, wherein said filter has three penetrative holes to allow the second air/pressure releasing tubular structure, the shaft of the AAB device and the rod of the WFRC device to pass through;

wherein said first and second water containers having a shallow recess on the lower portion of used to coupling with the WDSC device by using a zip tie and a sealing washer;

wherein the first and the second water container are horizontally linked together by a first twistable tube and a second twistable tube, wherein said first water container and said second water container having a first penetrative holes on the upper portion of the lateral wall used to house the first twistable tube so that the first and the second water containers are horizontally linked together and the twist tube form an air/pressure exchange channel between said first water container and said second water container;

wherein said first water container and said second water container having a second penetrative holes on the lower portion of the lateral wall used to house the second twistable tube so that the first and the second water containers are horizontally linked together and the twist tube forms a water exchange channel between said first water container and said second water container;

said twistable tubes further provides a means to allow the upper portion of said UIFR device to turn for 90 degree range and further to be separated from the third tubular structure of AAB device for repairing or replacing damaged parts or turn the reserved water channels to working channels;

wherein said additional water container having a lid with two penetrative holes to link, via two tubes, with said water container or said first water container or said second water container of an UIFR device which is used to water a potted plant; wherein the linked additional container is further hold by said holder with the pot;

wherein said safety valve device applied to an UIFR device which is used to irrigate plants in the field, having:
a vertical tubular structure,
a window located on the vertical tubular structure above of the surface of the ground,
a step groove on the lower end of inside the window to hold the foamed plastic cylinder structure,
a movable foamed plastic cylinder structure with a penetrative hole,
a moveable and visible colored sign,
a foamed plastic floating structure with a groove used to house the post, a post to hold the colored sign and to link said foamed plastic floating structure,
a pair of directing grooves on the inner wall of said vertical tubular structure used to house two sides of the moveable and visible colored sign.

3. The system according to claim 1, wherein the at least one first air/pressure releasing tubular structure further having:
a horizontal tubular structure with two 90 degree bended tube ends; and
a vertical tubular structure jointly coupling with said horizontal tubular structure to form a "T" shaped structure to allow air/pressure to be release from the first water container to the atmosphere or to have air/pressure and pressure from atmosphere to the UIFR device;
wherein the at least one first air/pressure releasing tubular structure is a six-in-one device, including:
a first air/pressure releasing structure,
a movable and visible colored sign indicating device,
a light indicating device,
a wireless and remote monitor indicating device,
a safety valve device,
a plurality of sensors;
wherein the at least one second air/pressure releasing tubular structure further having:
a tubular structure with a threaded end fastened with the threaded hollow bolt in the WDSC device to release air/pressure from said AAB device,
wherein the WDSC device shares the second air/pressure releasing tubular structure with the WFRC device;
wherein the at least one third air/pressure releasing tubular structure is a two-in-one structure used as said shaft of AAB device and said third air/pressure releasing tubular structure;
wherein the shaft is a hollow structure, from upper portion to the lower end, used as air/pressure releasing tubular structure, having:
a solid part on the upper portion,
a hollow structure from the upper portion to the lower end, and
a plurality of penetrative holes coupling with said hollow structure on the upper portion of the shaft to form the air and pressure releasing channels to allow air/pressure to release from each AWPAE device in the underground root area to the first and the second water container;
wherein said first, second and third air/pressure tubular structures are air/gas exchange channels to provides a means for plant roots to release $CO_2$ and to obtain fresh air, especially during the irrigating period and water percolating period.

4. The system according to claim 1, wherein said one of the at least one filters with three penetrative holes is the first filter with three penetrative holes,
wherein said one of the at least one filters with three penetrative holes is the second filter with three penetrative holes, and
wherein said one of the at least one filters with three penetrative holes is the third filter with three penetrative holes;
wherein said one of the at least one hollow bolts with one of the at least one movable screw nuts including:
a first hollow bolt with a moveable screw nut,
a second hollow bolt with a movable screw nut, and
a third hollow bolt with a movable screw nut,
wherein said first filter with three penetrative holes, said second filter with three penetrative holes and said third filter with three penetrative holes are aligned;
wherein said three aligned penetrative holes on the filters are further aligned with three penetrative holes on said binder;
wherein the aligned filters and the binder are further fastened by said first threaded hollow bolts and first movable screw nut, by said second threaded hollow bolt and second moveable screw nut and by said third threaded hollow bolt and third moveable screw nut together;
wherein said first threaded hollow bolt is further used to fasten with the second air/pressure releasing tubular structure which is shared by both WDSC and WFRC devices;
wherein said second threaded hollow bolt is used to house the shaft of AAB device and said third threaded hollow bolt is used to movably fasten the rod of WFRC device;
wherein said air/pressure releasing tubular structure is the same as afore claimed for the second air/pressure releasing tubular structure;
wherein said vessel further having:
a first shallow recess on the upper portion,
a second shallow recess on the sandwiching portion, and
a third shallow recess on the lower portion.

5. The system according to claim 1, wherein said disc-shaped guiding plate of said WFRC device is fixed onto the lids of the first and the second water containers to guide the adjustment of the water flow rate from said water containers when water drip from the WDSC device became slow;
wherein said each disc-shaped guiding plates of WFRC device comprising of Arabic numbers start with zeros;
wherein said each Arabic number represented total water drip number per minute from the water container to the root area via the AAB devices and the AWPAE devices;
wherein said grooves on the rod of the WFRC device are changeable from the deeper and the wider on the upper portion to the shallower and the narrower on the lower portion when the rod is moving from upper to the lower or inverse;
wherein said air/pressure releasing tubular structure is same as afore claimed for the second air/pressure releasing tubular structure, which is shared with said WDSC device;
wherein said end part of the rod of the WFRC device is a water stopper.

6. The system according to claim 1, wherein said AAB device is connected with said water container or said AAB devices are connected with the first water container and the second water container via said vessel of the WDSC devices;
wherein said circular guiding plate further comprising:
a series of Arabic numbers start with double zero; and
an ending number represented the total watering patterns created by said AAB device;
wherein said shaft further having:
a tiptop,
wherein the tiptop having two convex arrowheads to form a screw groove used to create a plurality of watering program or patterns,
said convex arrowheads aligned each number represents one of watering patterns,
a threaded lower end used to fasten with the threaded penetrative hole on the beam of the first rotatable tubular structure, wherein said shaft is a hollow tubular structure from upper portion to the end;
wherein said funnel water container further having:
  a first recess with a sealing washer and a zip tie,
  a second recess with a sealing washer and a zip tie,
  a third recess with a sealing washer and a zip tie;
  a half flange plate on the top end,
    said half flange plate having a plurality of penetrative holes,
  a plurality of wires or strips or rope means,
    said each of the wires or the strips or the ropes used to fasten each of the holes on the half flange plate of the funnel water container and further to fasten with each of hooks on the inner panel of the protecting box;
wherein said first rotatable tubular structure of the AAB device further having:
  a beam on the top end,
  a threaded penetrative hole on the center of said beam,
  a convex structure on the outer of the top end,
  a plurality of water channels on the bottom forming six groups, including:
    a first group, having:
      one of the at least one water channels on the bottom near the edge;
    a second group, having:
      a first one of at least one water channels,
      a second one of at least one water channels, and
      a third one of the at least one water channels to form a row on the bottom near edge;
    a third group, having:
      one of the at least one water channels, on the bottom near the center;
    a fourth group, having:
      a first one of at least one water channels,
      a second one of at least one water channels, and
      a third one of the at least one water channels to form a row on the bottom near the center;
    a fifth group, having:
      a first one of the at least one water channels on the bottom near the edge, and
      a second one of the at least one water channels at the bottom near the center;
    a sixth group, having:
      a first one of the at least one water channels,
      a second one of the at least one water channels, and
      a third one of the at least one water channels to form a first row near the edge of the bottom,
      a first one of the at least one water channels,
      a second one of the at least one water channels, and
      a third one of the at least one water channels to form a second row near the center of the bottom;
  a threaded air/pressure releasing linker,
  an air/pressure releasing channel in the center of the bottom,
    said air/pressure releasing channel is a narrow hole on the top part and an enlarged threaded hole on lower part of the outer side bottom to house said air/pressure releasing linker,
  a half circular slide groove on the outer of the bottom by surrounding the air/pressure channels,
  a directing marks on both inner and outer sides of the bottom;

wherein said second tubular structure of the AAB device further having:
  a step groove on the top end,
  a pair of directing marks on the top end,
  a first vertical groove on the outer wall coupling with a first perpendicular groove on the outer wall to form a first female lock means,
  a second vertical groove on the outer wall coupling with a second perpendicular groove on the outer wall to form a second female lock means,
  a shallow recess on the top portion of the outer wall,
  a plurality of air and pressure releasing channels on the inner bottom,
  a half circular slide groove on the bottom by surrounding the air and pressure releasing channels,
  a plurality of beads,
  a plurality of water channels on one side of the bottom to form a working group of water channels, including:
    a first one of the at least one water channels in the working group,
    a second one of the at least one water channels in the working group, and
    a third one of the at least one water channels in the working group,
      said first, second and third water channels forming a first row on the bottom near the edge,
    a first one of the at least one water channels in the working group,
    a second one of the at least one water channels in the working group, and
    a third one of the at least one water channels in the working group,
      said first, second and third water channels forming a second row on the bottom near the center,
    wherein said first row and said second row align;
  a plurality of water channels on the other side of the bottom to form a reserved group of water channels, including:
    a first one of the at least one water channels in the reserved group,
    a second one of the at least one water channels in the reserved group,
    a third one of the at least one water channels in the reserved group,
      said first, second and third water channels forming a first row on the bottom near the edge,
    a first one of the at least one water channels in the reserved group,
    a second one of the at least one water channels in the reserved group,
    a third one of the at least one water channels in the reserved group,
      said first, second and third water channels forming a second row on the bottom near the center,
    wherein said first row and said second row align;
  a plurality of stoppers,
    wherein said one of the at least one stoppers having a steel bar,
      said steel bar provides a means to take the stopper out from one of the at least one reserved water channels by using a magnetized screw driver or a magnetized means and to place into the working watering channel, when turn the reserved water channels to the working water channels;
wherein said third tubular structure of the AAB device further having:

a pair of directing marks on the top end;
a first convex on the inner lateral wall to form a first male lock means,
a second convex on the opposite of said first convex of the inner lateral wall to form a second male lock means,
a plurality of threaded concaves on the outer wall,
a pair of directing grooves on the outer wall on the lower end,
at least three pair of color marks on the bottom and nearby each of the water channels in the working group and the reserved group,
a plurality of air and pressure releasing channels,
a plurality of water channels on the one side of the bottom to form a working group of water channels, including:
a first one of the at least one water channels in the working group,
a second one of the at least one water channels in the working group,
a third one of the at least one water channels in the working group,
said first, second and third water channels forming a first row at the bottom near the edge,
a first one of the at least one water channels in the working group,
a second one of the at least one water channels in the working group,
a third one of the at least one water channels in the working group,
said first, second and third water channels forming a second row at the bottom near the center,
wherein said first row and said second row align;
a plurality of water channels on the other side of the bottom to form a reserved group of water channels, including:
a first one of the at least one water channels in the reserved group,
a second one of the at least one water channels in the reserved group,
a third one of the at least one water channels in the reserved group,
said first, second and third water channels forming a first row at the bottom near the edge,
a first one of the at least one water channels in the reserved group,
a second one of the at least one water channels in the reserved group,
a third one of the at least one water channels in the reserved group,
said first, second and third water channels forming a second row at the bottom near the center,
wherein said first row and said second row align;
wherein the air/pressure releasing tubular structure is the same one as afore claimed for the third air/pressure releasing tubular structure;
wherein said half circular groove on the inner bottom of the second tubular structure allowed the half circular groove on the outside of the bottom of the first rotatable tubular structure to pivot on and further to form a closed slide channel;
wherein said beads are used to support and to limit the first rotatable tubular structure so that the first rotatable tubular structure can be easily adjusted as desired via the convex arrows on the tiptop of the shaft in the first and the second AAB devices;
wherein said female lock means on the second tubular structure and said male lock means on the third tubular structure constitute a lock means to lock the second tubular structure and the third tubular structure together;
wherein said lock means allows the upper portion of an UIFR device to be unlocked and separated from the third tubular structure for repair or replace any damaged part or to change the reserved water channels to the working water channels,
wherein said separated upper portion of an UIFR device and said third tubular structure can be relocked again;
wherein said air/pressure releasing channels on the second tubular structure and said air/pressure channel on the third tubular structure are aligned; wherein the air/pressure releasing channels is a step groove structure used to house said connector of the air/gas tube links;
wherein said air/pressure channels are shared by both the working group and reserved group of water channels or are used for working group and reserved group of water channels independently;
wherein said water channels on the third tubular structure is a step groove used to house the connector of the water tube link and through the water link to connect with AWPAE devices;
wherein said water channels in the working group of the third tubular structure are aligned with the water channels in the working channel of the second tubular structure;
wherein said water channels in the reserved group of the third tubular structure are aligned with the water channels in the reserved channels of the second tubular structure;
wherein said directing marks on the bottom of the first rotatable tubular structure is aligned with said marks on the top end of the second and third tubular structure;
wherein said threaded concaves on the outer wall of the third tubular structure are used to match with said threaded penetrative holes on the short tubular structure at the bottom of said protecting box;
wherein said two directing grooves on the lower end of third tubular structure are used to house the two convex structures on the end part of the short tubular structure in the protecting box, which provides a means to help each threaded concave on the outer wall of the third tubular structure and the threaded penetrative holes on the short tubular structure of the protection box to be aligned and further the third tubular structure and the short tubular structure are fastened together with screws.

7. The system according to claim 1, wherein the protecting box used to house the upper portion of an UIFR device comprising:
a first panel, a second panel, a third panel, a fourth panel, a top cover panel and a bottom panel to form said protecting box,
a plurality of hooks on the upper portion of each inner wall of panels,
a short tubular structure at the center of the bottom panel,
a plurality of screws;
wherein the top cover panel having a first penetrative hole and a second penetrative hole to house the water inletting tubular structure and the first air/pressure releasing tubular structure,
wherein the short tubular structure used to house the third tubular structure of the AAB device further having:
a first directing convex on the inner wall, a second directing convex on the inner wall, and
a plurality of threaded penetrative holes and screws.

8. The system according to claim 1, wherein said cubic water container of an AWPAE device further comprising:
a first panel, a second panel, a third panel, a fourth panel, a top cover panel and a bottom panel, a step convex with a threaded hole located on each corner of the top end of said cubic water container,
wherein the top cover panel having four threaded penetrative holes on each 90 degree corners, and further having a pair of threaded penetrative holes in the center, a pair of screw nuts used to fasten the water tube link and air/pressure tube link with said top cover panel;
wherein said trapezoid water container of an AWPAE device further comprising:
a first trapezoid panel, a second trapezoid panel, a third trapezoid panel, a fourth trapezoid panel, and a trapezoid filter water container;
wherein said trapezoid filter water container of an AWPAE device further having:
a first trapezoid filter panel, a second trapezoid filter panel, a third trapezoid filter panel, a fourth trapezoid filter panel and a bottom filter panel to form the trapezoid filter water container;
wherein one of the at least one AWPAE devices, linked with one of the at least one water channels and air/pressure channels respectively in the working group on the third tubular structure of the first and the second AAB devices, is a working AWPAE device and all the working AWPAE devices form the working group to water plant roots;
wherein one of the at least one working AWPAE devices is placed into underground by surrounding a plant root on the left back, left front, right back and right front of upper root area, on the left back, left front, right back and right front of deep root area and on the left back, left front, right back and right front of sandwiching root area,
said upper root area is where closes to the surface of soil,
said deep root area is where is far from the surface soil,
said sandwiching root area is where between the upper and deep root area;
wherein one of the at least one AWPAE devices connected with the first AAB device and the second AAB device is placed into underground soil of a plant, including:
one of the at least one working AWPAE devices connected with the first AAB device is placed in the left front side of the upper root area,
one of the at least one working AWPAE devices connected with the first AAB device is placed in the left back side of the upper root area,
one of the at least one working AWPAE devices connected with the second AAB device is placed in the right front side of the upper root area,
one of the at least one working AWPAE devices connected with the second AAB device is placed in the right back side of the upper root area,
one of the at least one working AWPAE devices connected with the first AAB device is placed in the left front side of the sandwiching root area,
one of the at least one working AWPAE devices connected with the first AAB device is placed in the left back side of the sandwiching root area,
one of the at least one working AWPAE devices connected with the second AAB device is placed in the right front side of the sandwiching root area,
one of the at least one working AWPAE devices connected with the second AAB device is placed in the right back side of the sandwiching root area,
one of the at least one working AWPAE devices connected with the first AAB device is placed in the left front side of the deep root area,
one of the at least one working AWPAE devices connected with the first AAB device is placed in the left back side of the deep root area,
one of the at least one working AWPAE devices connected with the second AAB device is placed in the right front side of the deep root area,
one of the at least one working AWPAE devices connected with the second AAB device is placed in the right back side of the deep root area,
wherein one of the at least one AWPAE devices, linked with one of the at least one water and air/pressure channels respectively in the reserved group on the third tubular structure of the first and the second AAB devices, is a reserved AWPAE device and all the reserved AWPAE devices form the reserved group AWPAE devices used to replace the damaged working group AWPAE devices;
wherein one of the at least one reserved AWPAE devices is placed into the upper, sandwiching and deep root area, including:
one of the at least one reserved AWPAE devices connected with the first AAB device is placed into the left front side of the upper root area,
one of the at least one reserved AWPAE devices connected with the first AAB device is placed into the left back side of the upper root area,
one of the at least one reserved AWPAE devices connected with the second AAB device is placed into the right front side of the upper root are
one of the at least one reserved AWPAE devices connected with the second AAB device is placed into the right back side of the upper root area,
one of the at least one reserved AWPAE devices connected with the first AAB device is placed into the left front side of the sandwiching root area,
one of the at least one reserved AWPAE devices connected with the first AAB device is placed into the left back side of the sandwiching root area,
one of the at least one reserved AWPAE devices connected with the second AAB device is placed into the right front side of the sandwiching root area,
one of the at least one reserved AWPAE devices connected with the second AAB device is placed into the right back side of the sandwiching root area,
one of the at least one reserved AWPAE devices connected with the first AAB device is placed into the left front side of the deep root area,
one of the at least one reserved AWPAE devices connected with the first AAB device is placed into the left back side of the deep root area,
one of the at least one reserved AWPAE devices connected with the second AAB device is placed into the right front side of the deep root area,
one of the at least one reserved AWPAE devices connected with the second AAB device placed into the left back side of the deep root area.

9. The system according to claim 1, wherein one of the at least one water tube links used for water conduction and to link the upper portion with the lower portion, having:
a connector on the top end,
a tube with a color mark and a letter, a threaded end,
a plurality of protecting tubes used to sleeve the water tube links;
wherein one of the at least one air/pressure tube links used for air/pressure releasing and to link the upper portion with the lower portion, having:
a connector on the top end,
a tube with a color mark and a letter,
a threaded end,
a plurality of protecting tubes used to sleeve the air/pressure tube links.

10. The system according to claim 1, wherein said real-location of each UIFR devices and the plant watered by said UIFR device in the label is represented by a first group of digital numbers, a second group of digital numbers, a third group of digital numbers and a two-letter space between said first group of digital number and said second group of digital number, and between said second group of digital number and said third group of digital number:
 (a). said first group of digital numbers is a row number;
 (b). said second group of the digital numbers is a real serial number of both the UIFR device and the plant located in the row as indicated by the first group digital numbers above (a);
 (c). said third group of the digital number is a site number in a facility;
said second part of the label is further printed in a barcode form which can be read by a barcode reader;
said second part of the label is further printed as a human readable form on each of inner panels of the protecting box and on both sides of the cover panel used to cover the protecting box;
wherein said certification numbers for the third part of the label are the last two or three digital numbers of the legal certification for the facility;
wherein said fifth part of each label is a zip code or an area code of a phone number in a country (as limited in the fourth part of the label);
wherein said first part, second part, third part, fourth part and fifth part of the label are coded into at least one radio-frequency identification (hereinafter, RFID) tag,
said at least one RFID tag is an active RFID tag, or a semi-passive RFID tag or a passive RFID tag;
wherein said sixth part of each label provides a detailed information for each individual plant and the UIFR device which can be only viewed by a computer or any device with screen which allowed and supported by system in a data center after an user's password being confirmed and a data key being entered;
said data key is the data of the first part to the fifth part obtained from a RFID tag, or the human readable part or the barcode;
said plant information contains the parents name with the generation data represented by capital letters "F" followed by a number if the plant is the result of hybridization; or
said plant information contains the parents names with generation data for root stock, and the parents names with generation data for bud or stem with scion;
said plant information contains detailed irrigation, fertilization amount, management cost and observation of growth, disease and disease treatments, yield of fruits;
said information of the UIFR device contains a serials number and is composited of four parts, including:
 a first part represents the generation of the UIFR device,
 a second part represents serial numbers of an UIFR device,
 a third part represents a code number of a manufacturer, and
 a fourth part represents a country code by two capital letters;
wherein the three-in-one label reader, comprising:
a GPS module, or/and
a GLONASS module, or/and
a GALILEO POSITIONING module, or/and
a CHINESE COMPASS NAVIGATION SYSTEM module,
a data comparison module,
a real time module,
a data transferring and transforming module, and
a processor,
wherein the three-in-one label reader is further supported by:
a Global System for Mobile Communications (hereinafter, GSM),
a geographic information systems (hereinafter, GIS), and
a wireless technologies;
wherein said data comparison module enables the three-in-one device to confirm that all collected data from the RFID tags or the barcodes or the human readable parts are correct after comparing with GPS data, data bank in the data center and all pre-saved universal unique label data;
wherein said three-in-one label reader has a full pre-downloaded and pre-saved label data covered each of all UIFR devices and each of watering plants in the facility;
wherein said pre-saved universal unique label data is a data filter to enable said three-in-one label reader to read each matched universal unique label only;
wherein the three-in-one label reader has a unique identification number or a mobile phone number;
wherein the unique number or a mobile phone number of each three-in-one label reader can be automatically combined with each read label used for each UIFR device and the plant watering by said UIFR device;
wherein the three-in-one label reader can download data wirelessly to or via a cable linker to a computer supported by data center,
wherein said data collector of label reader is a typewriting means, or/and a voice recording means or/and a photographing means,
wherein the three-in-one label reader can be a mobile phone supported and allowed by the data center in the facility,
wherein the three-in-one label reader or any other device allowed by system can further wirelessly dialog with each wireless remote control/programmed/manually enabling switch or the WDC device linked with each UIFR device or a group of UIFR devices directly via the linked data transferring and transforming module within the data center or system coverage.

11. The system according to claim 1, wherein the AAB device connected with the water container, or the first AAB device connected with the first water container, is linked with one of the at least one AWPAE devices in the working group via the watering tube links and the air/gas tube links can be adjusted to create one of the at least one watering programs or patterns to water a plant, including:
 1). wherein the water channel in the first group on the first rotatable tubular structure is moveably aligned with the first water channel in the first row on the second and third tubular structure in the working group, wherein the AWPAE device in the working group irrigates the left front of the upper root area;

2). wherein the water channel in the first group on the first rotatable tubular structure is moveably aligned with the second water channel in the first row on the second and third tubular structure in the working group, wherein the AWPAE device in the working group irrigates the left front of sandwiching root area;

3). wherein the water channel in the first group on the first rotatable tubular structure is moveably aligned with the third water channel in the first row on the second and third tubular structure in the working group, wherein the AWPAE device in the working group irrigates the left front of the upper root area;

4). wherein the first and second water channels in the second group on the first rotatable tubular structure are moveably aligned with the first and second water channels in the first row on the second and third tubular structure in the working group, wherein the AWPAE devices in the working group simultaneously irrigate the left front of the upper and the sandwiching root areas;

5). wherein the first, second and third water channels in the second group on the first rotatable tubular structure are moveably aligned with the first, second and third water channels in the first row on the second and on the third tubular structure in the working group, wherein the first, wherein the AWPAE devices in the working group simultaneously irrigate the left front of the upper, the sandwiching and the deep root areas;

6). wherein the second and third water channels in the second group on the first rotatable tubular structure are moveably aligned with the second and third water channels in the first row on the second and on the third tubular structure in the working group, wherein AWPAE devices in the working group simultaneously irrigate the left front of the sandwiching and the deep root areas;

7). wherein the water channel in the third group on the first rotatable tubular structure is moveably aligned with the first water channel in the second row on the second tubular structure and the first water channel in the second row on the third tubular structure in the working group, wherein the AWPAE device in the working group irrigates the left back of the upper root area;

8). wherein the water channel in the third group on the first rotatable tubular structure is moveably aligned with the second water channel in the second row on the second tubular structure and the second water channel in the second row on the third tubular structure in the working group, wherein the AWPAE device in the working group irrigates the left back of the sandwiching root area;

9). wherein the water channel in the third group on the first rotatable tubular structure is moveably aligned with the third water channel in the second row on the second tubular structure and the third water channel in the second row on the third tubular structure in the working group, wherein the AWPAE device in the working group irrigates the left back of the deep root area;

10). wherein the first and the second water channels in the fourth group on the first rotatable tubular structure are moveably aligned with the first and second water channels in the second row on the second tubular structure and the first and second water channels in the second row on the third tubular structure in the working group, wherein the AWPAE devices in the working group simultaneously irrigate the left back of the upper and the sandwiching root areas;

11). wherein the first, the second and the third water channels in the fourth group on the first rotatable tubular structure are moveably aligned with the first, second and third water channels in the second row on the second tubular structure and the first, second and the third water channels in the second row on the third tubular structure in the working group, wherein the second, wherein the AWPAE devices in the working group simultaneously irrigate the left back of the upper, the sandwiching and the deep root areas;

12). wherein the second and the third water channels in the fourth group on the first rotatable tubular structure are moveably aligned with the second and the third water channels in the second row on the second tubular structure and the second and the third water channels in the second row on the third tubular structure in the working group, wherein the AWPAE devices in the working group simultaneously irrigate the left back of the sandwiching and the deep root areas;

13). wherein the first and the second water channels in the fifth group on the first rotatable tubular structure are moveably aligned with the first water channels in the first row and the first water channels in the second row on the second tubular structure and on the third tubular structure in the working group, wherein the AWPAE devices in the working group simultaneously irrigate the left front and the left back of the upper root areas;

14). wherein the first and the second water channels in the fifth group on the first rotatable tubular structure are moveably aligned with the second water channels in the first row and the second water channels in the second row on the second tubular structure and on the third tubular structure in the working group, wherein the AWPAE devices in the working group simultaneously irrigate the left front and the left back of the sandwiching root areas;

15). wherein the first and the second water channels in the fifth group on the first rotatable tubular structure are moveably aligned with the third water channels in the first row and the third water channels in the second row on the second tubular structure and on the third tubular structure in the working group, wherein the AWPAE devices in the working group simultaneously irrigate the left front and the left back of the deep root areas;

16). wherein the first and the second water channels in the first row and the first and the second water channels in the second row of the six group on the first rotatable tubular structure are moveably aligned with the first and the second water channels in the first row and the first and the second water channels in the second row on the second tubular structure and on the third tubular structure in the working group, wherein the AWPAE devices in the working group simultaneously irrigate the left front and the left back of the upper and the sandwiching root areas;

17). wherein the first, the second and the third water channels in the first row and the first, the second and the third water channels in the second row of the six group on the first rotatable tubular structure are moveably aligned with the first, the second and the third water channels in the first row and the first and the second water channels in the second row on the second tubular structure and on the third tubular structure in the working group, wherein the AWPAE devices in the working group simultaneously irrigate the left front and the left back of the upper, the sandwiching and the deep root areas;

18). wherein the second and the third water channels in the first row and the second and the third water channels in the second row of the six group on the first rotatable tubular structure are moveably aligned with the second and the third water channels in the first row and the second and the third water channels in the second row on both the second tubular structure and on the third tubular structure in the working group, wherein the AWPAE devices in the working group simultaneously irrigate the left front and the left back of the sandwiching and the deep root areas;

wherein the second AAB device connected with the second water container and linked with the each of AWPAE devices via the watering tube links and the air/gas tube links can be adjusted to create one of the at least watering programs or patterns to water a plant:

1). wherein the water channel in the first group on the first rotatable tubular structure is moveably aligned with the first water channel in the first row on the second and third tubular structure in the working group, wherein the AWPAE device in the working group irrigates the right front of the upper root area;

2). wherein the water channel in the first group on the first rotatable tubular structure is moveably aligned with the second water channel in the first row on the second and third tubular structure in the working group, wherein the AWPAE device in the working group irrigates the right front of the sandwiching root area;

3). wherein the water channel in the first group on the first rotatable tubular structure is moveably aligned with the third water channel in the first row on the second and third tubular structure in the working group, wherein the AWPAE device in the working group irrigates the left front of the deep root area;

4). wherein the first and second water channels in the second group on the first rotatable tubular structure are moveably aligned with the first and second water channels in the first row on the second and third tubular structure in the working group, wherein the AWPAE simultaneously device in the working group irrigate the right front of the upper and sandwiching root areas;

5). wherein the first, second and third water channels in the second group on the first rotatable tubular structure are moveably aligned with the first, second and third water channels in the first row on the second and on the third tubular structure in the working group, wherein the first, wherein the AWPAE devices in the working group simultaneously irrigate the right front of the top, the sandwiching and the deep root areas;

6). wherein the second and third water channels in the second group on the first rotatable tubular structure are moveably aligned with the second and third water channels in the first row on the second and on the third tubular structure in the working group, wherein the AWPAE devices in the working group simultaneously irrigate the right front of the sandwiching and the deep root areas;

7). wherein the water channel in the third group on the first rotatable tubular structure is moveably aligned with the first water channel in the second row on the second tubular structure and the first water channel in the second row on the third tubular structure in the working group, wherein the AWPAE device in the working group irrigates the right back of the upper root area;

8). wherein the water channel in the third group on the first rotatable tubular structure is moveably aligned with the second water channel in the second row on the second tubular structure and the second water channel in the second row on the third tubular structure in the working group, wherein the AWPAE device in the working group irrigates the right back of the sandwiching root area;

9). wherein the water channel in the third group on the first rotatable tubular structure is moveably aligned with the third water channel in the second row on the second tubular structure and the third water channel in the second row on the third tubular structure in the working group, wherein the AWPAE device in the working group irrigates the right back of the deep root area;

10). wherein the first and the second water channels in the fourth group on the first rotatable tubular structure are moveably aligned with the first and second water channels in the second row on the second tubular structure and the first and second water channels in the second row on the third tubular structure in the working group, wherein the AWPAE devices in the working group simultaneously irrigate the right back of the upper and sandwiching root areas;

11). wherein the first, the second and the third water channels in the fourth group on the first rotatable tubular structure are moveably aligned with the first, second and third water channels in the second row on the second tubular structure and the first, second and the third water channels in the second row on the third tubular structure in the working group, wherein the AWPAE devices in the working group simultaneously irrigate the right back of the upper, the sandwiching and the deep root areas;

12). wherein the second and the third water channels in the fourth group on the first rotatable tubular structure are moveably aligned with the second and the third water channels in the second row on the second tubular structure and the second and the third water channels in the second row on the third tubular structure in the working group, wherein the AWPAE devices in the working group simultaneously irrigate the right back of the sandwiching and the deep root areas;

13). wherein the first and the second water channels in the fifth group on the first rotatable tubular structure are moveably aligned with the first water channels in the first row and the first water channels in the second row on the second tubular structure and on the third tubular structure in the working group, wherein the AWPAE devices in the working group simultaneously irrigate the left front and back of the upper root areas;

14). wherein the first and the second water channels in the fifth group on the first rotatable tubular structure are moveably aligned with the second water channels in the first row and the second water channels in the second row on the second tubular structure and on the third tubular structure in the working group, wherein the AWPAE devices in the working group simultaneously irrigate the right front and back of the sandwiching root areas;
15). wherein the first and the second water channels in the fifth group on the first rotatable tubular structure are moveably aligned with the third water channels in the first row and the third water channels in the second row on the second tubular structure and on the third tubular structure in the working group, wherein the AWPAE devices in the working group simultaneously irrigate the right front and back of the deep root areas;
16). wherein the first and the second water channels in the first row of the six group and the first and the second water channels in the second row of the six group on the first rotatable tubular structure are moveably aligned with the first and the second water channels in the first row and the first and the second water channels in the second row on the second tubular structure and on the third tubular structure in the working group, wherein the AWPAE devices in the working group simultaneously irrigate the right front and back of the upper and the sandwiching root areas;
17). wherein the first, the second and the third water channels in the first row and the first, the second and the third water channels in the second row of the six group on the first rotatable tubular structure are moveably aligned with the first, the second and the third water channels in the first row and the first and the second water channels in the second row on the second tubular structure and on the third tubular structure in the working group, wherein the AWPAE devices in the working group simultaneously irrigate the right front and back of the upper, the sandwiching and the deep root areas;
18). wherein the second and the third water channels in the first row and the second and the third water channels in the second row of the six group on the first rotatable tubular structure are moveably aligned with the second and the third water channels in the first row and the second and the third water channels in the second row on both the second tubular structure and on the third tubular structure in the working group, wherein the AWPAE devices in the working group simultaneously irrigate the right front and back of the sandwiching and the deep root areas;
wherein one of the at least one watering programs or patterns created by the first AAB device (as detailed in above) singly combining with each one of the at least one watering programs or patterns created by the second AAB devices (as detailed in above) can create 324 watering programs and patterns to water a plant via the AWPAE devices linked with the first AAB device and the second AAB device;
wherein the water channels in the reserved group can be changed into working group accordingly and further to create the same watering programs or patterns as afore described in above.

12. The system according to claim 1, wherein both the moveable and visible colored sign and the plastic foamed floating structure has a groove in the center;
wherein said post is used to fasten with said moveable and visible colored sign on the top end and to fasten with said plastic foamed floating structure via said grooves;
wherein said "T" shape structure is consisted:
a horizontal tubular structure with two 90 degree bended tube ends, and
a vertical tubular structure to house the moveable colored sign;
wherein the vertical tubular structure further having:
a first directing groove on the inner wall,
a second directing groove on the opposite of said first directing groove on the inner wall,
said directing grooves are used to house both sides of moveable and visible colored sign and further provide a means to enables the movement of the sign up and down to be stable;
wherein the vertical tubular structure is transparent with volume scale marks and can observe colored sign rising upward or downward during the irrigation, and further to read the true volume of water in said UIFR device;
wherein one of the at least one sensors in the light indicating device used to monitor working condition of an UIFR device, comprising:
a moveable and visible colored sign,
a horizontal tubular structure with two 90 degree bended ends; and
a vertical tubular structure and jointly to form a "T" shape structure,
a first directing groove on the inner wall of said vertical tubular structure,
a second directing groove on the opposite of said first directing groove on the inner vertical tubular structure used to house both sides of the moveable colored sign,
a post,
a plastic foamed floating structure connected with said post,
at least one line initially linked with a negative pole of a power supply resource and fixed into one side of said first directing groove,
a plurality of short negative power lines individually fixed into the other side of the first vertical directing groove;
said one of the at least one short negative lines linked with one of the at least one color lights individually,
at least one metal line,
said metal line is fixed onto one side of the moveable and visible colored sign,
at least one warning module to report over watering, said warning module is a flashing enable module;
wherein one of the at least one sensors provides a means to detect the water increased or decreased from prior volume to a pre-measured volume in the UIFR device,
wherein one of the at least one sensors further provides a means to detect the real time of decreased water volume from each said UIFR device and the real time required for water percolated into the underground soil by surrounding the plant root area,
wherein said sensors are fixed above both the window and the movably plastic foamed cylinder floating structure of the safety valve device;
wherein said at least one sensor linked with one color of light represents one pre-decided one volume or level of water in the first and second water containers of the UIFR device accordingly which made the underground irrigation to be visible and to know the true amount of water;

wherein a real time lapse interval for one light color changed to another color light provides a means to monitor and to find out each UIFR device working condition;
wherein said total time required for water percolating into soil from highest volume to the lowest volume provides a means to monitor both an UIFR device working condition and underground soil condition;
wherein said one of the at least one colored lights connected with one of the at least one sensors via the metal on said one side of the moveable and visible colored sign used to detect the water increased or decreased in the UIFR device by ways, having:
(a). one of the at least one colored lights indicates the water volume increased from the initial water volume to the premeasured water volume in the water container or the first and second water containers, when said light is powered by one of the at least one sensors;
(b). one of the at least one colored lights, except the colored light being used in above, indicates the increased water volume in the first and second water container, when said light is powered by one of the at least one sensors;
(c). one of the at least one colored lights, except the colored light being used in above, indicates the increased water volume in the first and the second water container, when said light is powered by one of the at least one sensors;
(d). one of the at least one colored lights is on, except the colored lights being used in above, indicates the increased water volume in the first and second water container, when said light is powered by one of the at least one sensors;
(e). when said light (d) links with a warning module and is in the flashing way, over watering is happening in the UIFR device;
wherein said light (d) is powered again via said sensor indicates the water volume decreased from the highest volume to the premeasured water volume in the UIFR device;
wherein said light (c) is powered again via the sensor indicates the water volume decreased from the premeasured water volume to the next lower premeasured water volume in the UIFR device;
wherein said light (b) is powered again via the sensor indicates the water volume decreased from the premeasured water volume to the next lower premeasured water volume in the UIFR device;
wherein said light (a) is powered again via the sensor indicates the water volume decreased from the premeasured water volume to the initial premeasured water volume in the UIFR device;
wherein said power supply resource is a battery or rechargeable battery or wireless chargeable battery or power supplied from a wind generator or solar generator or any other available form;
wherein power supply resource is further shared with a WDC device and an active RFID tag or a semi-passive RFID tag if equipped;
wherein said one of the at least one sensors in the wireless and remote monitor device further comprising:
a moveable and visible colored sign,
a horizontal tubular structure with two 90 degree bended tube ends,
a vertical tubular structure and jointly to form a "T" shape structure,
a first directing groove on the inner wall of said vertical tubular structure,
a second directing groove on the opposite of said first directing groove on the inner vertical tubular structure,
a post,
a plastic foamed floating structure connected with said post,
a negative power line initially linked with negative pole of a power supply resource and fixed into one side of said second vertical directing grooves,
a plurality of short negative power lines individually fixed into the other side of the second vertical directing groove;
said one of the at least one short negative lines independently linked with said WDC device,
a metal line,
said metal line is fixed onto one side of the moveable and visible colored sign which becomes a moveable metal line in a perpendicular way when the sign raising up or downward during the watering period,
wherein said sensors are fixed above the window of the safety valve and the movable plastic foamed cylinder floating structure of the safety valve device;
wherein said WDC device further comprising:
a real-location address,
said real-location address consisting two parts, including:
the first part is the real-location which is the same as expressed in the second parts of said label, and
the second part is the identification address issued to a data transferring and transforming module which linked with said WDC device;
a real time module,
a recording module to record a real time whenever said WDC device is powered via each of sensors,
a shut down module whenever over watering happened,
a processor, and
a communicating channel used to link with said w data transferring and transforming module for data transferring between the WDC device and the data transferring and transforming module,
a data transferring and transforming module having an unique identification address,
wherein the linked WDC device and the data transferring and transforming module are enabled by wireless technologies or/and supported by wireless mobile communication system in said data center;
wherein said safety valve device is same as the one afore claimed;
wherein said power supply resource is used to supply power for each of WDC devices or RFID tag if equipped to each UIFR device,
said power supply resource is a battery or rechargeable battery or wireless chargeable battery or power supplied from a wind generator or solar generator or any other available form;
wherein said monitor is a computer screen or the mobile phone screen or any other means supported and allowed by the data center for monitoring a real time watering data and a real time working condition of each of the UIFR devices used in the field or indoor at real-location, and the real time and real-location data can be further viewed at anywhere in the world for intelligent precision management of underground irrigation for plant culture;

wherein one of the at least one sensors provides a means to detect the water increased from prior volume to a pre-measured volume in the UIFR device, when said sensor connected with said WDC device;

wherein one of the at least one sensors further provides a means to know the time required for water percolated into the underground soil in the plant root area and water volume from the highest volume to each lower volume in the UIFR devices, when said sensor connected with said WDC device;

wherein said each one of the at least one sensors is independently linked with the WDC device to record the real time when it is powered which indicates a pre-decided volume or level of in the UIFR device accordingly, wherein a real time lapse interval for one real time changed to next real time provides a means to monitor and to find out each UIFR device working condition;

wherein the total time required for water percolating into soil from highest volume to the lowest volume indicates both an UIFR device working condition and underground soil condition;

wherein the WDC device connected with one of the at least one sensors to detect the water increased in the UIFR device by real time and real-location manners, including:
  (a). the WDC device reports the increased water volume, from beginning to a pre-measured volume, by a real time manner when WDC device is powered via one of the at least one sensors sensor;
  (b). the WDC device reports the increased water volume, from prior increased volume to a pre-measured volume, by a real time manner when the WDC device is powered via one of the at least one sensors sensor;
  (c). the WDC device reports the increased water volume, from prior water volume to a pre-measured volume, by a real time manner when the WDC device is powered via one of the at least one sensors sensor;
  (d). the WDC device reports the increased water volume, from prior water volume to a pre-measured volume, by a real time manner when the WDC device is powered via one of the at least one sensors sensor;
  (e). one of the at least one sensors linked with the shut down module directly in the WDC device when over irrigating happened and further to turn off the switch on the water inletting tubular structure or branch water tube right away via wireless technologies or/and wireless mobile communication system; wherein a special report will be sent back to the data center right away when the switch being turn off;
  (f). the WDC device reports the water volume decreased from prior water volume to the pre-measured volume in the UIFR device when the WDC device is powered again via one of the at least one sensors (d);
  (g). the WDC device reports the water volume decreased from prior water volume to the pre-measured volume in the UIFR device when the WDC device is powered again via one of the at least one sensors (c);
  (h). the WDC device reports the water volume decreased from prior water volume to the pre-measured volume in the UIFR device when the WDC device is powered again via one of the at least one sensors (b);
  (i). the WDC device reports the water volume decreased from prior water volume to the pre-measured volume in the UIFR device when the WDC device is powered again via one of the at least one sensors (a);

wherein all data mentioned above can be viewed at real time via a computer or mobile phone supported and allowed by system in the data center.

13. The system according to claim 1, wherein said gas sample collecting channel, having:
  a first plug,
  a second plug with a penetrative hole in the center, and
  a first air/pressure releasing tubular structure,
  wherein one of the at least one sample collecting channels for monitoring irrigation result of the UIFR devices and each of plants watering by said UIFR device, including:
    at least one first sampling channel which is vertically placed into the upper root area,
    at least one second sampling channel which is vertically placed into the sandwiching root area,
    at least one third sampling channel which is vertically placed into the deep root area,
  wherein said first, second and third sampling channels comprising:
    a tube,
      said tube having a threaded inner wall on the lower end, and a threaded outer wall on the upper end,
    a solid column,
      said solid column having:
        a threaded part on the lower end, and
        a threaded cap coupling with said column on the upper end,
    a sealing washer,
  wherein the plurality of sample measurement devices for monitoring each of the UIFR devices and each of plants watering by said UIFR device, including:
    a pH probe or sensor to be placed into each of sampling channels to measure soil pH value in the root area at different levels,
    a pH meter,
    a thermometer probe or sensor,
    a thermometer,
    a water content analyzer probe or sensor,
    a water content analyzer,
    a soil nutrient contents sampler to collect soil sample from different root area, and
    a soil nutrient contents analyzer.

14. The system according to claim 1, wherein the UIFR device used for the moveable monitoring device is the same as afore claimed for the UIFR, except wherein the third tubular structures of the AAB devices in the UIFR device having a threaded part on the outer wall to match with the threaded neck on the inner wall of the sample water container,
  wherein the pair of sampling water containers, having:
    a threaded neck on the inner wall,
    a water volume scale on each of the sample water containers,
    a pair of taps on the bottom of said each of the sample water containers,
    a carry means to move said movable device to different places in the facility as desired, wherein the label used for the moveable monitoring device having three parts:
- a first part is letters "HOT",
- a second part is letters "MMD" represented the "moveable monitoring device",
- a third part is serials number representing each of the moveable devices.

15. The system according to claim 1, whereby the irrigation system or prior existed irrigation system comprising:
- a water resource,
- a tank(s),
- an organic and inorganic fertilizer injector,
- a water filter device,
- an underground or above ground main and sub-main water supply lines for different sites or green houses in a facility,
- a branch water supply conduit for a row or for a green house;
- a first wireless technologies supported or/and mobile communication supported wireless remote control/programmed/manually enabled switch to control the water from the main or sub-main water supply line to water conduit into each buildings or house or green house or each row in the field,
- a second wireless technologies supported or/and mobile communication supported wireless remote control/programmed/manually enabled switch to control the water supply in each branch water supply conduit linked with each of the UIFR devices;

or a running or tap water system or a prior existed running or tap water system to supply water to each of UIFR devices used for potted plants indoor or outdoor plants cultured in a yard by surrounding the house or a place nearby a house, comprising: an independent indoor or outdoor water supply conduit to supply water for each of UIFR devices only,
- a pressure regulator,
- a fertilizer injector, and
- a first wireless technologies supported or/and mobile communication supported wireless remote control/programmed/manually enable switch to control the water from the running or tap water system to water supply conduit for each buildings or house or green house or each row in the field,
- a second wireless technologies supported or/and mobile communication supported wireless remote control/programmed/manually enabled switch to control water supply in each branch water supply conduit linked with each of the UIFR devices.

* * * * *